US012451093B2

(12) United States Patent
Senda et al.

(10) Patent No.: US 12,451,093 B2
(45) Date of Patent: Oct. 21, 2025

(54) DISPLAY DEVICE WITH PULSE WIDTH MODULATION SIGNAL GENERATION UNIT

(71) Applicant: SONY SEMICONDUCTOR SOLUTIONS CORPORATION, Kanagawa (JP)

(72) Inventors: Michiru Senda, Kanagawa (JP); Kota Mase, Tokyo (JP); Taro Ichitsubo, Tokyo (JP); Takayuki Kanda, Fukuoka (JP); Seiichiro Jinta, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 18/580,749

(22) PCT Filed: Mar. 15, 2022

(86) PCT No.: PCT/JP2022/011468
§ 371 (c)(1),
(2) Date: Jan. 19, 2024

(87) PCT Pub. No.: WO2023/007819
PCT Pub. Date: Feb. 2, 2023

(65) Prior Publication Data
US 2024/0371338 A1 Nov. 7, 2024

(30) Foreign Application Priority Data
Jul. 27, 2021 (JP) ................................ 2021-122829

(51) Int. Cl.
*G09G 3/36* (2006.01)
*G09G 3/20* (2006.01)

(52) U.S. Cl.
CPC ......... *G09G 3/3648* (2013.01); *G09G 3/2022* (2013.01); *G09G 2300/0814* (2013.01); *G09G 2310/08* (2013.01); *G09G 2330/023* (2013.01)

(58) Field of Classification Search
CPC . G09G 3/2007–204; G09G 3/36–3696; G09G 2300/0421; G09G 2300/0426;
(Continued)

(56) References Cited

U.S. PATENT DOCUMENTS 4,906,982 A * 3/1990 Gwynn ................ G04G 9/0064
968/936
6,195,077 B1 * 2/2001 Gyouten .............. G09G 3/3692
345/204
(Continued)

FOREIGN PATENT DOCUMENTS

JP 2002-278499 9/2002
JP 2006-524844 11/2006
(Continued)

OTHER PUBLICATIONS

English Translation of International Search Report prepared by the Japan Patent Office on May 20, 2022, for International Application No. PCT/JP2022/011468, 6 pgs.

*Primary Examiner* — Nathan Danielsen
(74) *Attorney, Agent, or Firm* — Sheridan Ross PC

(57) ABSTRACT

The object of the present invention is to suppress power consumption. A display device includes: a first holding unit provided in a pixel and configured to hold an image signal; and a PWM signal generation unit provided in the pixel and configured to generate a pulse width modulation (PWM) signal corresponding to the image signal on the basis of the image signal and count signal held in the first holding unit.

26 Claims, 51 Drawing Sheets

(58) Field of Classification Search
CPC ... G09G 2300/0809; G09G 2300/0814; G09G 2300/0282; G09G 2310/0243; G09G 2310/0259; G09G 2310/027; G09G 2310/0297; G09G 2310/06; G09G 2310/08; G09G 2330/021; G09G 2330/023
See application file for complete search history.

(56) References Cited

U.S. PATENT DOCUMENTS

| | | | | |
|---|---|---|---|---|
| 10,395,589 | B1 * | 8/2019 | Vahid Far | G09G 3/3208 |
| 2004/0263502 | A1 * | 12/2004 | Dallas | G09G 5/00<br>345/204 |
| 2010/0073568 | A1 * | 3/2010 | Van Ostrand | G09G 3/2003<br>348/E5.062 |
| 2020/0090630 | A1 | 3/2020 | Wang et al. | |
| 2021/0130828 | A1 | 5/2021 | Fauser et al. | |

FOREIGN PATENT DOCUMENTS

| | | |
|---|---|---|
| JP | 2009-109600 | 5/2009 |
| WO | WO 2020/060738 | 3/2020 |

* cited by examiner

■ BINARY COUNTER

■ GRAY CODE COUNTER

DISPLAY DEVICE WITH PULSE WIDTH MODULATION SIGNAL GENERATION UNIT

CROSS REFERENCE TO RELATED APPLICATIONS

This application is a national stage application under 35 U.S.C. 371 and claims the benefit of PCT Application No. PCT/JP2022/011468, having an international filing date of 15 Mar. 2022, which designated the United States, which PCT application claimed the benefit of Japanese Patent Application No. 2021-122829, filed 27 Jul. 2021, the entire disclosures of each of which are incorporated herein by reference.

TECHNICAL FIELD

Embodiments according to the present disclosure relate to a display device.

BACKGROUND ART

In a display device, a method of converting a pixel signal into a pulse width modulation (PWM) signal and writing the signal to a latch may be used (refer to Patent Document 1).

CITATION LIST

Patent Document

Patent Document 1: Japanese Unexamined Patent Application Publication No. 2006-524844

Patent Document 2: Japanese Patent Application Laid-Open No. 2009-109600

SUMMARY OF THE INVENTION

Problems to be Solved by the Invention

However, power consumption may increase due to a load or the like on a wiring for transmitting a signal.

Therefore, the present disclosure provides a display device capable of suppressing the power consumption.

Solutions to Problems

In order to solve the above-described problem, according to an aspect of the present disclosure, there is provided a display device including:

a first holding unit provided in a pixel and configured to hold an image signal; and a PWM signal generation unit provided in the pixel and configured to generate a pulse width modulation (PWM) signal corresponding to the image signal on the basis of the image signal held in the first holding unit and a count signal.

There may be further provided at least one count signal supply unit configured to supply the count signal to the PWM signal generation unit, the PWM signal generation unit may include a logical operation unit configured to generate a PWM signal by performing logical operation on the image signal held in the first holding unit and the count signal, the logical operation unit may include an exclusive-NOR circuit, a first input unit of the exclusive-NOR circuit may be electrically connected to the first holding unit, and a second input unit of the exclusive-NOR circuit may be electrically connected to the count signal supply unit.

The logical operation unit may include:

a plurality of the exclusive-NOR circuits, and an AND circuit to which an output of each of a plurality of the exclusive-NOR circuits is input.

The count signal supply unit may be electrically connected to the second input unit via a buffer unit.

The count signal supply unit may be a gray code counter.

The count signal supply unit may generate the count signal having a predetermined waveform on the basis of a reference clock, and supply the generated count signal to the PWM signal generation unit.

There may be further provided a pixel electrode that is provided in the pixel and a signal level conversion unit provided in the pixel and configured to convert a signal level of the PWM signal input to the pixel electrode.

There may be further provided a first chip and a second chip stacked with the first chip, and the first holding unit, the PWM signal generation unit, the signal level conversion unit, and the pixel electrode may be separated and disposed in the first chip and the second chip.

The signal level conversion unit may include four transistors connected in series between a first reference voltage node with a voltage level different from a high level or low level of the PWM signal and a second reference voltage node with either the high level or the low level, the four transistors may include a first transistor of a first conductivity type having one end electrically connected to the first reference voltage node and a gate to which a first signal is input, a second transistor of a second conductivity type having one end electrically connected to the second reference voltage node and a gate to which the PWM signal is input, a third transistor of the first conductivity type that is connected between the first transistor and the second transistor and has a gate electrically connected to a third reference voltage node with a voltage level different from that of the second reference voltage node with the high level or low level, and a fourth transistor of the second conductivity type that is connected between the first transistor and the second transistor and has a gate electrically connected to the third reference voltage node, and the pixel electrode may be electrically connected to a node between the third transistor and the fourth transistor which are connected in series.

There may be further provided a second holding unit provided in the pixel and configured to hold the PWM signal, and the signal level conversion unit may include a fifth transistor connected between the second holding unit and the pixel electrode, and a voltage booster configured to increase a voltage of the pixel electrode with capacitive coupling.

The PWM signal generation unit may be shared by a plurality of the pixels.

The image signal may include a plurality of bits, a plurality of the first holding units may be provided in accordance with a plurality of the bits, and a plurality of the first holding units may be grouped such that a plurality of high-order bits becomes one bit.

The first holding unit may hold the image signal during a blanking period between a plurality of PWM periods corresponding to the PWM signal.

The first holding unit may hold the image signal having a subframe divided for each of a plurality of color components such that unit frames of the image signal are input in a predetermined order.

The image signal may include a plurality of bits, a plurality of the bits of the image signal may be time-divided a plurality of times in one subframe, and the PWM signal generation unit may generate the PWM signal time-divided a plurality of times within one subframe in accordance with the image signal of which a plurality of the bits is time-divided.

A plurality of the bits of the image signal may be time-divided a plurality of times in accordance with a weight of the bits.

A plurality of the bits of the image signal may be time-divided such that weights of the bits are substantially equal.

A plurality of the bits of the image signal may be time-divided into a first half bit and a second half bit in one subframe, the display device may further include a switching unit configured to switch an output of the PWM signal generation unit in accordance with a count of the first half bit or a count of the second half bit, and the PWM signal generation unit may generate the PWM signal in accordance with a first timing based on the first half bit and the count signal having a first polarity and a second timing based on the second half bit and the count signal having a second polarity.

There may be further provided a selector configured to select the first holding unit configured to hold the image signal of the first half bit and the first holding unit configured to hold the image signal of the second half bit.

The first holding unit may hold the image signal of the second half bit in a period between the count of the first half bit and the count of the second half bit.

There may be further provided a pixel electrode provided in the pixel, the first holding unit and the PWM signal generation unit may be shared by a plurality of the pixel electrodes, and some of a plurality of the pixel electrodes sharing the first holding unit and the PWM signal generation unit may be driven on the basis of the same image signal, and the pixel electrodes may be driven such that arrangement of the pixel electrodes driven on the basis of the same image signal is changed for each subframe of the same color component.

Two pixel electrodes adjacent in a first direction may be driven on the basis of the same image signal, and the pixel electrodes may be driven such that two pixel electrodes driven on the basis of the same image signal are shifted by one pixel electrode in the first direction for each subframe of the same color component.

The first holding unit and the PWM signal generation unit may be shared by four pixel electrodes arranged in 2×2, in a red component and a blue component, two pixel electrodes adjacent in a second direction may be driven on the basis of the same image signal, and the pixel electrodes may be driven such that two pixel electrodes driven on the basis of the same image signal are shifted by one pixel electrode in a first direction perpendicular to the second direction for each subframe of the same color component, and in a green component, one of four pixel electrodes may be driven, and the pixel electrode may be driven such that the arrangement of the pixel electrodes to be driven changes for each subframe.

There may be further provided:

a flag generation unit configured to calculate a sum of signal values of the image signals for each color component and for each predetermined region of a plurality of the arranged pixels, and generate a flag in a case where the sum of the signal values is equal to or less than a predetermined value; and a drive stop unit configured to stop driving of the pixels in the predetermined region of the color component for which the flag is generated.

The predetermined region may be a pixel line which is one line of a plurality of the pixels arranged in a matrix.

The predetermined region may be a line division region divided in a direction along one line from a pixel line, the line division region being one line of a plurality of the pixels arranged in a matrix.

The drive stop unit may stop an input of the image signal to the first holding unit of the pixel in the predetermined region of the color component for which the flag is generated.

The count signal may be input to the PWM signal generation unit for each pixel line that is one line of a plurality of the pixels arranged in a matrix, and the drive stop unit may stop the input of the count signal to the PWM signal generation unit of the pixel of the color component on the pixel line in which the flag is generated for all the pixels on the pixel line.

MODE FOR CARRYING OUT THE INVENTION

Hereinafter, embodiments of a display device will be described with reference to the drawings. Although main components of the display device will be mainly described below, the display device may have a component or function that is not illustrated or described. The following description does not exclude components and functions that are not illustrated or described.

First Embodiment (Configuration)

Figure 1:
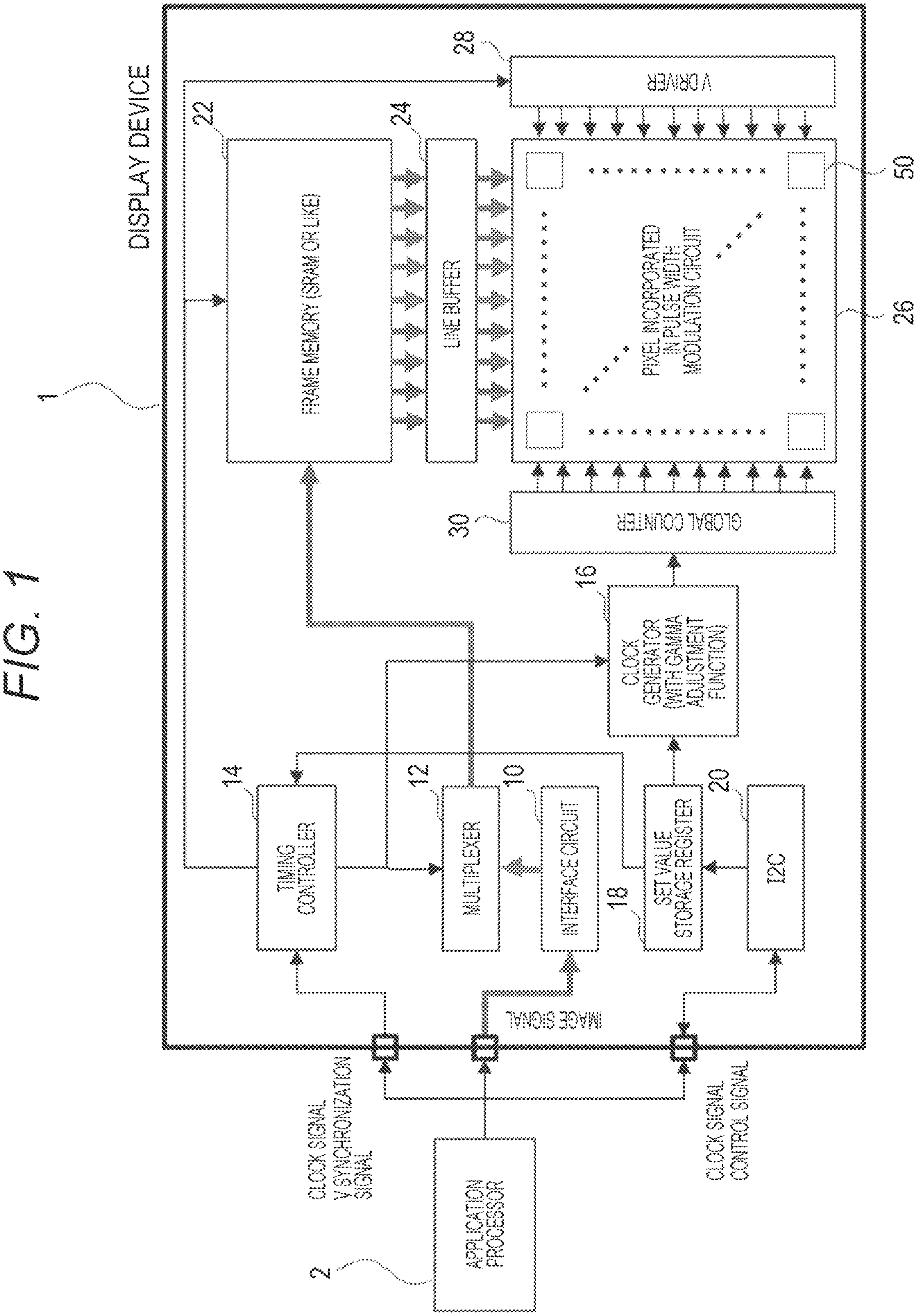
FIG. 1 is a diagram illustrating an example of a configuration of a display device according to a first embodiment.

FIG. 1 is a diagram illustrating an example of a configuration of a display device 1 according to a first embodiment. The display device 1 is a digital drive display device that converts a digital image signal into a pulse width modulation (PWM) signal to drive a pixel, and thus displays an image by converting an image signal into an optical signal.

The display device 1 is, for example, an augmented reality (AR) display device. The AR display device is required to have low power consumption and a high frame rate. Furthermore, the display device 1 is, for example, a reflective display panel of liquid crystal on silicon (LCOS). However, the present disclosure is not limited thereto, and the display device 1 may be another display device such as a micro electro mechanical system (MEMS), an organic light emitting diode (OLED), a light emitting diode (LED), or the like.

As illustrated in FIG. 1, an application processor 2 disposed outside the display device 1 transmits a signal such as an image signal to the display device 1.

The display device 1 includes an interface circuit 10, a multiplexer 12, a timing controller 14, a clock generator 16, a set value storage register 18, an I-Squared-C (I2C) 20, a frame memory 22, a line buffer 24, a pixel region 26, a V driver 28, and a global counter 30.

The interface circuit 10 receives an image signal from the application processor 2.

The multiplexer 12 parallelizes the image signal received from the interface circuit 10 in order to decrease the operation frequency of a circuit and stores (writes) the image signal in the frame memory 22.

The timing controller 14 performs timing control on the display operation of the display device 1.

The clock generator 16 generates a reference clock on the basis of the timing controller 14. Furthermore, the clock generator 16 may have a gamma correction function to be described later. Furthermore, the clock generator 16 may be included in the global counter (count signal supply unit) 30.

The set value storage register 18 stores various types of information related to the operation of the display device 1.

The I2C 20 is a communication interface. The I2C 20 exchanges necessary information such as information to be read from and written to the set value storage register 18 with the application processor 2 outside the display device 1.

The frame memory 22 stores the image signal. The frame memory 22 is, for example, a storage unit such as a static random access memory (SRAM).

The line buffer 24 latches image signal data for each signal line. Furthermore, the line buffer 24 may perform processing necessary for the image signal data. The line buffer 24 outputs a signal based on the image signal data to the corresponding signal line.

In the pixel region 26, a plurality of pixels 50 is arranged in a matrix. Note that the details of each of the pixels 50 will be described with reference to FIG. 2.

The V driver 28 generates and outputs a drive signal of each of the pixels 50 according to the driving of the signal line by the line buffer 24. Thus, each of the pixels 50 can be sequentially driven.

The global counter 30 is provided so as to be opposed to the V driver 28 across the pixel region 26. The global counter 30 generates a count signal and supplies the count signal to a PWM signal generation circuit 52 in the pixel 50. For example, at least one global counter 30 is provided in the display device 1. The global counter 30 creates an arbitrary count signal on the basis of a reference clock having a high frequency. Note that the details of the global counter 30 will be described with reference to FIGS. 5 to 7B.

Figure 2:
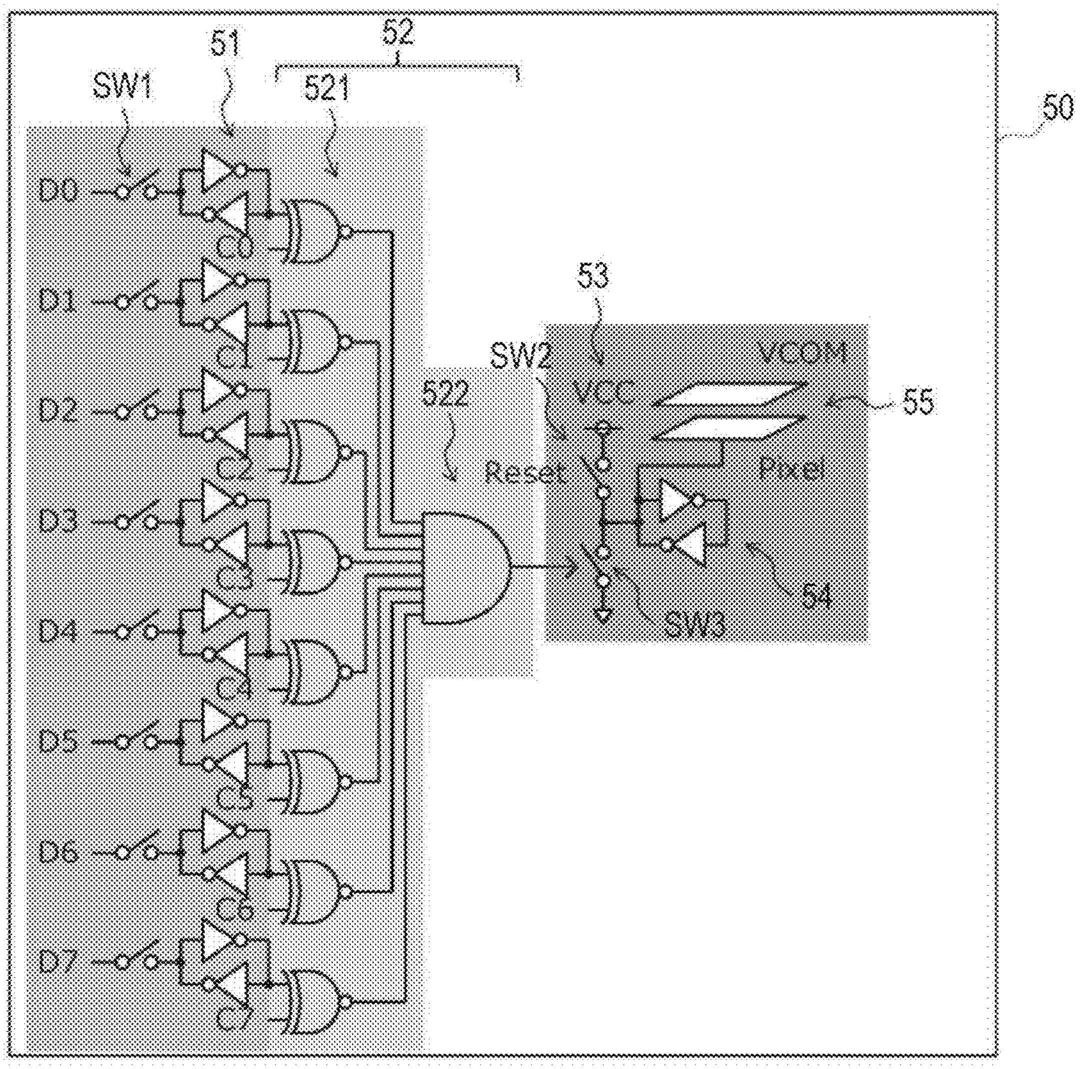
FIG. 2 is a diagram illustrating an example of a configuration of a pixel according to the first embodiment.

FIG. 2 is a diagram illustrating an example of a configuration of the pixel 50 according to the first embodiment.

The pixel 50 includes a first switch SW1, a first holding unit 51, the PWM signal generation circuit (PWM signal generation unit) 52, a signal level conversion unit 53, a second holding unit 54, and a pixel electrode 55. Note that the configurations of the other pixels 50 in the pixel region 26 are also the same.

The first switch SW1 is connected to a front side of the first holding unit 51.

The first holding unit 51 is provided in the pixel 50 and holds an image signal. A plurality of the first holding units 51 is provided according to the bit depth of the image signal. In the example illustrated in FIG. 2, since the pixel is driven by a digital signal of an 8-bit signal, eight first holding units 51 are provided. Data Dx (x=0, 1, . . . , 6, 7) is input to the first holding unit 51. The first holding unit 51 is, for example, a latch circuit.

The PWM signal generation circuit 52 converts the digital image signal into one pulse PWM signal. The PWM signal generation circuit 52 is provided in the pixel 50, and generates a PWM signal corresponding to the image signal on the basis of an image signal held in the first holding unit 51 and a count signal Cx (x=0, 1, . . . , 6, 7). Furthermore, the PWM signal generation circuit 52 outputs and writes the PWM signal to the second holding unit 54.

The PWM signal generation circuit 52 includes a logical operation unit. The logical operation unit generates a PWM signal by performing a logical operation of the image signal held in the first holding unit 51 and the count signal.

The logical operation unit includes an exclusive-NOR circuit (EXNOR circuit 521) and an AND circuit (AND circuit 522). In a case where the image signal includes a plurality of bits, a plurality of the EXNOR circuits 521 is provided according to the bit depth. In the example illustrated in FIG. 2, since the pixel is driven by an 8-bit digital signal, eight EXNOR circuits 521 are provided. The EXNOR circuit 521 includes a first input unit and a second input unit. The first input unit is electrically connected to the first holding unit 51, and data Dx (x=0, 1, . . . , 6, 7) is input thereto. The second input unit is electrically connected to the global counter 30, and receives the count signal Cx (x=0, 1, . . . , 6, 7).

Note that the global counter 30 may be electrically connected to the second input unit via a buffer circuit (not illustrated).

The output unit of each EXNOR circuit 521 is electrically connected to the input unit of the AND circuit 522. The signal output from the AND circuit 522 is a PWM signal output at a time corresponding to the image signal. The PWM width of the PWM signal is based on, for example, the count start timing of the global counter 30 and the rise timing of the output signal of the AND circuit 522 (refer to FIG. 3 to be described later).

The signal level conversion unit 53 is provided in the pixel 50 and converts a signal level (voltage level) of the PWM signal input to the pixel electrode 55. This is because, for example, in order to drive the liquid crystal, a higher voltage is required than in the case of driving a logic circuit.

The signal level conversion unit 53 includes a second switch SW2 and a third switch SW3. The second switch SW2 and the third switch SW3 are connected in series between a reference voltage node VCC and ground. The second switch SW2 is turned on or off upon receiving a reset signal. The third switch SW3 is turned on or off upon receiving the signal from the AND circuit 522.

The second holding unit 54 is provided in the pixel 50 and holds a PWM signal. For example, the second holding unit 54 is electrically connected to a node between the second switch SW2 and the third switch SW3. The width of the PWM signal is based on, for example, a period during which the voltage value of the reference voltage node VCC is held. The second holding unit 54 is, for example, a latch circuit.

The pixel electrode 55 is an electrode of an electro-optical element such as liquid crystal, which is provided in the pixel 50. The pixel electrode 55 receives one pulse PWM signal, that is, one pulse voltage signal. As a result, the pixel emits light.

Here, for example, when digital 8 bits are converted into 256 gradations, 256 signal transitions need to be performed. As the number of signal transitions increases, the number of charge/discharges of the circuit increases. That is, the power consumption is likely to be increased by the generation of the PWM signal. As will be described later, the first holding unit 51 and the PWM signal generation circuit 52 are disposed so as to be close to each other. Therefore, the power consumption can be suppressed, and the frame rate can be improved.

(Operation)

Figure 3:
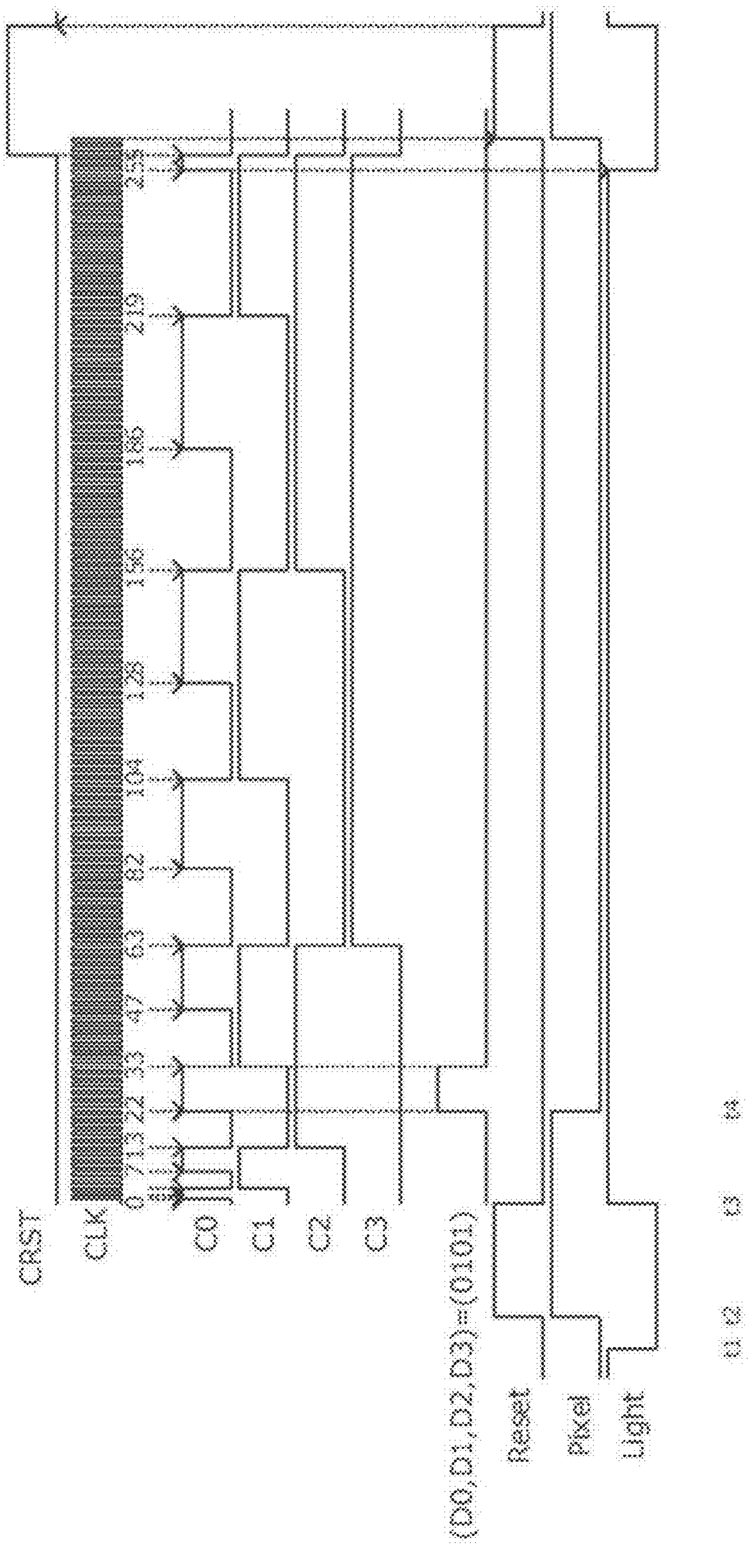
FIG. 3 is a timing chart illustrating an example of operation of a pixel according to the first embodiment.

FIG. 3 is a timing chart illustrating an example of the operation of the display device 1 according to the first embodiment. FIG. 3 illustrates a timing chart in the case of 4 bits.

First, at time t1, a light source (Light) is turned off (turned off). The light source is, for example, a light source in a reflective LCOS.

Next, at time t2, the reset signal becomes High, and the second switch SW2 is turned on. Thus, one (voltage VCC) is written to the second holding unit 54, and the second holding unit 54 goes into a high state. Note that in the period during which the light source is turned off, the width of the PWM signal is not effective. The actual PWM width is a period during which the light source is in the ON state and the second holding unit 54 is in the high state.

Furthermore, during the reset, the image signal is written to the first holding unit 51. Thus, the first holding unit 51 holds the image signal.

Next, at time t3, the reset signal becomes Low, and the second switch SW2 is turned off. Furthermore, at time t3, the light source is turned on (emits light).

Furthermore, at time t3, the global counter 30 inputs the count signals C0 to C3 to the PWM signal generation circuit 52. Thus, the PWM signal generation circuit 52 compares the image signal with the count signal.

Next, at time t4, the AND circuit 522 of the PWM signal generation circuit 52 outputs one at a timing when the data of the image signal held in the first holding unit 51 and the value of the count signal all match. In the example illustrated in FIG. 3, the data of the image signal is represented by the formula below.

(D0, D1, D2, D3)=(0101)

Thus, the third switch SW3 is turned on. As a result, zero (ground voltage) is written to the second holding unit 54, and the second holding unit 54 goes into a low state.

In this manner, the PWM signal corresponding to the image signal is generated. In the PWM width period, when the second holding unit 54 is in the high state, the voltage of the pixel electrode 55 is also in the high state, and the pixel 50 is driven.

(Color Sequential Driving)

Figure 4:
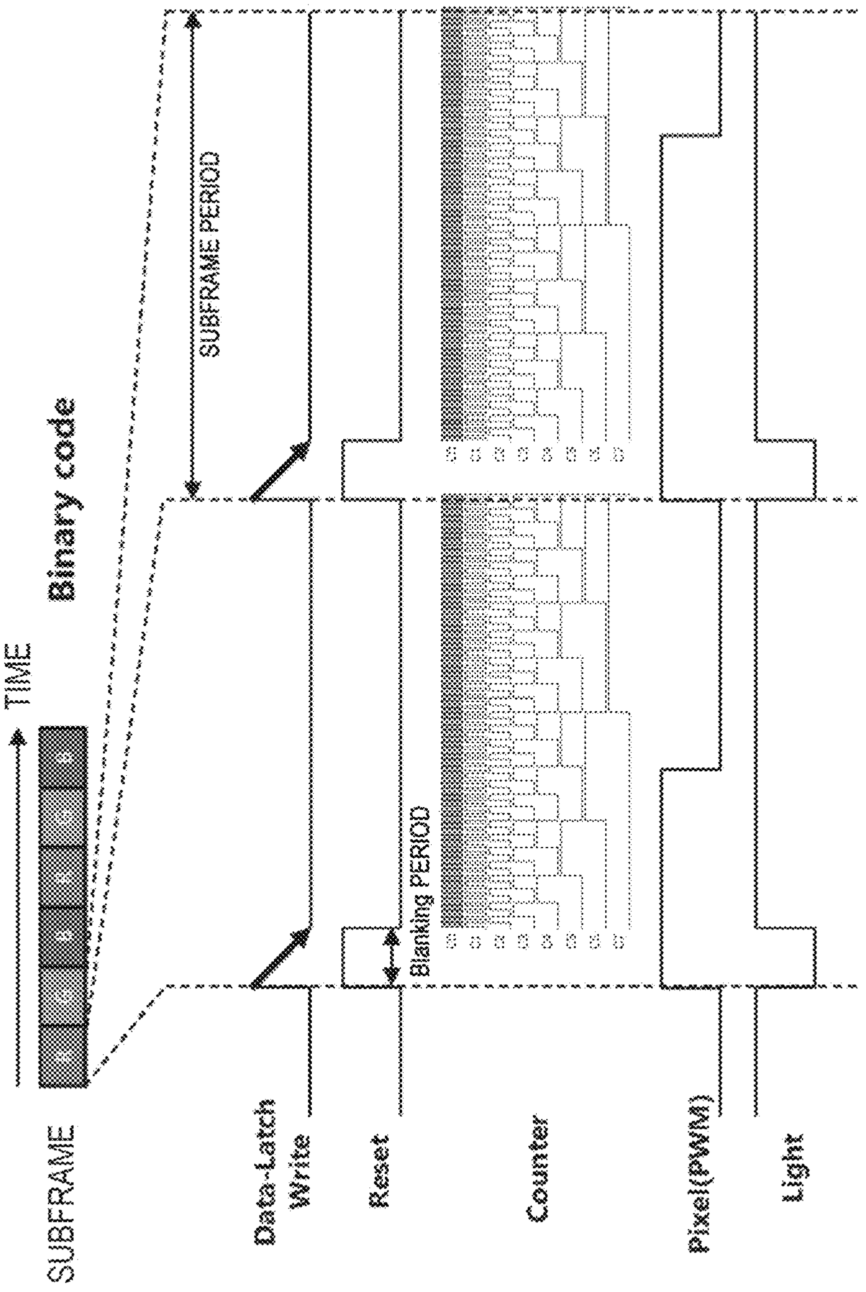
FIG. 4 is a diagram illustrating an example of operation of a pixel according to the first embodiment.

FIG. 4 is a diagram illustrating an example of the operation of the pixel according to the first embodiment. Note that the count signal illustrated in FIG. 4 is a binary code, but may be a gray code illustrated in FIG. 7B.

The display device 1 performs color sequential driving. The color sequential driving is a method of sequentially displaying images of color components of red, green, and blue in a time-division manner. The frame includes a plurality of subframes corresponding to respective colors. The subframes are displayed in a predetermined order. The subframes are displayed, for example, in the order of red, green, blue, red, green, and blue. In a case where the frame rate is equal to or higher than a predetermined frequency, the images are individually recognized by the user as a series of continuous images. That is, the user perceives the images of the respective color components of red, green, and blue, which are sequentially projected in a time-division manner, as a synthesis image obtained by synthesizing the images.

As illustrated in FIG. 4, the driving illustrated in FIG. 3 is performed in one subframe.

Furthermore, writing of data of an image signal to the first holding unit (data-latch) 51 is performed during a blanking period. The blanking period is a period between a PWM period of a certain subframe and a PWM period of a next subframe. The blanking period is also a reset period. Since the light source is turned off during the blanking period, double latching is not necessary by writing the data of the image signal during this period.

(Global Counter)

Figure 5:
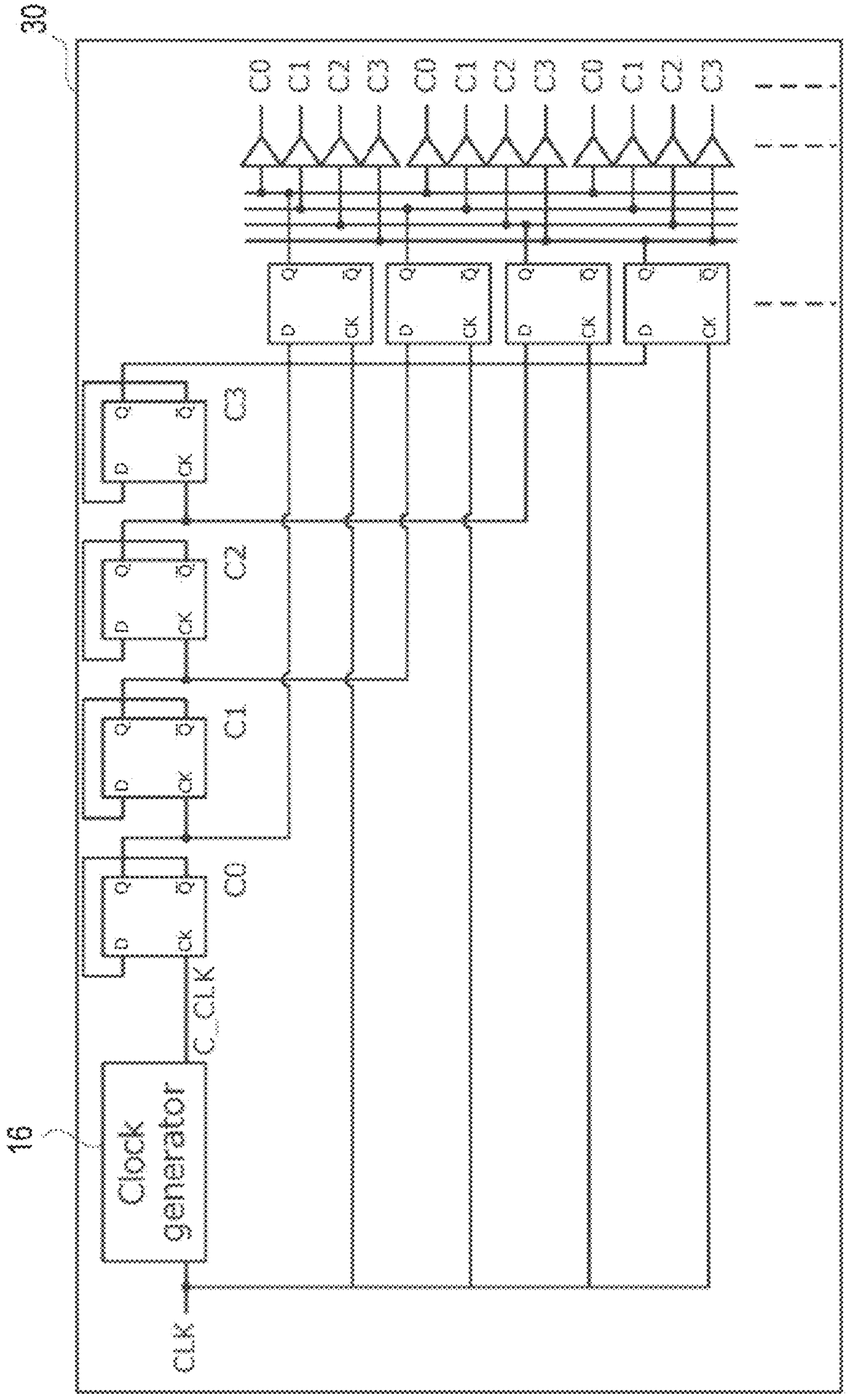
FIG. 5 is a diagram illustrating an example of a configuration of a global counter according to the first embodiment.

FIG. 5 is a diagram illustrating an example of a configuration of the global counter 30 according to the first embodiment. Note that in the example illustrated in FIG. 5, the clock generator 16 is disposed in the global counter 30.

The clock generator 16 generates a reference clock. The clock generator 16 can generate a reference clock having an arbitrary waveform. Therefore, a gamma adjustment to be described with reference to FIGS. 6A and 6B can be performed.

The global counter 30 includes a flip-flop. In the configuration example of the global counter 30 illustrated in FIG. 5, a count signal of a binary counter is generated.

Figure 6A:
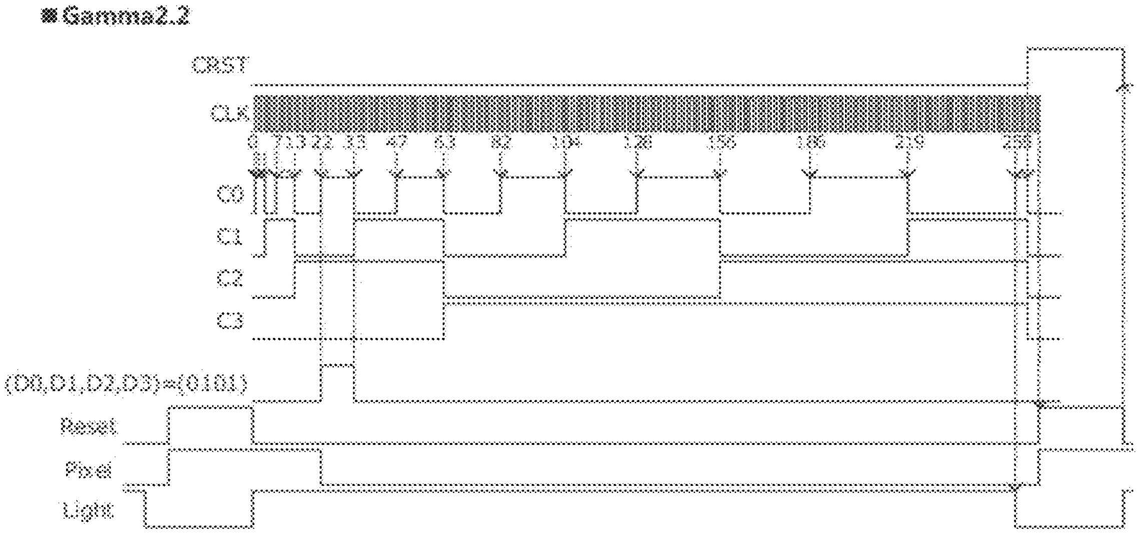
FIG. 6A is a diagram illustrating an example of a count signal of gamma 2.2.
Figure 6B:
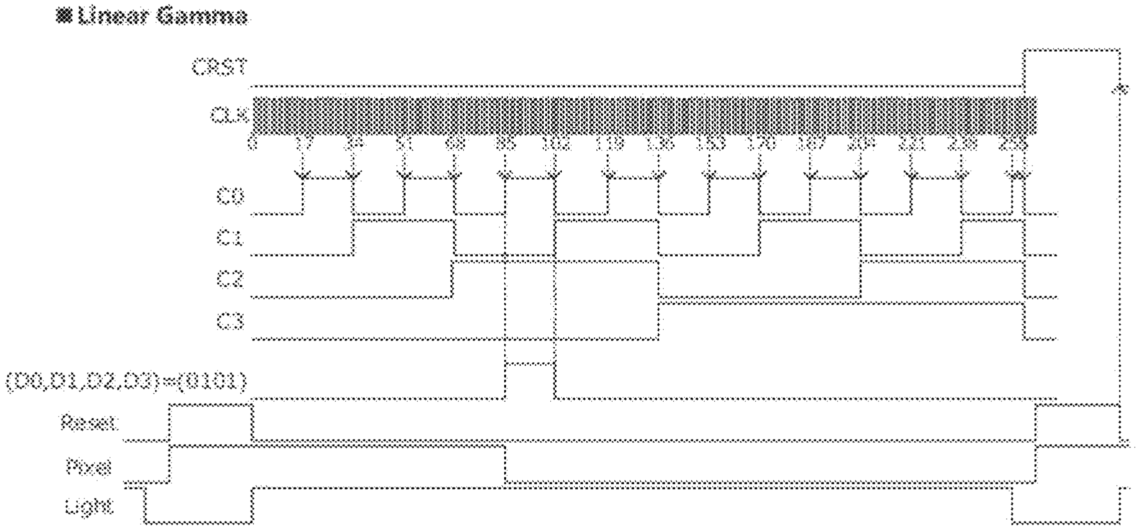
FIG. 6B is a diagram illustrating an example of a count signal of linear gamma.

FIG. 6A is a diagram illustrating an example of a count signal of gamma 2.2. FIG. 6B is a diagram illustrating an example of a count signal of linear gamma.

The inversion timing of the output signal of the global counter 30 is generated on the basis of a reference clock having a higher frequency. The set value storage register 18 in the display device 1 can arbitrarily control the inversion timing of the global counter 30.

The global counter 30 generates a count signal having a predetermined (arbitrary) waveform on the basis of the reference clock. The global counter 30 performs gamma correction and generates a count signal to change a pulse waveform. In gamma 2.2, the global counter 30 generates the count signal such that the pulse width gradually increases, that is, the cycle gradually increases. In the example illustrated in FIG. 6A, the count signal C0 transitions at timings when the reference clock is 0, . . . , 7, 13, 22, . . . .

Normally, for example, in a case where linear gamma is adjusted to gamma 2.2 by 8 bits, gamma adjustment is performed by increasing the gradation to 10 bits. In this case, the number of necessary first holding units 51 increases.

On the other hand, the global counter 30 can perform gamma correction on the basis of the reference clock without increasing the bit depth, and adjust the gamma value.

Figure 7A:
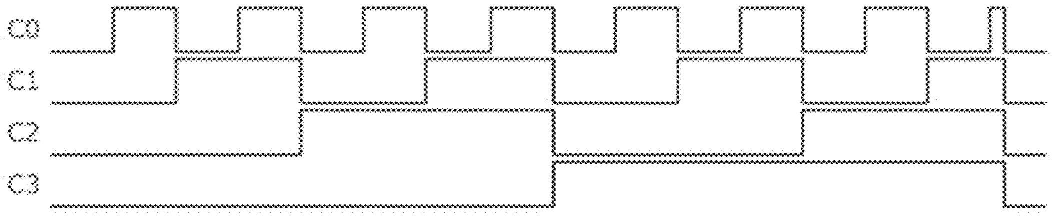
FIG. 7A is a diagram illustrating an example of a count signal of a binary counter.
Figure 7B:
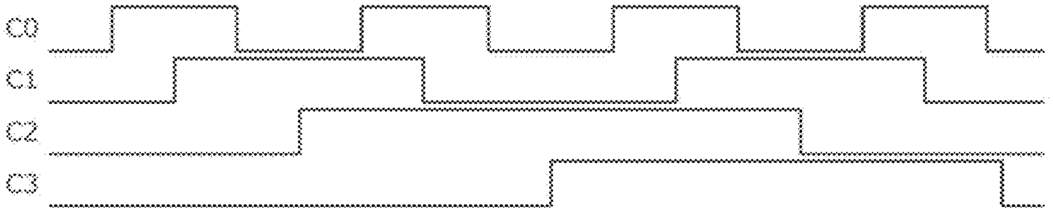
FIG. 7B is a diagram illustrating an example of a count signal of a gray code counter.

FIG. 7A is a diagram illustrating an example of the count signal of the binary counter. FIG. 7B is a diagram illustrating an example of the count signal of the gray code counter.

In the gray code, a one-bit count signal transitions at one timing. In a case where the global counter 30 is a gray code counter, the occurrence of hazard can be suppressed. Furthermore, since the gray code has the smaller number of transitions than the binary code, the power consumption can be suppressed.

Note that in a case where the count signal of the gray code counter is used, the line buffer 24 illustrated in FIG. 1 converts the data of the image signal into the gray code.

(Stacked Structure)

Figure 8:
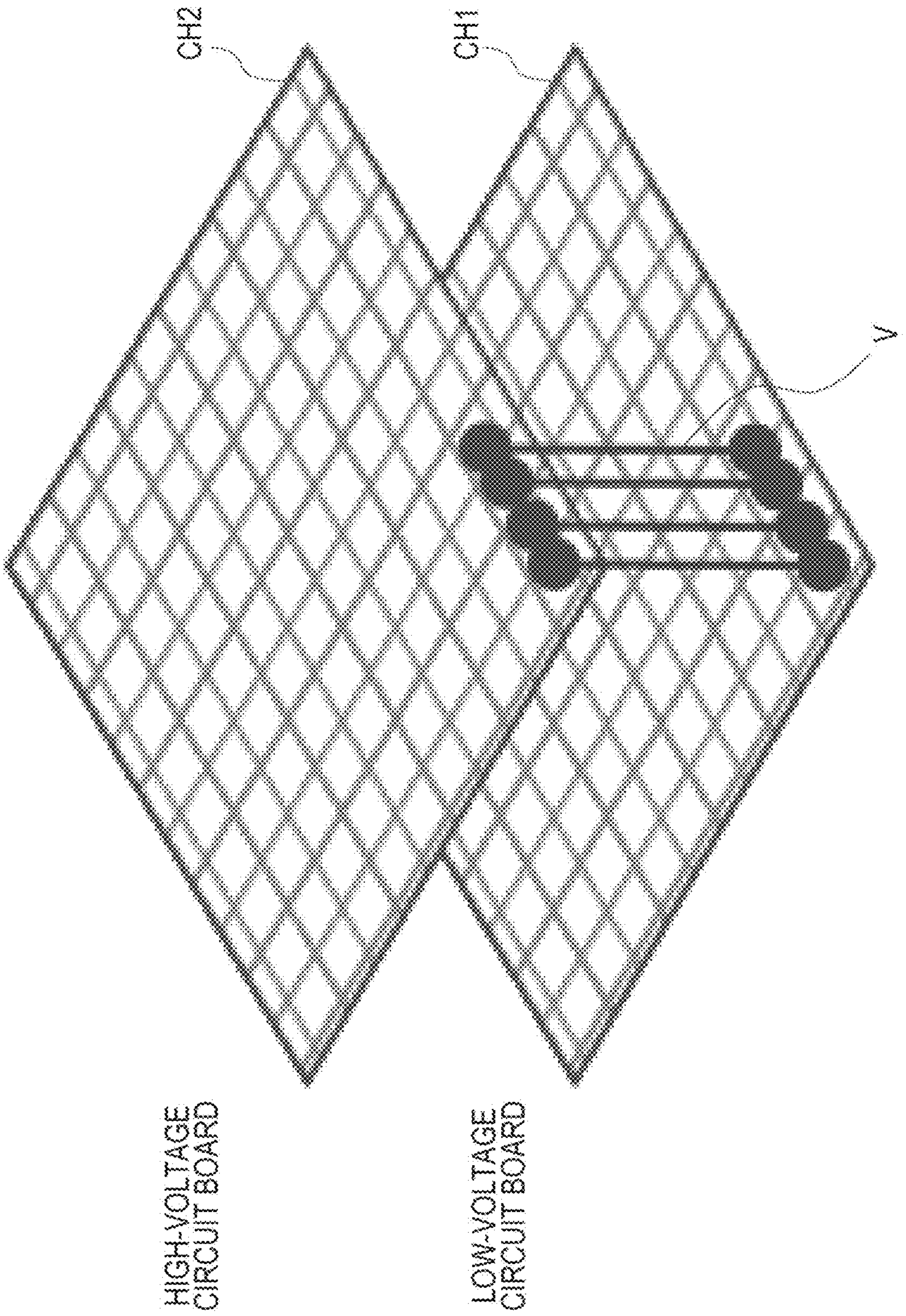
FIG. 8 is a diagram illustrating an example of a configuration of a stacked chip according to the first embodiment.

FIG. 8 is a diagram illustrating an example of a configuration of a stacked chip according to the first embodiment.

The display device 1 further includes a first chip CH1, a second chip CH2 stacked with the first chip CH1, and a via (columnar electrode) V.

The first chip CH1 is a low-voltage circuit board. In the example illustrated in FIG. 8, the first chip CH1 is a lower substrate. In the first chip CH1, the first holding unit 51, the PWM signal generation circuit 52 (logical operation unit), and the like are disposed.

The second chip CH2 is a high-voltage circuit board. In the example illustrated in FIG. 8, the second chip CH2 is an upper substrate. In the second chip CH2, the signal level conversion unit 53, the second holding unit 54, the pixel electrode 55, and the like are disposed.

The via V electrically connects the first chip CH1 and the second chip CH2. In the example illustrated in FIG. 8, the via V is provided for each pixel 50.

Figure 9:
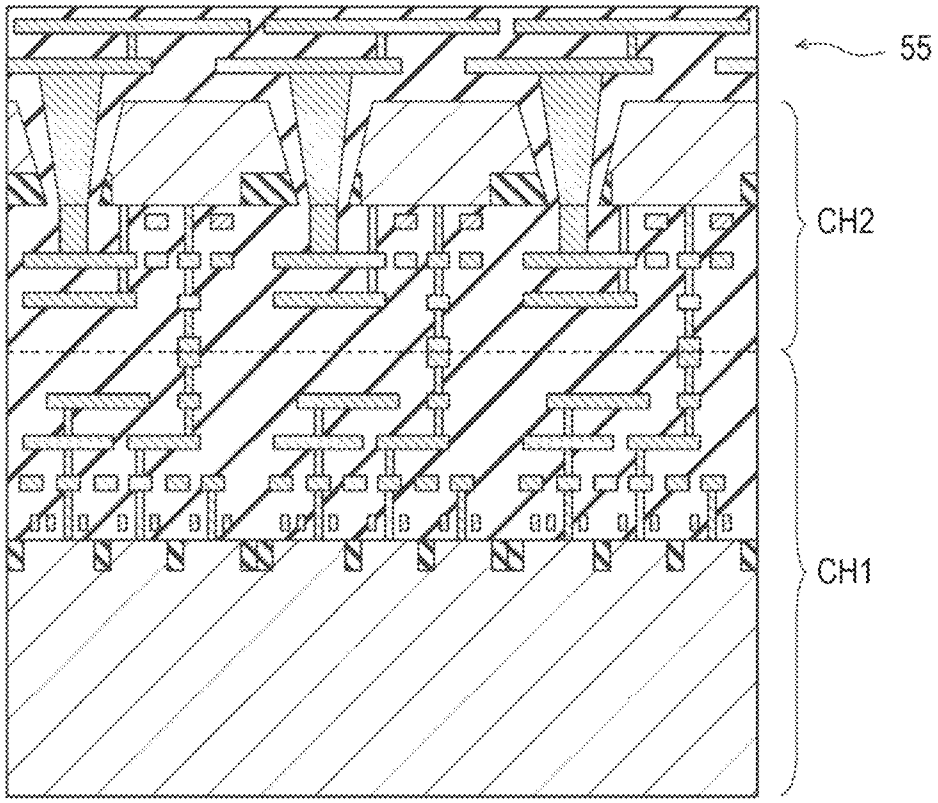
FIG. 9 is a cross-sectional view illustrating an example of a configuration of a stacked chip according to the first embodiment.

FIG. 9 is a cross-sectional view illustrating an example of a configuration of the stacked chip according to the first embodiment.

As illustrated in FIG. 9, the size of a transistor used for the circuit of the second chip CH2 is larger than the size of a transistor used for the circuit of the first chip CH1. A low breakdown voltage transistor is used for the circuit of the first chip CH1. A high breakdown voltage transistor is used for the circuit of the second chip CH2. Furthermore, the pixel electrode 55 is provided on the second chip CH2 side. By stacking the first chip CH1 and the second chip CH2, the distance from the PWM signal generation circuit 52 to the pixel electrode 55 can be further shortened, and the power consumption can be reduced.

Figure 10A:
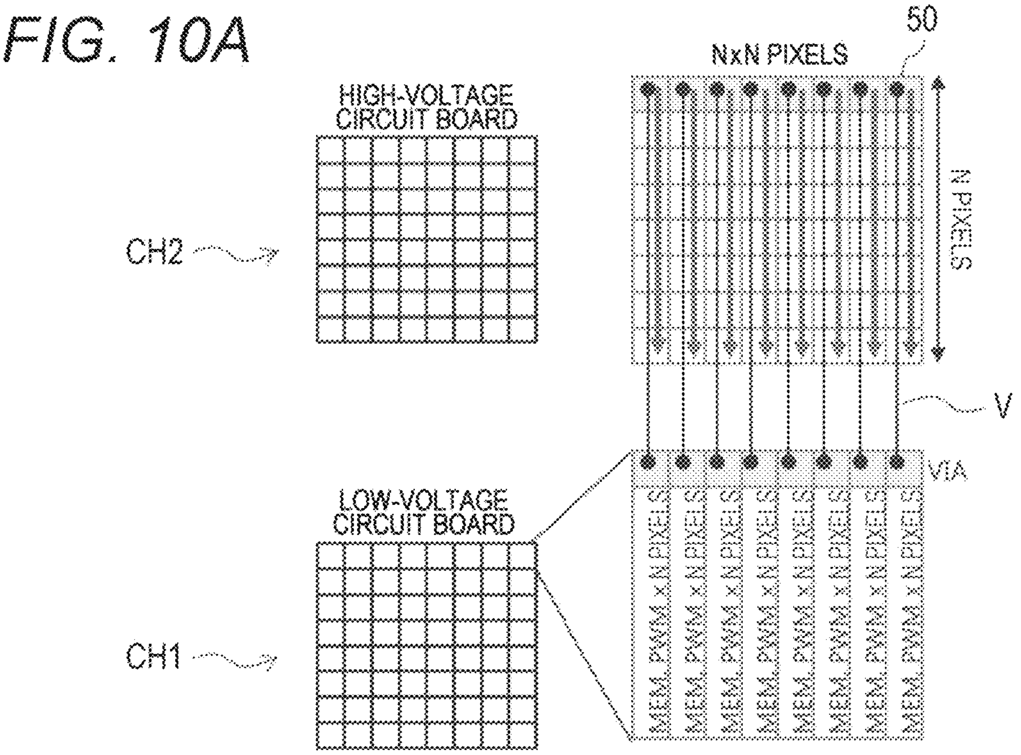
FIG. 10A is a diagram illustrating a modification example of a configuration of a via.

FIG. 10A is a diagram illustrating a modification example of a configuration of the via V FIG. 10A illustrates an example of a case where the via V is shared by a plurality of the pixels 50. The pixel region 26 includes, for example, a plurality of pixel groups having N×N pixels 50.

In the first chip CH1, in one pixel row, each of N pixels includes the first holding unit (MEM) 51 and the PWM signal generation circuits 52 (PWM). In the example illustrated in FIG. 10A, the via V is provided for each pixel row. As indicated by arrows, writing of the image signals is sequentially performed. Note that the writing of the image signal is performed by a signal line (not illustrated).

In a case where the area of the via V is large as compared with the area of the pixel 50, it may be difficult to dispose the via V for each pixel 50. In this case, as illustrated in FIG. 10A, the via V may be shared by a plurality of the pixels 50. Therefore, the via V can be easily disposed.

Figure 10B:
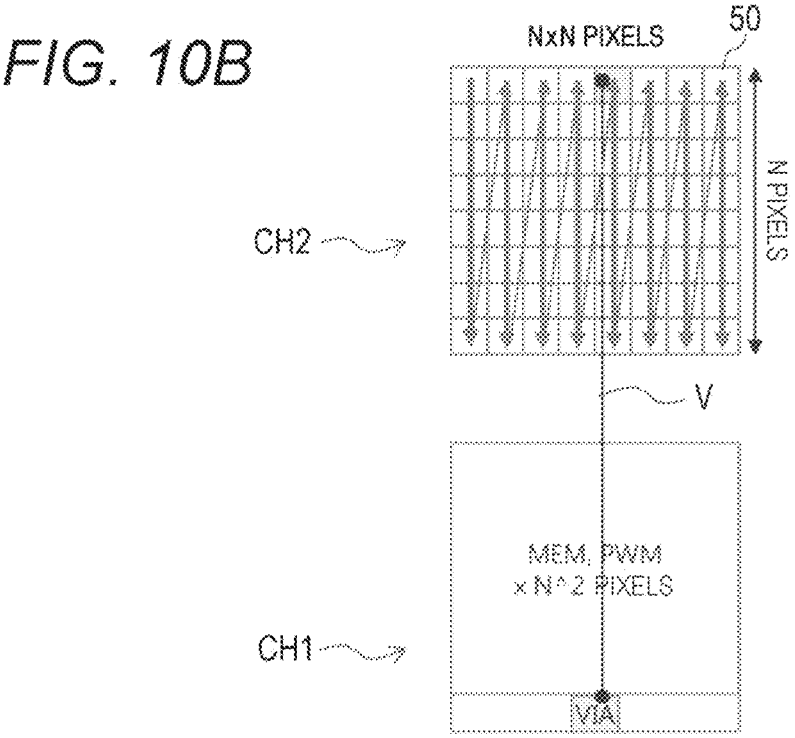
FIG. 10B is a diagram illustrating a modification example of a configuration of a via.

FIG. 10B is a diagram illustrating a modification example of a configuration of the via V.

In the example illustrated in FIG. 10B, one via V is provided for N×N pixels 50. As indicated by arrows, for example, writing of the image signals is performed sequentially from the left pixel row.

In the examples illustrated in FIGS. 8 to 10B, the circuit is disposed so as to be divided into a low-voltage circuit and a high-voltage circuit. That is, the circuit is divided and disposed in the first chip CH1 and the second chip CH2 so as to be divided between the PWM signal generation circuit 52 and the signal level conversion unit 53. However, the circuit may be divided at any position. That is, the first holding unit 51, the PWM signal generation circuit 52, the signal level conversion unit 53, and the pixel electrode 55 are only required to be disposed in the first chip CH1 and the second chip CH2.

(Planar Arrangement)

Figure 11:
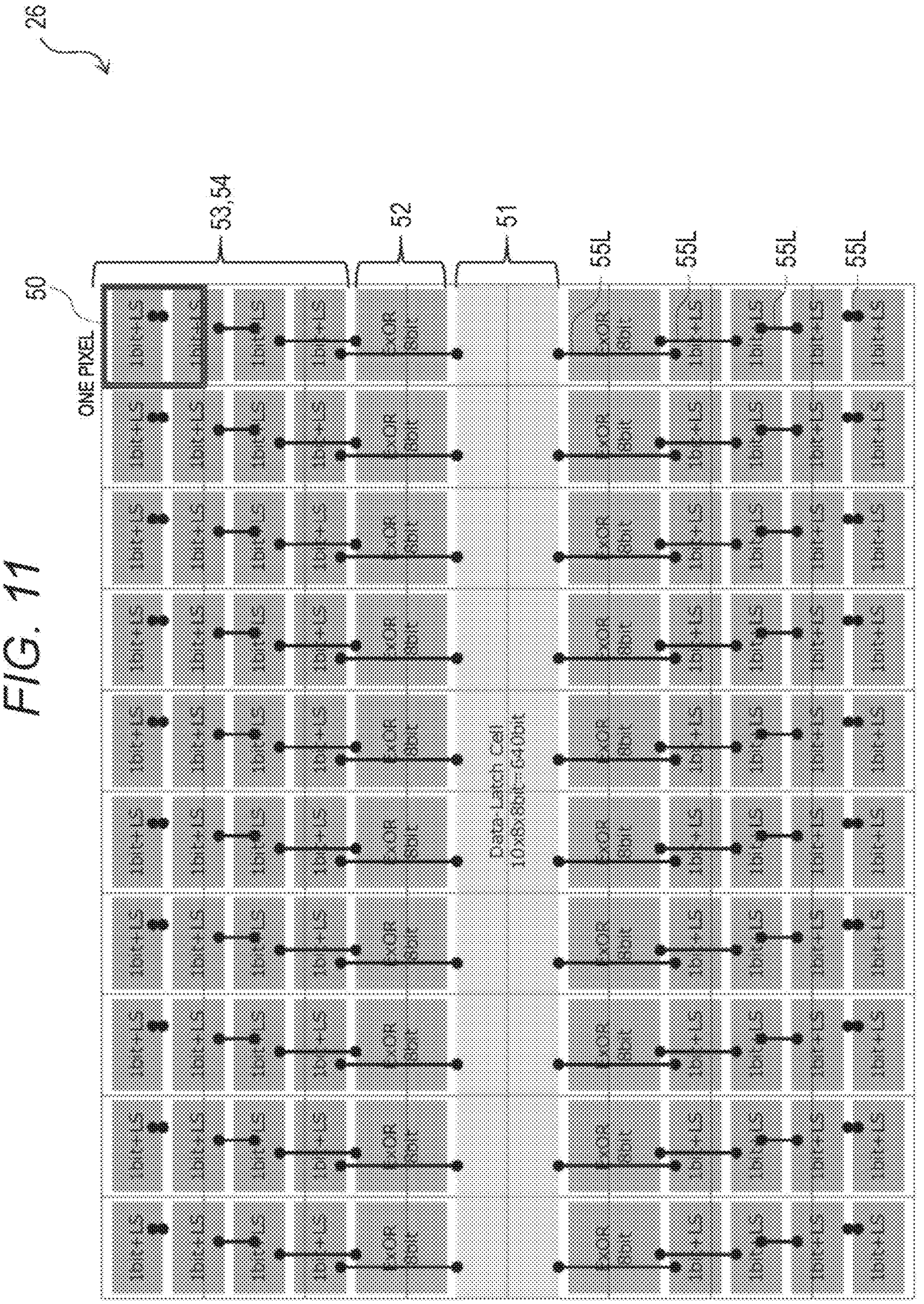
FIG. 11 is a diagram illustrating an example of a planar arrangement of a pixel according to the first embodiment.

FIG. 11 is a diagram illustrating an example of a planar arrangement of the pixels 50 according to the first embodiment. In the first embodiment, unlike the example described in the stacked structure, the pixel circuit may be disposed on one substrate. In this case, it is more preferable to improve the layout efficiency. The pixel region 26 includes, for example, a plurality of pixel groups having 10×8 pixels 50.

The first holding unit (data-latch) 51 is provided for each pixel 50. The first holding unit 51 is collectively disposed, for example, at the central portion of the pixel region 26. Thus, the layout efficiency can be improved. For example, since 8-bit data is held in one pixel 50, the first holding unit 51 of 10×8×8=640 bits is disposed.

For example, the PWM signal generation circuit 52 is disposed adjacent to the first holding unit 51 in the vertical direction of the paper surface of FIG. 11 so as to cover the first holding unit 51. The EXNOR circuit 521 and the AND circuit 522, which are logical operation units of the PWM signal generation circuit 52, are shared by a plurality of the pixels 50. For example, one PWM signal generation circuit 52 is shared by four pixels 50. Therefore, the PWM signal generation circuit 52 sequentially reads the image signal from the first holding unit 51, and writes the PWM signal to the second holding unit 54.

For example, the second holding unit 54 and the signal level conversion unit 53 are disposed adjacent to the PWM signal generation circuit 52 in the vertical direction of the paper surface of FIG. 11 so as to cover the PWM signal generation circuit 52. The second holding unit 54 and the signal level conversion unit 53 are provided for each pixel 50.

10×8 pixel electrodes 55 are disposed in a matrix. In FIG. 11, a wiring 55L that electrically connects the pixel electrode 55 with the second holding unit 54 and signal level conversion unit 53 is further provided.

Figure 12:
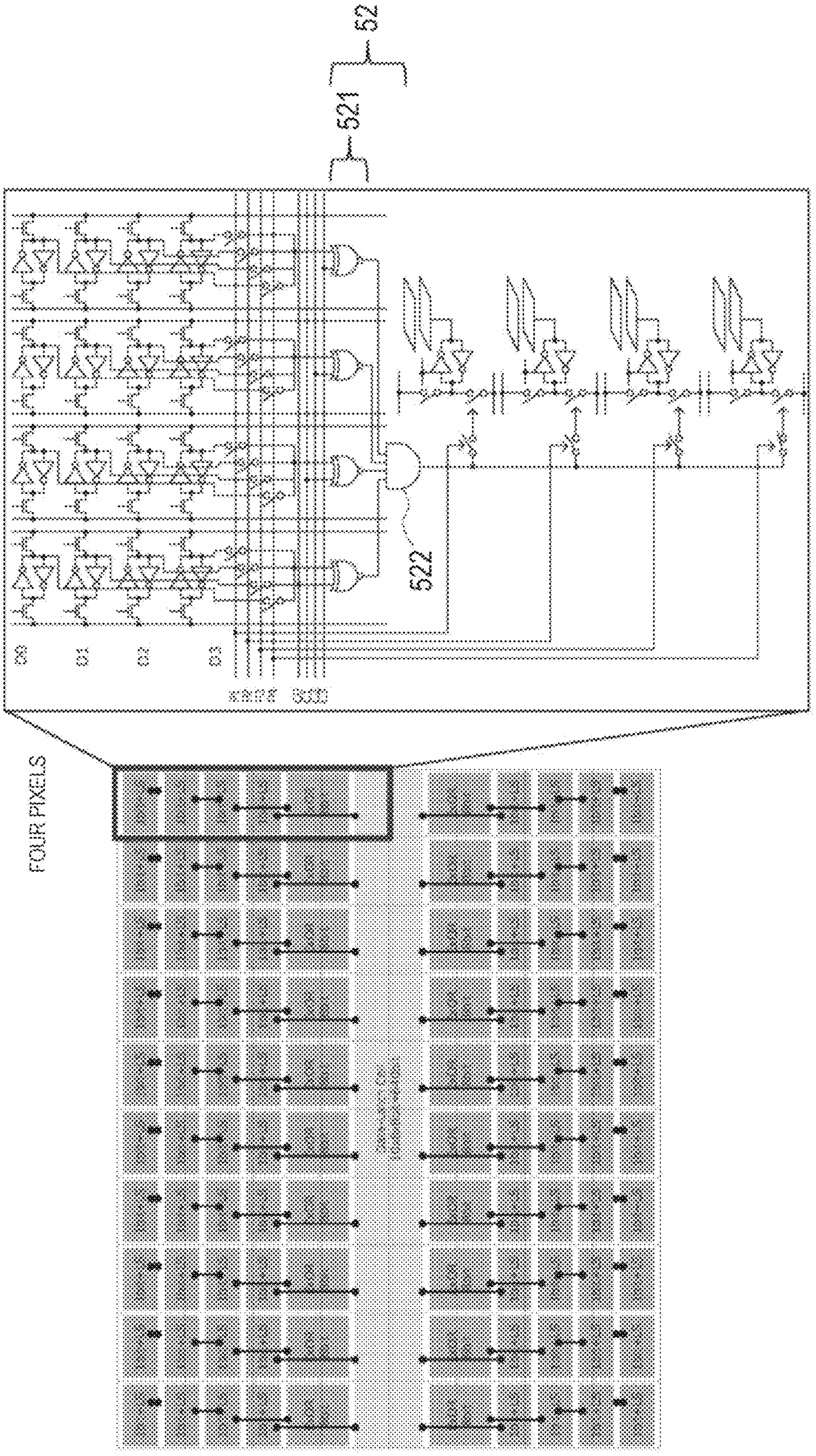
FIG. 12 is a diagram illustrating an example of a circuit configuration corresponding to four pixels illustrated in FIG. 11.

FIG. 12 is a diagram illustrating an example of the circuit configuration corresponding to four pixels 50 illustrated in FIG. 11. Note that FIG. 12 illustrates a case where 4-bit data is held in one pixel 50 for simplification.

Since the PWM signal generation circuit 52 is shared by four pixels 50, the number of elements can be reduced by, for example, about 45% as compared with a case where the PWM signal generation circuit 52 is provided for each pixel 50. As the bit depth increases, the number of elements can be further reduced.

As described above, according to the first embodiment, the PWM signal generation circuit 52 is disposed in the pixel 50. Therefore, the frame rate can be improved, and the power consumption can be suppressed.

As a comparative example, the PWM signal generation circuit 52 may be disposed outside the pixel region 26. In this case, the PWM signal generation circuit 52 reads the image signal from a memory (first holding unit 51) in the pixel region 26, and returns the PWM signal to the pixel region 26. In this case, in order to generate the PWM signal, it is necessary to read and write eight bits for each gradation. It is necessary to perform read driving for only one gradation expression, and it is difficult to increase the speed. That is, it is difficult to improve the frame rate. Furthermore, the power consumption increases due to charging and discharging of the wiring.

On the other hand, in the first embodiment, the PWM signal generation circuit 52 is disposed in the pixel 50. Moreover, in the first embodiment, the PWM signal generation circuit 52 is disposed close to the first holding unit 51. Thus, the distance of the wiring between the first holding unit 51 and the PWM signal generation circuit 52 can be shortened, and the influence of a load capacitance can be suppressed. That is, since the first holding unit 51 and the PWM signal generation circuit 52 are integrated in the pixel 50, the power consumption can be suppressed. Furthermore, since the PWM signal generation circuit 52 is disposed in the pixel 50, the number of data accesses can be reduced. In the first holding unit 51 in the pixel 50, for example, the PWM signal generation circuit 52 is only required to compare an image signal collectively held for 8 bits with a count signal input from the outside of the pixel 50. Therefore, the PWM signal generation circuit 52 may not perform the read driving for generating the PWM signal. Therefore, the frame rate can be improved.

Furthermore, in the first embodiment, the display device 1 performs color sequential driving. In the color sequential driving, when the frame rate (subframe rate) is low, a color breakup phenomenon is likely to occur. By improving the frame rate, the color breakup can be suppressed, and the visibility can be improved.

Furthermore, in the first embodiment, the gamma correction can be performed digitally without increasing the bit depth. Therefore, the necessary memory can be reduced.

First Modification Example of First Embodiment

Figure 13:
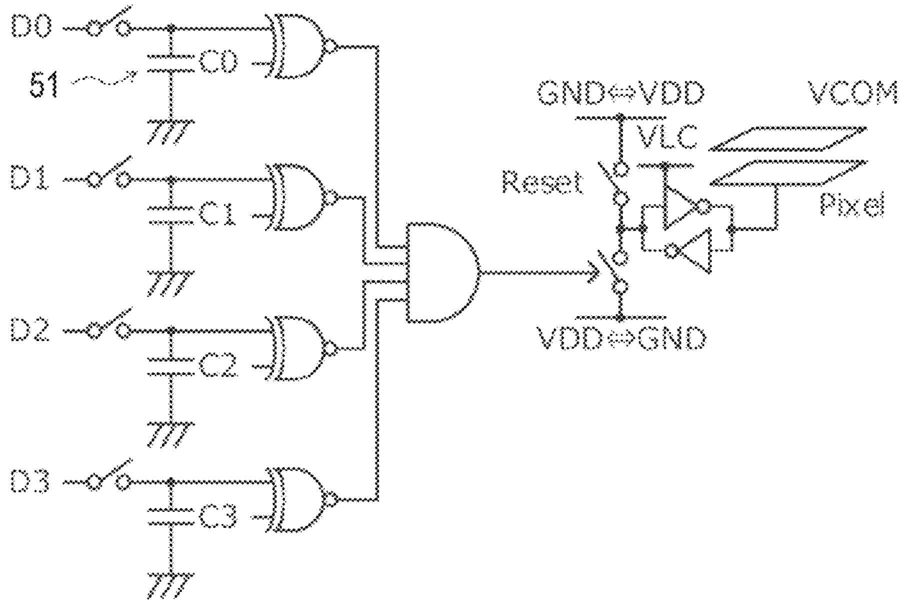
FIG. 13 is a diagram illustrating an example of a configuration of a pixel according to a first modification example of the first embodiment.

FIG. 13 is a diagram illustrating an example of a configuration of the pixel 50 according to a first modification example of the first embodiment. The first modification example of the first embodiment is different from the first embodiment in the configuration of the first holding unit 51.

The first holding unit 51 is, for example, a capacitor. The capacitor as the first holding unit 51 has one end electrically connected to the first input unit of the EXNOR circuit 521 and the other end electrically connected to the reference voltage node (ground).

As in the first modification example of the first embodiment, a capacitor may be used as the first holding unit 51. In this case, effects similar to those of the first embodiment can be obtained.

Second Embodiment

Figure 14:
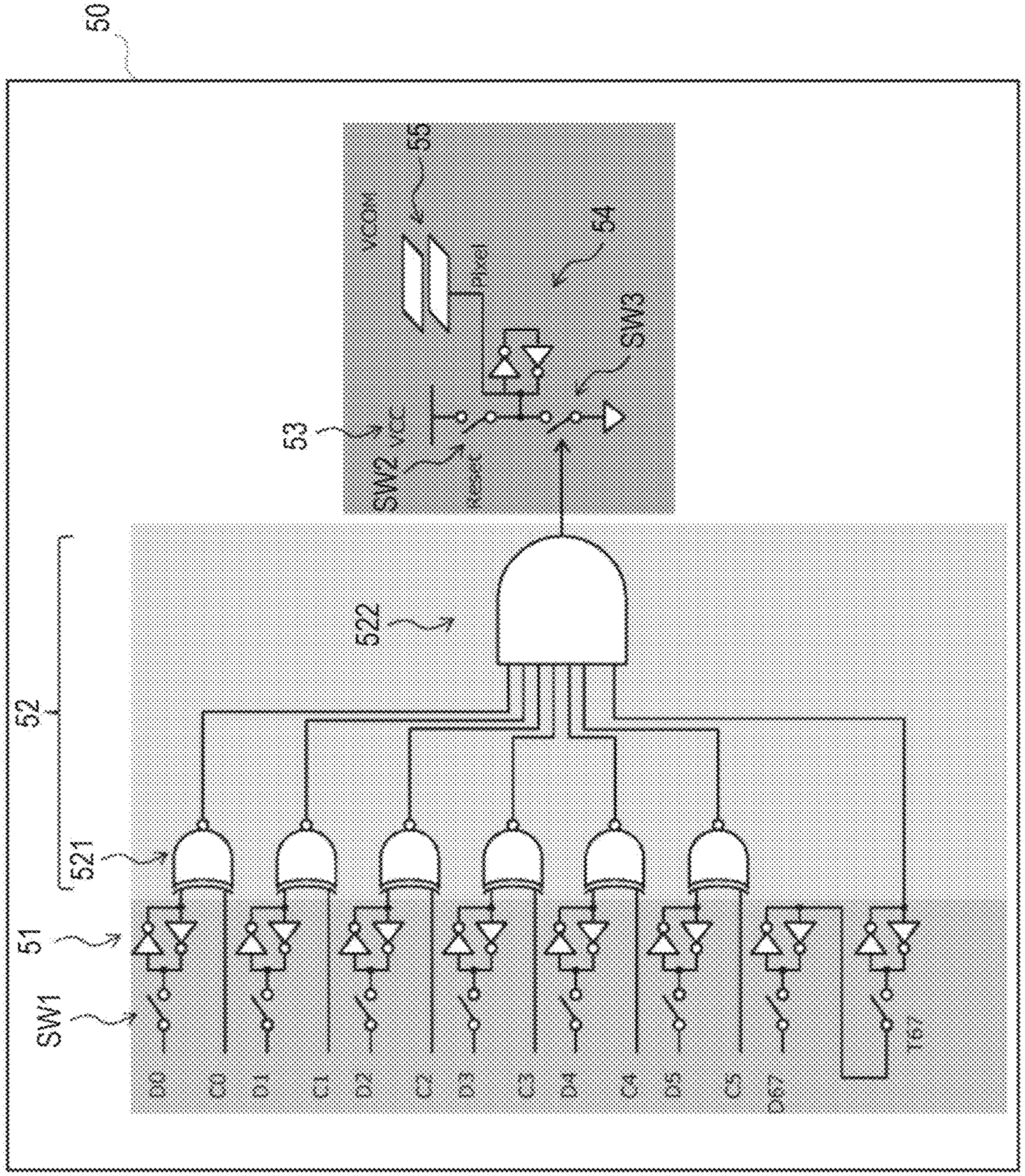
FIG. 14 is a diagram illustrating an example of a configuration of a pixel according to a second embodiment.

FIG. 14 is a diagram illustrating an example of a configuration of the pixel 50 according to a second embodiment. The second embodiment is different from the first embodiment in that the most significant bit (MSB) is segmented and driven.

For example, the first holding units 51 corresponding to bits [7:6] that are the most significant 2 bits are grouped (segmented) to correspond to one bit. Bits [7:6] are segmented and 0/1 is updated as needed. When the update bit=N as needed, the bit corresponding to the first holding unit 51 and the bit corresponding to the EXNOR circuit 521 can be reduced to 8−log 2(N)+1 bit.

In FIG. 14, in a case where the most significant 2 bits are divided four times, for example, data D67 obtained by combining data D6 and D7 is updated as needed as follows. While counting from zero to 63, when [7:6]=2'b11=3, the data D67 is one. While counting from 64 to 127, when [7:6]=2'b10=2, output signal data D67 is one. While counting from 128 to 191, when [7:6]=2'b01=1, the output signal data D67 is one. While counting from 192 to 255, when [7:6]=2'b00=0, the data D67 is zero.

In the first embodiment, writing of data to the first holding unit 51 is collectively performed. On the other hand, in the second embodiment, the data is written to the first holding unit 51 a plurality of times. By writing a bit having a slow count signal transition a plurality of times, for example, the number of elements such as the EXNOR circuits 521 or the like can be reduced. Furthermore, the number of input terminals of the AND circuit 522 can be reduced.

Note that in the example illustrated in FIG. 14, two first holding units 51 are connected in series to have two stages via a switch T67. By turning off the switch T67, next data D67 of the data D67 being processed by the PWM signal generation circuit 52 can be written.

Furthermore, the bit depth to be segmented is not limited to two. Furthermore, the most significant bit is not necessarily segmented.

As in the second embodiment, a plurality of high-order bits may be segmented. Note that in the second embodiment, a in the first embodiment, the frame rate can be improved, and the power consumption can be suppressed.

First Modification Example of Second Embodiment

Figure 15A:
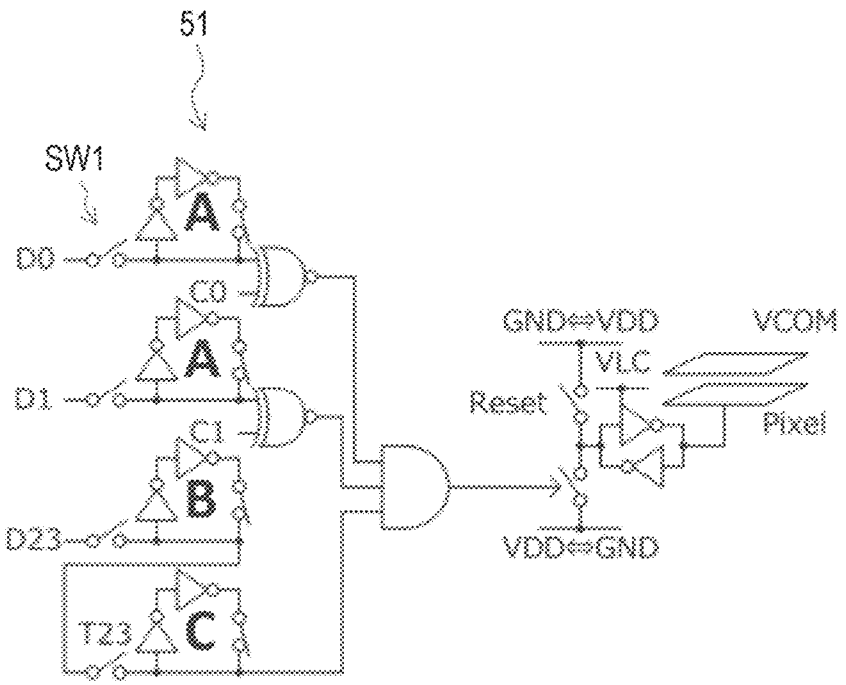
FIG. 15A is a diagram illustrating an example of a configuration of a pixel according to a first modification example of the second embodiment.

FIG. 15A is a diagram illustrating an example of a configuration of the pixel 50 according to a first modification example of the second embodiment. FIG. 15A illustrates an example in a case where 4-bit data is held in one pixel 50.

In the example illustrated in FIG. 15A, two first holding units 51 (third stage and fourth stage from the top) are connected in series to have two stages via a switch T23. Data D23 obtained by combining the data D2 and the data D3 is input to the first holding unit 51 of the third and fourth stages from the top.

Figure 15B:
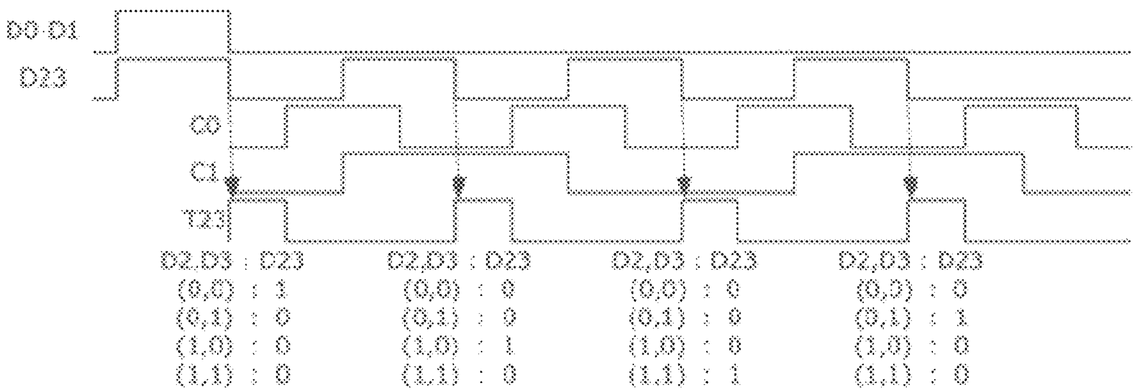
FIG. 15B is a timing chart illustrating an example of a count signal of a gray code counter of FIG. 15A.

FIG. 15B is a timing chart illustrating an example of a count signal of a gray code counter of FIG. 15A.

The first switches SW1 of the first and second stages in FIG. 15A are turned on at a timing when D0 and D1 in FIG. 15B become high. Thus, the first holding units 51 of the first stage (A) and the second stage (A) in FIG. 15A hold the data D0 and the data D1, respectively. Furthermore, the first switch SW1 of the third stage in FIG. 15A is turned on at a timing when D23 in FIG. 15B become high. Thus, the first holding unit 51 of the third stage (B) in FIG. 15A holds the data D23. Therefore, every time D23 in FIG. 15B becomes high, the data D23 held by the first holding unit 51 of the third stage (B) is updated. The first switch SW1 of the third stage in FIG. 15A is turned off, and the switch T23 is turned on at a timing when D23 in FIG. 15B become low and T23 becomes high. Thus, the first holding unit 51 of the fourth stage (C) in FIG. 15A holds the data D23. Therefore, every time D23 in FIG. 15B becomes low and T23 becomes high, the data D23 held by the first holding unit 51 of the fourth stage (C) is updated.

As in the first modification example of the second embodiment, the count signal of the gray code counter may be used. In this case, effects similar to those of the second embodiment can be obtained.

Third Embodiment

Figure 16:
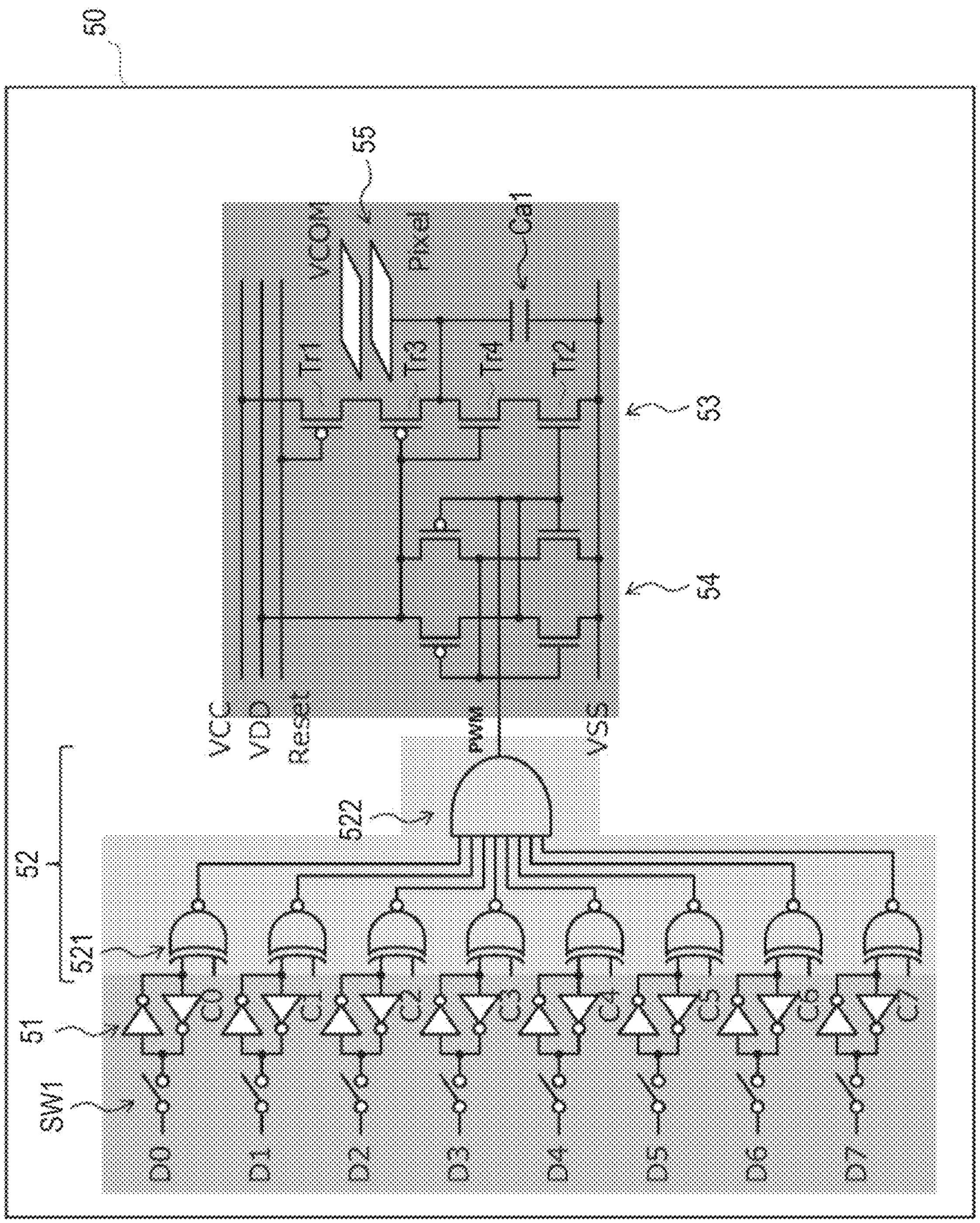
FIG. 16 is a diagram illustrating an example of a configuration of a pixel according to a third embodiment.

FIG. 16 is a diagram illustrating an example of a configuration of the pixel 50 according to a third embodiment. The third embodiment is different from the first embodiment in the configuration of the signal level conversion unit 53.

The second holding unit 54 includes a latch circuit including two inverter circuits. The inverter includes two different conductive transistors.

The second holding unit 54 operates at a voltage level between a voltage level (for example, 3 V) of a reference voltage node VDD and a voltage level (for example, 0 V) of a reference voltage node VSS. That is, the PWM signal generated by the PWM signal generation circuit 52 has a high level of 3 V and a low level of 0 V.

The signal level conversion unit 53 includes a first transistor Tr1, a second transistor Tr2, a third transistor Tr3, a fourth transistor Tr4, and a first capacitor Ca1.

The first transistor Tr1, the third transistor Tr3, the fourth transistor Tr4, and the second transistor Tr2 are connected in series in this order between the reference voltage node VCC and the reference voltage node VSS. The voltage level (for example, 6 V) of the reference voltage node VCC is higher than the voltage level of the reference voltage node VDD.

The first transistor Tr1 has one end electrically connected to the reference voltage node VCC and a gate to which a reset signal (first signal) is input. The first transistor Tr1 is, for example, a P-type (first conductive) metal-oxide-semiconductor field effect transistor (MOSFET).

The second transistor Tr2 has one end electrically connected to the reference voltage node VSS and a gate to which the outputs of the PWM signal generation circuit 52 and the second holding unit 54 are electrically connected. The second transistor Tr2 is, for example, an N-type (second conductive) MOSFET.

The third transistor Tr3 is connected between the first transistor Tr1 and the second transistor Tr2, and the reference voltage node VDD is electrically connected to the gate of the third transistor Tr3. The third transistor Tr3 is, for example, a P-type MOSFET.

The fourth transistor Tr4 is connected between the first transistor Tr1 and the second transistor Tr2, and the reference voltage node VDD is electrically connected to the gate of the fourth transistor Tr4. The fourth transistor Tr4 is, for example, an N-type MOSFET.

A node between the third transistor Tr3 and the fourth transistor Tr4 which are connected in series is electrically connected to the pixel electrode 55.

The first capacitor Ca1 is connected between the pixel electrode 55 and the reference voltage node VSS. For example, the first capacitor Ca1 is provided to hold a voltage during a period from time t12 to time t13 in FIG. 17, which will be described later. Note that the first capacitor Ca1 may be omitted.

Figure 17:
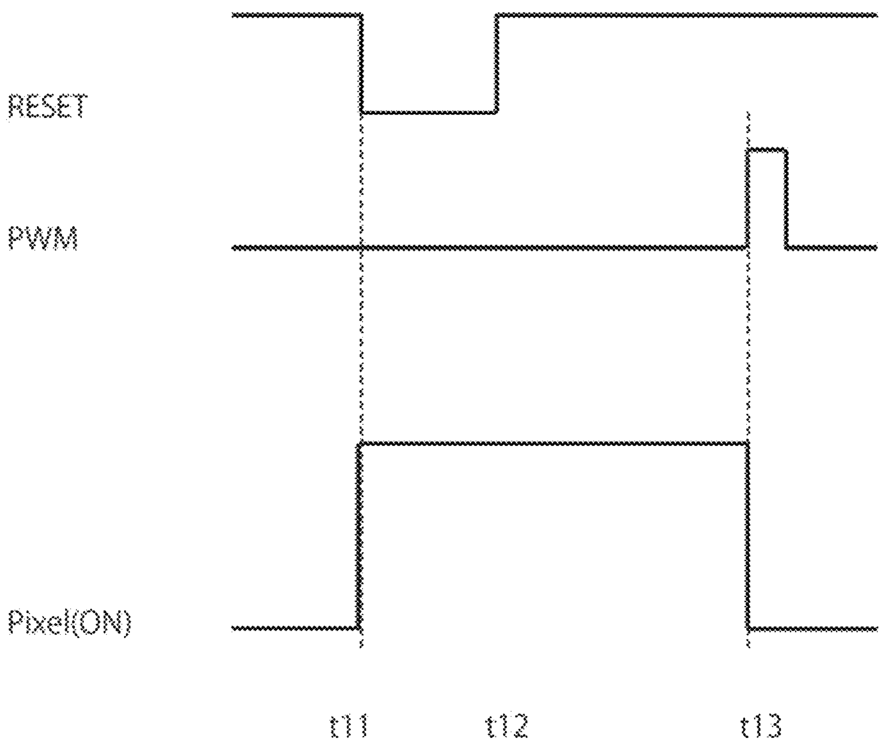
FIG. 17 is a timing chart illustrating an example of operation of a pixel according to the third embodiment.

FIG. 17 is a timing chart illustrating an example of the operation of the pixel 50 according to the third embodiment. "PWM" illustrated in FIG. 17 indicates the output of the AND circuit 522. "Pixel (ON)" indicates a voltage applied to the pixel electrode 55.

First, at time t11, the reset signal becomes low. Thus, the first transistor Tr1 is turned on. Furthermore, at time t11, zero is written to the second holding unit 54, and the voltage of the second holding unit 54 is low. Thus, the second transistor Tr2 is turned off. Since the gate of the third transistor Tr3 and the gate of the fourth transistor Tr4 are electrically connected to the reference voltage node VDD, the third transistor Tr3 and the fourth transistor Tr4 are continuously turned on. Therefore, the voltage of pixel electrode 55 becomes high.

Next, at time t12, the reset signal becomes high. Thus, the first transistor Tr1 is turned off.

Next, at time t13, the AND circuit 522 outputs one. Thus, the second transistor Tr2 is turned on. Therefore, the voltage of pixel electrode 55 becomes low.

Figure 18A:
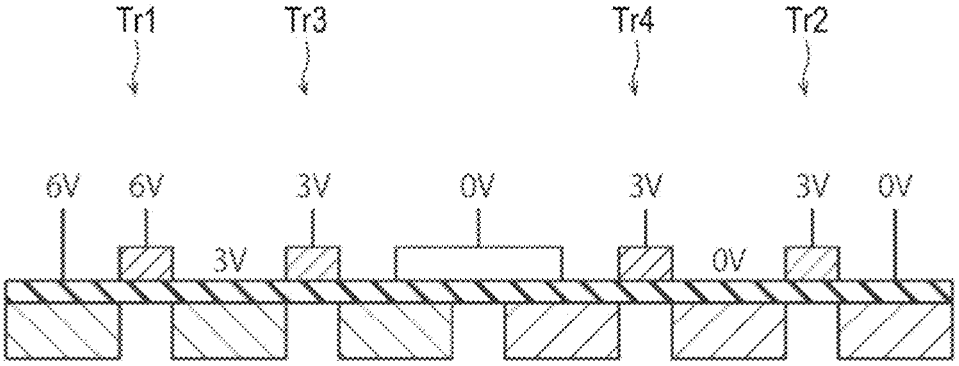
FIG. 18A is a cross-sectional view illustrating an example of a voltage relationship among a first transistor, a second transistor, a third transistor, and a fourth transistor according to the third embodiment.
Figure 18B:
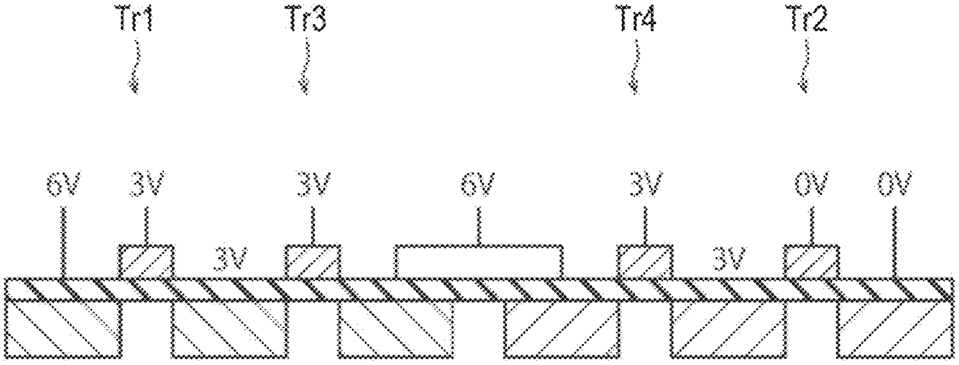
FIG. 18B is a cross-sectional view illustrating an example of a voltage relationship among a first transistor, a second transistor, a third transistor, and a fourth transistor according to the third embodiment.

FIGS. 18A and 18B are cross-sectional views illustrating an example of a voltage relationship among the first transistor Tr1, the second transistor Tr2, the third transistor Tr3, and the fourth transistor Tr4 according to the third embodiment. FIG. 18A illustrates a voltage relationship at a timing of time t13 in FIG. 17. FIG. 18B illustrates a voltage relationship at a timing of time t11 in FIG. 17.

In the reset signal applied to the gate of the first transistor Tr1, High indicates 6 V and Low indicates 3 V In the voltage of the second holding unit 54, which is applied to the gate of the second transistor Tr2, High indicates 3 V and Low indicates 0 V Furthermore, as described above, the voltage applied to the gate of the third transistor Tr3 and the gate of the fourth transistor Tr4 is 3 V.

In the voltage relationship illustrated in FIGS. 18A and 18B, the maximum value of the drain-source voltage of the transistor is 3 V, and the maximum value of the gate-source voltage is 3 V The gate-source voltages and the drain-source voltages of all the transistors are equal to or less than a voltage VDD. Therefore, the breakdown voltage of the transistor can be lowered. That is, a low breakdown voltage transistor can be used for all the transistors. As a result, the size of the transistor can be further reduced, and the pixel 50 can be more easily miniaturized.

As in the third embodiment, the configuration of the signal level conversion unit 53 may be changed. Note that in the second embodiment, as in the first embodiment, the power consumption can be suppressed, and the frame rate can be improved.

Furthermore, the signal level conversion unit (level shift circuit) 53 according to the third embodiment may be incorporated in the pixel circuit including the PWM signal generation circuit 52 as described above, or may be an independent pixel circuit.

First Modification Example of Third Embodiment

Figure 19:
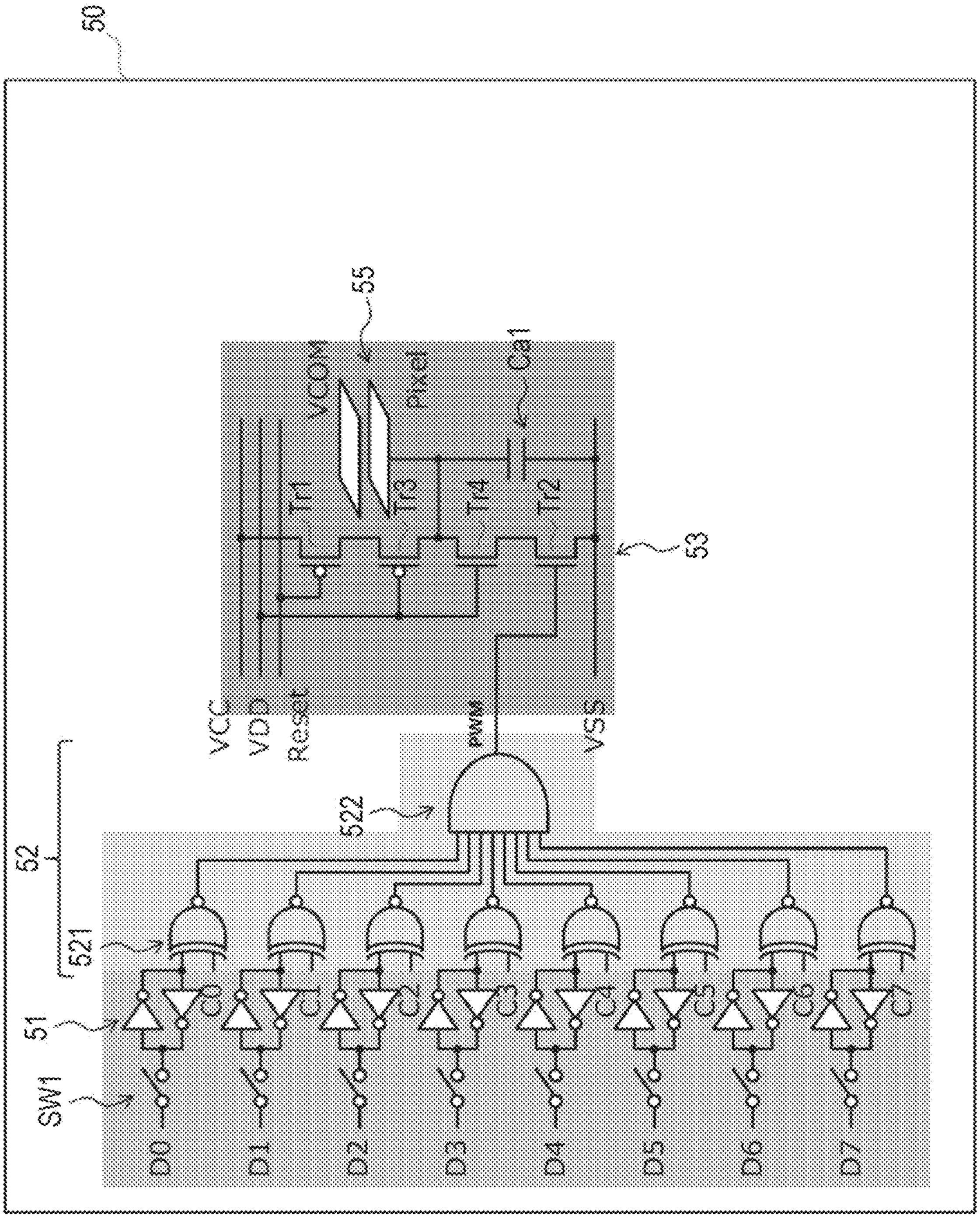
FIG. 19 is a diagram illustrating an example of a configuration of a pixel according to a first modification example of the third embodiment.

FIG. 19 is a diagram illustrating an example of a configuration of the pixel 50 according to a first modification example of the third embodiment. The first modification example of the third embodiment is different from the third embodiment in that the second holding unit 54 is not provided.

The output unit of the PWM signal generation circuit 52 is electrically connected to the gate of the second transistor Tr2. Therefore, the PWM signal is input to the gate of the second transistor Tr2.

The operation of the signal level conversion unit 53 according to the first modification example of the third embodiment is substantially the same as that of the signal level conversion unit 53 according to the third embodiment.

As in the first modification example of the third embodiment, the second holding unit 54 may not be provided. In this case, effects similar to those of the third embodiment can be obtained.

Second Modification Example of Third Embodiment

Figure 20:
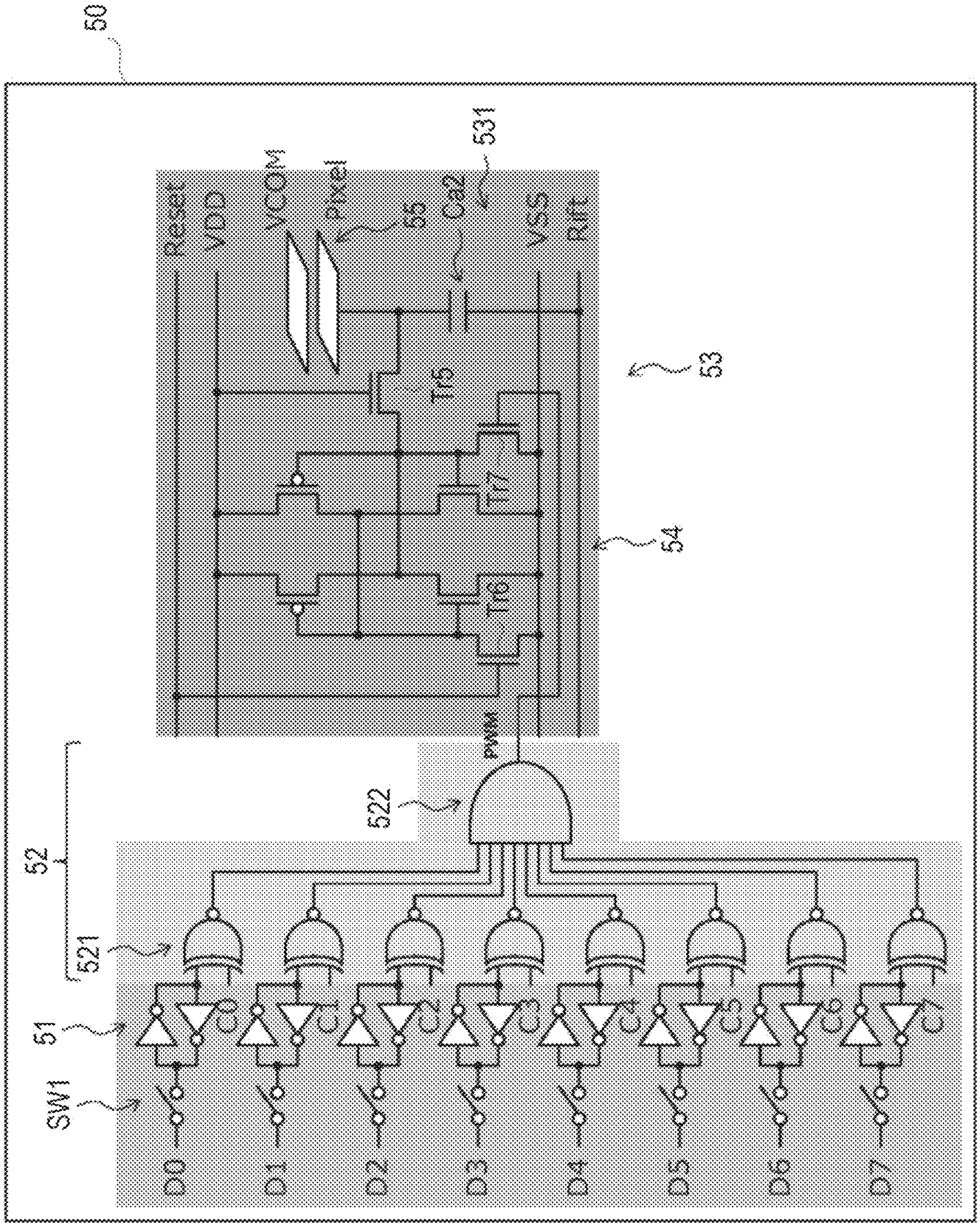
FIG. 20 is a diagram illustrating an example of a configuration of a pixel according to a second modification example of the third embodiment.

FIG. 20 is a diagram illustrating an example of a configuration of the pixel 50 according to a second modification example of the third embodiment. The second modification example of the third embodiment is different from the third embodiment in the configuration of the signal level conversion unit 53.

The signal level conversion unit 53 includes a fifth transistor Tr5, a sixth transistor Tr6, a seventh transistor Tr7, and a voltage booster 531.

The fifth transistor Tr5 is connected between one end of the second holding unit 54 and the pixel electrode 55. The gate of the fifth transistor Tr5 is electrically connected to the reference voltage node VDD. The fifth transistor Tr5 is, for example, an N-type MOSFET.

The sixth transistor Tr6 is connected between the other end of the second holding unit 54 and the reference voltage node VSS, and the reset signal is input to the gate of the sixth transistor Tr6. The sixth transistor Tr6 is, for example, an N-type MOSFET.

The seventh transistor Tr7 is connected between one end of the second holding unit 54 and the reference voltage node VSS, and the output unit of the AND circuit 522 is electrically connected to the gate of the seventh transistor Tr7. The seventh transistor Tr7 is, for example, an N-type MOSFET.

The voltage booster 531 increases the voltage of the pixel electrode 55 by capacitive coupling. The voltage booster 531 includes a second capacitor Ca2. The second capacitor Ca2 is connected between a signal line Rift and the pixel electrode 55.

Figure 21:
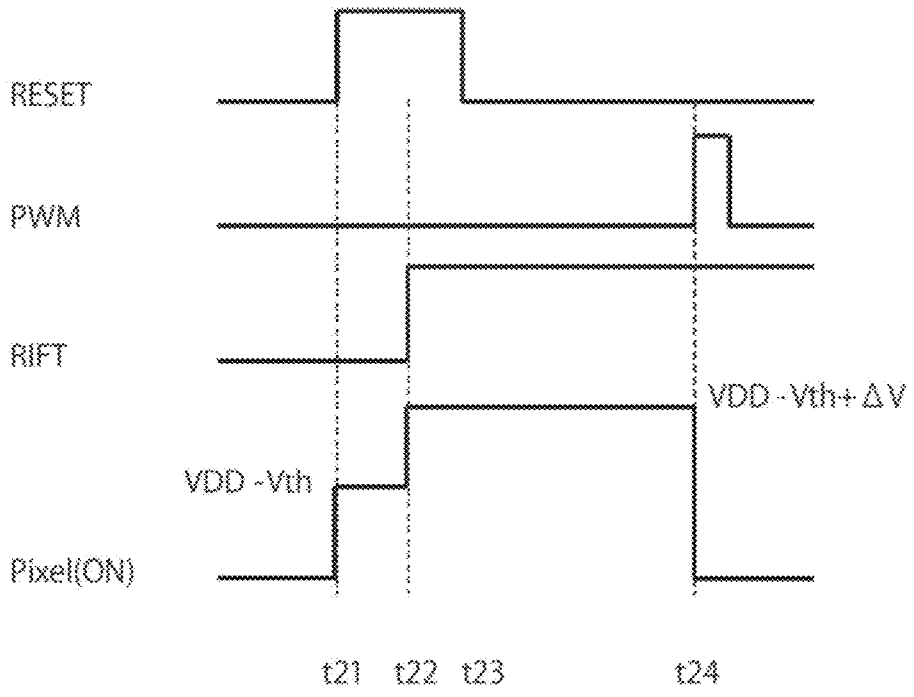
FIG. 21 is a timing chart illustrating an example of operation of a pixel according to the second modification example of the third embodiment.

FIG. 21 is a timing chart illustrating an example of the operation of the pixel 50 according to the second modification example of the third embodiment.

First, at time t21, the reset signal becomes high. Thus, the sixth transistor Tr6 is turned on. As a result, the voltage at the other end of the second holding unit 54 becomes low (voltage VSS). Moreover, the voltage at one end of the second holding unit 54 becomes high (voltage VDD). Since the fifth transistor Tr5 has a gate electrically connected to the reference voltage node VDD, the fifth transistor Tr5 are continuously turned on. Furthermore, since the gate of the fifth transistor Tr5 is fixed at the voltage VDD, the source voltage of the fifth transistor Tr5 becomes VDD-Vth. Vth is a threshold voltage of the fifth transistor Tr5. Thus, the voltage of the pixel electrode 55 becomes VDD-Vth.

Next, at time t22, the signal line Rift becomes high. Due to capacitive coupling of the second capacitor Ca2, the voltage of the pixel electrode 55 increases by ΔV Thus, the voltage of pixel electrode 55 becomes VDD-Vth+ΔV. VDD-Vth+ΔV is a voltage higher than the voltage VDD.

Next, at time t23, the reset signal becomes low. Thus, the sixth transistor Tr6 is turned off.

Next, at time t24, the AND circuit 522 outputs one. Thus, the seventh transistor Tr7 is turned on. Therefore, the voltage of pixel electrode 55 becomes low.

In the second embodiment, the gate-source voltages and the drain-source voltages of all the transistors are equal to or less than a voltage VDD. Therefore, the breakdown voltage of the transistor can be lowered. That is, a low breakdown voltage transistor can be used for all the transistors. As a result, the size of the transistor can be further reduced, and the pixel 50 can be more easily miniaturized.

As in the second modification example of the third embodiment, the voltage level may be converted using the capacitive coupling. In this case, effects similar to those of the third embodiment can be obtained.

Third Modification Example of Third Embodiment

Figure 22:
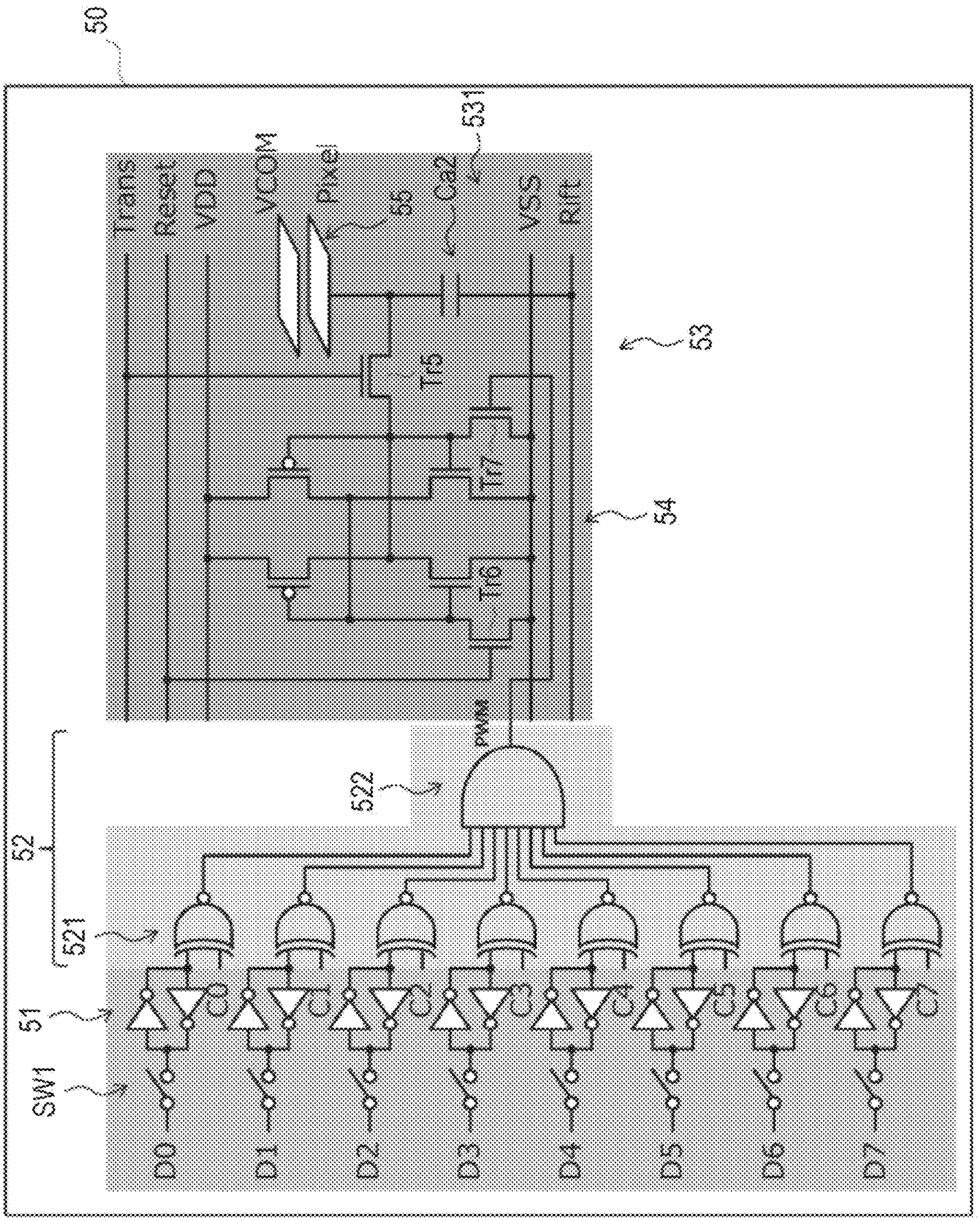
FIG. 22 is a diagram illustrating an example of a configuration of a pixel according to a third modification example of the third embodiment.

FIG. 22 is a diagram illustrating an example of a configuration of the pixel 50 according to a third modification example of the third embodiment. The third modification example of the third embodiment is different from the second modification example of the third embodiment in that a signal line Trans is provided.

The gate of the fifth transistor Tr5 is electrically connected to the signal line Trans. A pulse signal is input from the signal line Trans to the gate of the fifth transistor Tr5. The high voltage of the signal line Trans is, for example, the voltage VDD. The low voltage of the signal line Trans is a logic voltage level lower than the voltage VDD. Therefore, the low voltage of the signal line Trans is higher than the voltage VSS, and is, for example, the output level at which the AND circuit 522 outputs one. Furthermore, the fifth transistor Tr5 is continuously turned on.

Figure 23:
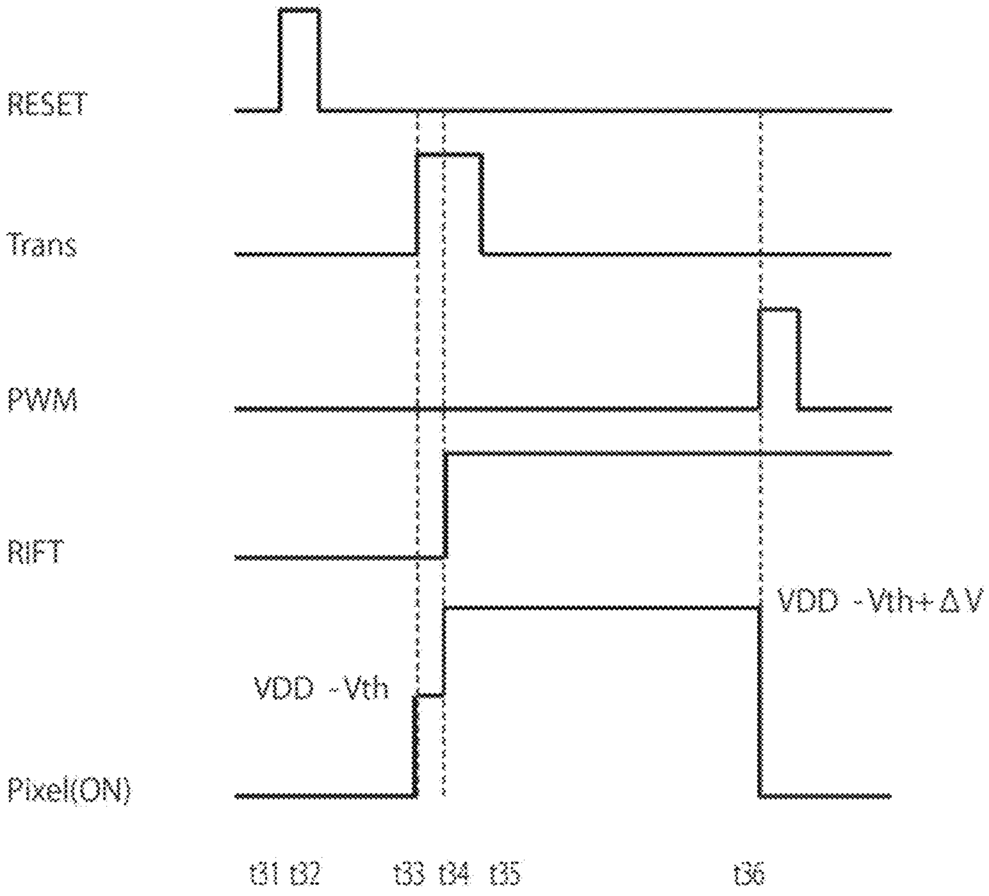
FIG. 23 is a timing chart illustrating an example of operation of a pixel according to the third modification example of the third embodiment.

FIG. 23 is a timing chart illustrating an example of the operation of the pixel 50 according to the third modification example of the third embodiment.

First, at time t31, the reset signal becomes high. Thus, the sixth transistor Tr6 is turned on. As a result, the voltage at the other end of the second holding unit 54 becomes low (voltage VSS). Moreover, the voltage at one end of the second holding unit 54 becomes high (voltage VDD).

Next, at time t32, the reset signal becomes low. Thus, the sixth transistor Tr6 is turned off.

Next, at time t33, the signal line Trans becomes high. The high voltage of the signal line Trans is, for example, the voltage VDD. Therefore, the source voltage of the fifth transistor Tr5 becomes VDD-Vth. Thus, the voltage of the pixel electrode 55 becomes VDD-Vth.

Next, at time t34, the signal line Rift becomes high. Due to capacitive coupling of the second capacitor Ca2, the voltage of the pixel electrode 55 increases by ΔV. Thus, the voltage of pixel electrode 55 becomes VDD-Vth+ΔV VDD-Vth+ΔV is a voltage higher than the voltage VDD.

Next, at time t35, the signal line Trans becomes low.

Next, at time t36, the AND circuit 522 outputs one. Thus, the seventh transistor Tr7 is turned on. Therefore, the voltage of pixel electrode 55 becomes low.

In the circuit configuration illustrated in FIG. 22, the gate-source voltage and the drain-source voltage of the transistor are equal to or greater than the voltage VDD. However, the driving as in the second modification example of the third embodiment illustrated in FIGS. 20 and 21 can be performed.

Fourth Modification Example of Third Embodiment

Figure 24:
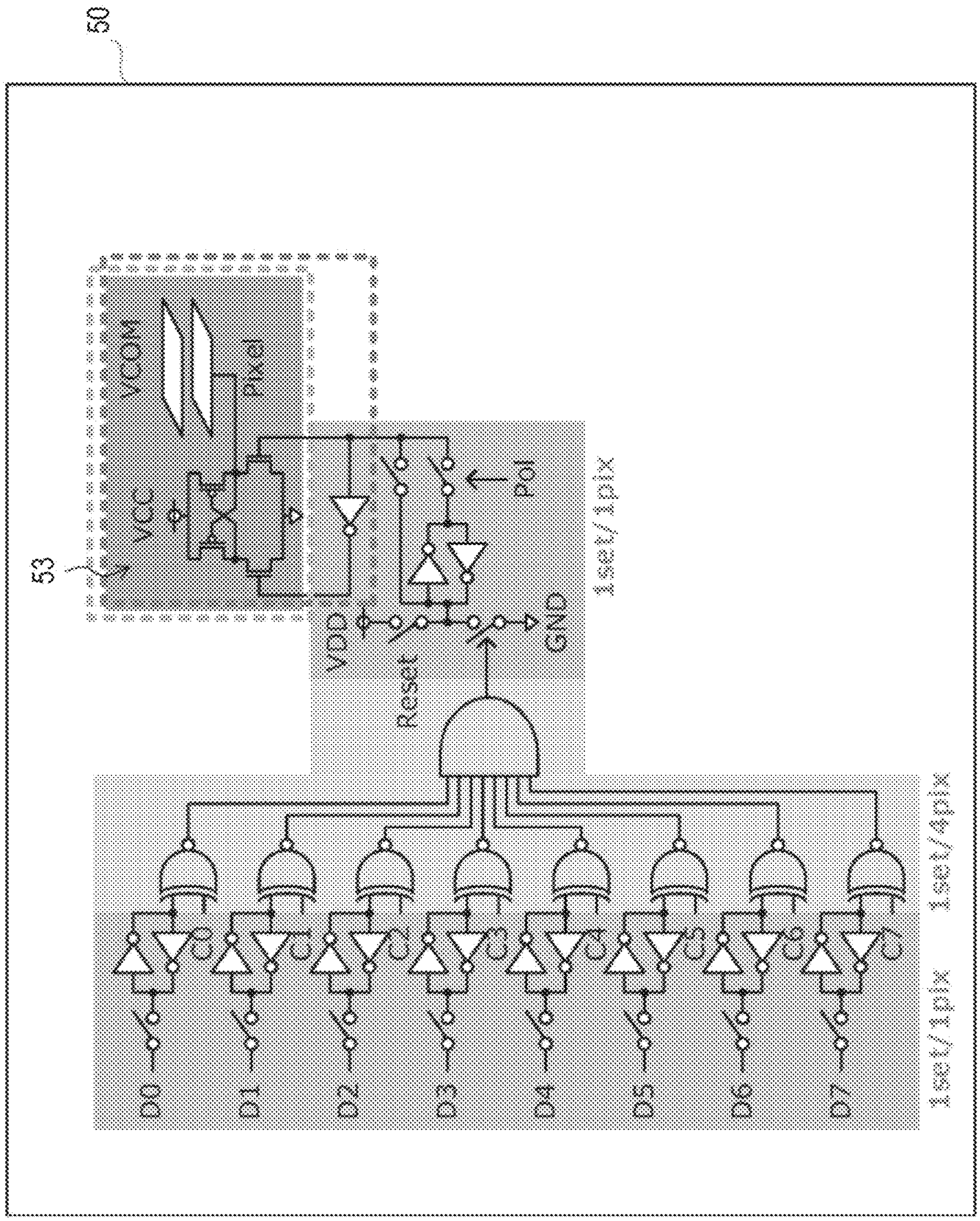
FIG. 24 is a diagram illustrating an example of a configuration of a pixel according to a fourth modification example of the third embodiment.

FIG. 24 is a diagram illustrating an example of a configuration of the pixel 50 according to a fourth modification example of the third embodiment. The configuration of the signal level conversion unit can be a circuit configuration illustrated in FIG. 24.

Fifth Modification Example of Third Embodiment

Figure 25:
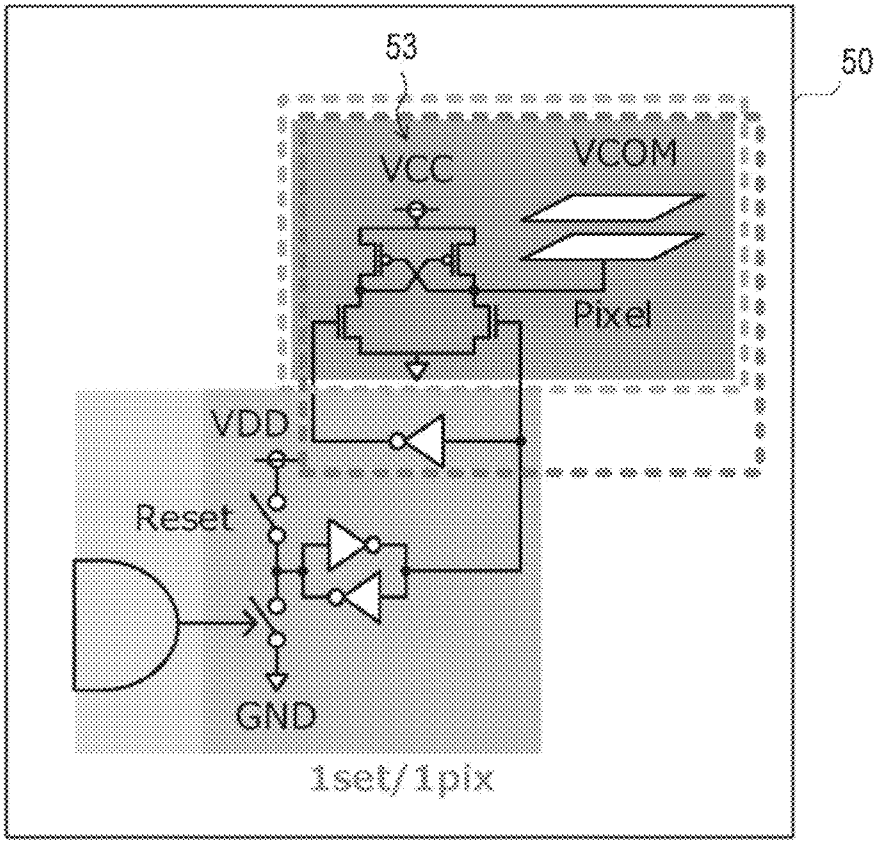
FIG. 25 is a diagram illustrating an example of a configuration of a pixel according to a fifth modification example of the third embodiment.

FIG. 25 is a diagram illustrating an example of a configuration of the pixel 50 according to a fifth modification example of the third embodiment. The configuration of the signal level conversion unit 53 can be a circuit configuration illustrated in FIG. 25.

Sixth Modification Example of Third Embodiment

Figure 26:
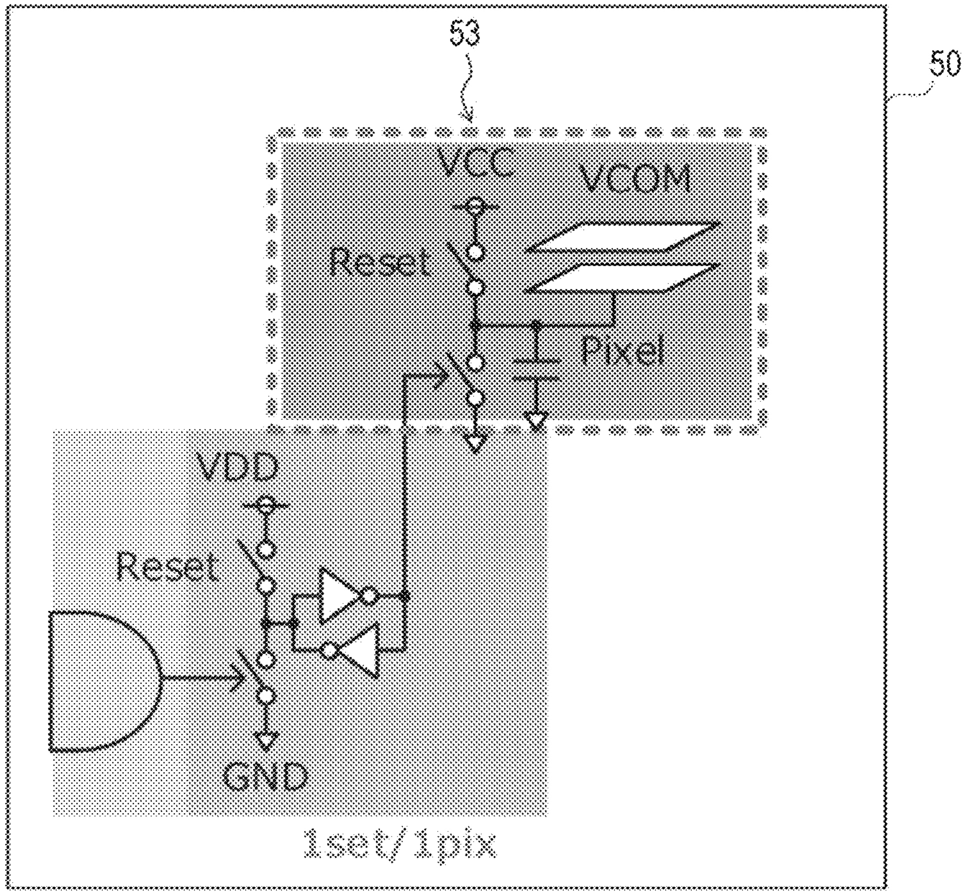
FIG. 26 is a diagram illustrating an example of a configuration of a pixel according to a sixth modification example of the third embodiment.

FIG. 26 is a diagram illustrating an example of a configuration of the pixel 50 according to a sixth modification example of the third embodiment. The configuration of the signal level conversion unit 53 can be a circuit configuration illustrated in FIG. 26.

Seventh Modification Example of Third Embodiment

Figure 27:
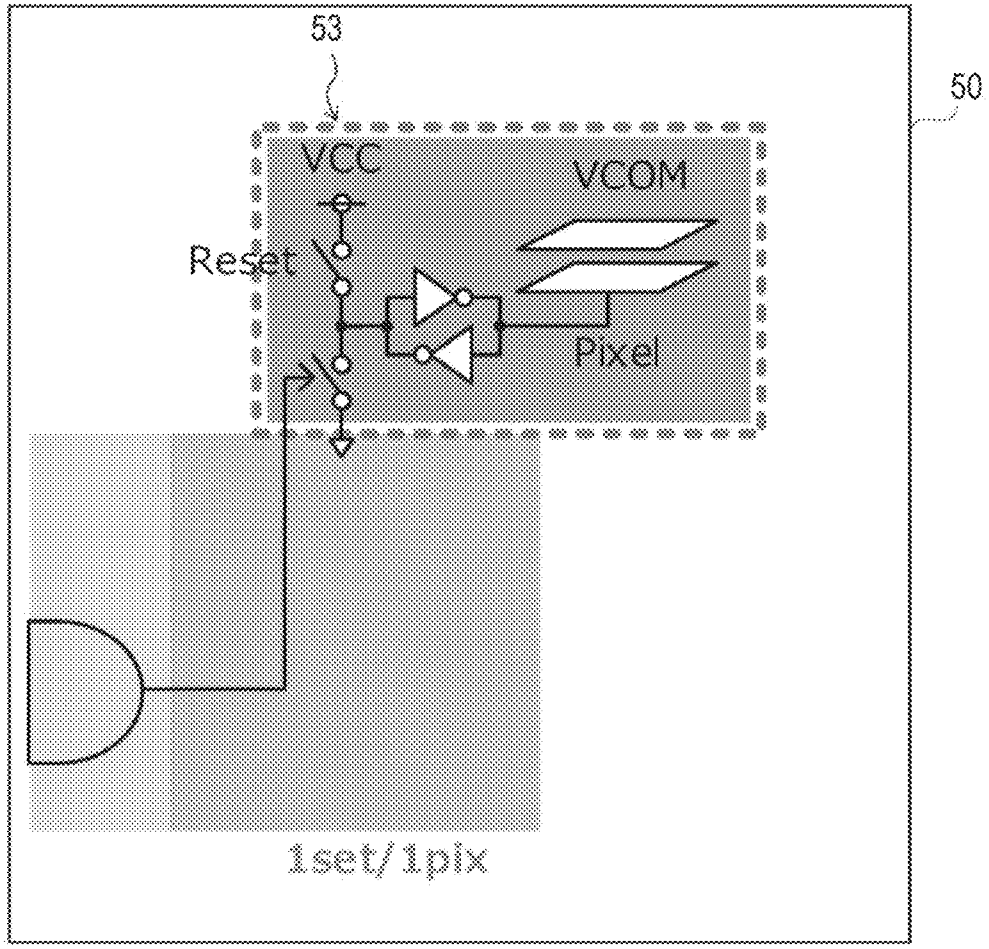
FIG. 27 is a diagram illustrating an example of a configuration of a pixel according to a seventh modification example of the third embodiment.

FIG. 27 is a diagram illustrating an example of a configuration of the pixel 50 according to a seventh modification example of the third embodiment. The configuration of the signal level conversion unit 53 can be a circuit configuration illustrated in FIG. 27.

Fourth Embodiment

Figure 28:
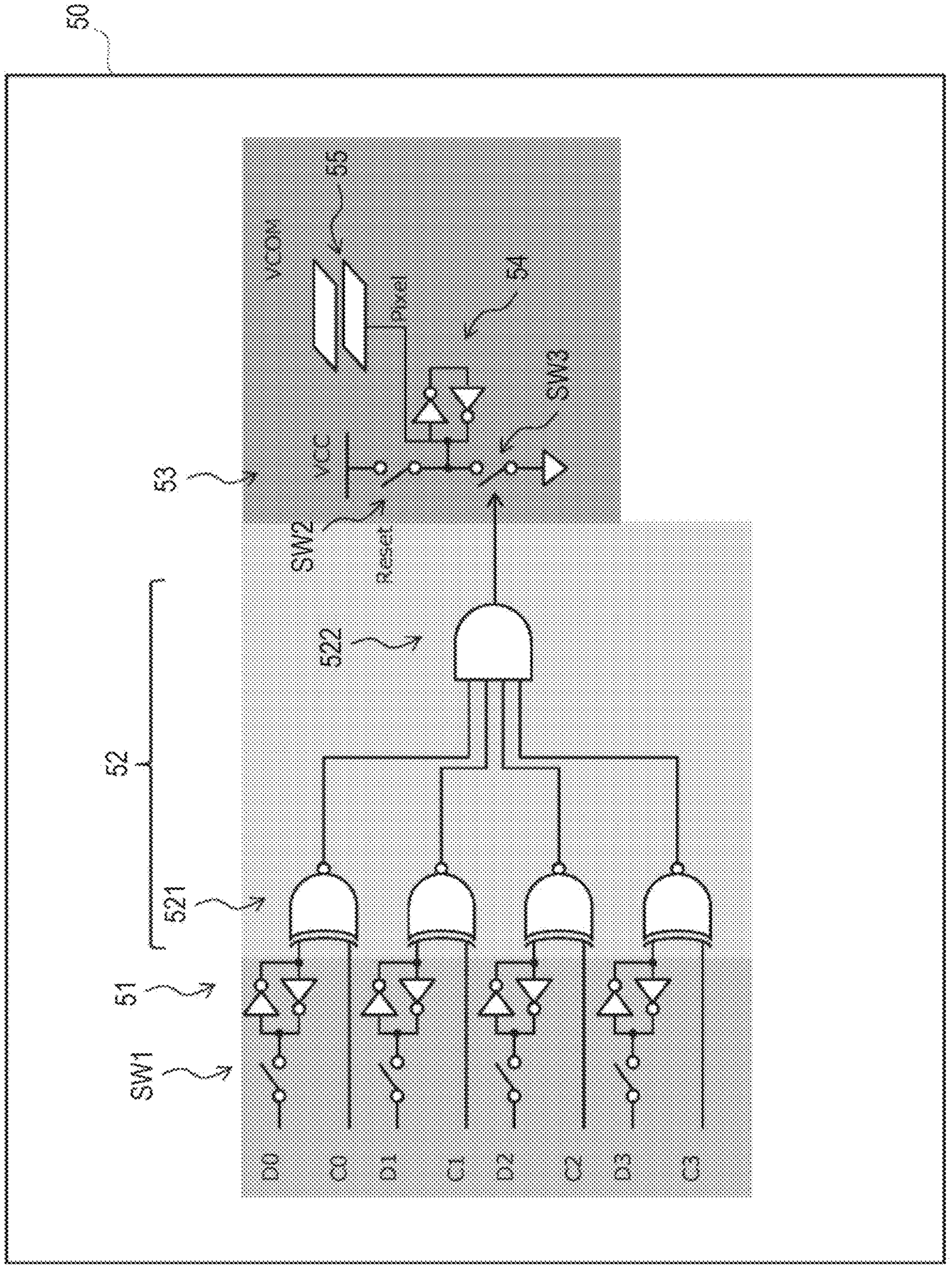
FIG. 28 is a diagram illustrating an example of a configuration of a pixel according to a fourth embodiment.

FIG. 28 is a diagram illustrating an example of a configuration of the pixel 50 according to a fourth embodiment. The fourth embodiment is different from the first embodiment in that time division within a subframe is performed.

Four first holding units 51 and four EXNOR circuits 521 are provided. The data Dx (x=0, 1, 2, 3) is input to the first holding unit 51, and the count signal Cx (x=0, 1, 2, 3) is input to the second input unit of the EXONOR circuit.

Total 8 bits of bits [7:0] are divided into two, for example, total 4 bits of bits [7] and [2:0] and total 4 bits of bits [6:3]. That is, the number of the first holding units 51 and the number of the EXNOR circuits 521 can be halved to four as compared with FIG. 2 of the first embodiment. Furthermore, the number of input terminals of the AND circuit 522 also can be halved. As a result, the circuit area can be further reduced.

That is, a plurality of bits of the image signal is time-divided a plurality of times in one subframe. The PWM signal generation circuit 52 generates a PWM signal time-divided a plurality of times in one subframe according to an image signal time-divided into a plurality of bits.

Figure 29:
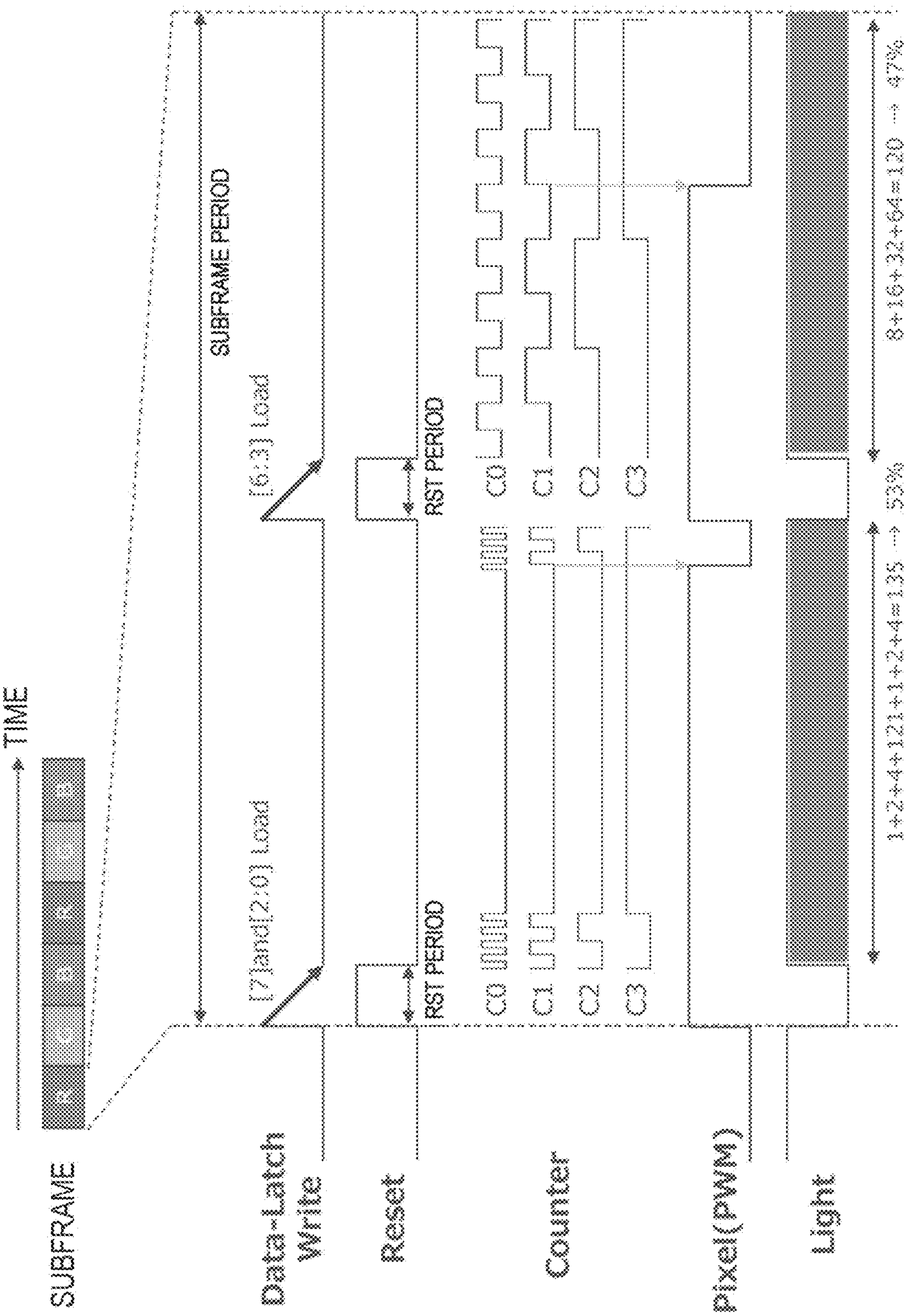
FIG. 29 is a diagram illustrating an example of operation of a pixel according to the fourth embodiment.

FIG. 29 is a diagram illustrating an example of the operation of the pixel 50 according to the fourth embodiment. The subframe is divided into a first half and a second half.

First, in a first half reset period, a 4-bit digital image signal of bits [7] and [2:0] is written to the first holding unit 51 of the data from D0 to D3.

Furthermore, one (voltage VCC) is written to the second holding unit 54 (pixel 50) by reset.

Next, the count signals C0 to C3 are input from the global counter 30. Note that the count signal C3 is adjusted to an unbalanced count signal so as to be, for example, 7:128.

Next, the AND circuit 522 outputs one at a timing when the data of the first holding unit 51 of the first half and the count value of the first half all match. Thus, zero (ground voltage) is written to the second holding unit 54.

In this manner, the first half counting ends.

Next, in a second half reset period, a 4-bit digital image signal of bits [6:3] is written into the first holding unit 51 of the data from D0 to D3.

Furthermore, one (voltage VCC) is written to the second holding unit 54 (pixel 50) by reset.

Next, the count signals C0 to C3 are input from the global counter 30.

Next, the AND circuit 522 outputs one at a timing when the data of the first holding unit 51 of the second half and the count value of the second half all match. Thus, zero (ground voltage) is written to the second holding unit 54.

Here, the digital image signal is time-divided according to the weight of the bit. More specifically, the digital image signal is time-divided such that weights of bits are substantially equal.

As a comparative example, in a case where the bit is divided into 4 bits of bits [7:4] and 4 bits of bits [3:0], the weights of the bits are biased in the first half and the second half. The weight of bits [7:4] is 240, and the weight of bits [3:0] is 15. In this case, the width of the PWM signal in the second half becomes short. There is a case where a delay occurs in the rising and falling of the PWM signal that is an electric signal when the liquid crystal is driven. Due to this delay, in a case where the width of the PWM is short, there is a possibility that the PWM period ends without starting driving of the liquid crystal.

On the other hand, in the fourth embodiment, the weights of the bits of the digital image signal are substantially equal. The weights of bits [7] and [2:0] are 135, and the weight of bits [6:3] is 120. Thus, the ratio of the weights of bits [7] and [2:0] is 135/255×100=53%, and the ratio of the weight of the bits [6:3] is 120/255×100=47%. Therefore, the influence of the delay in driving the liquid crystal can be suppressed.

As in the fourth embodiment, it may be driven in a time-division manner in the subframe. Note that in the fourth embodiment, as in the first embodiment, the power consumption can be suppressed, and the frame rate can be improved.

First Modification Example of Fourth Embodiment

Figure 30:
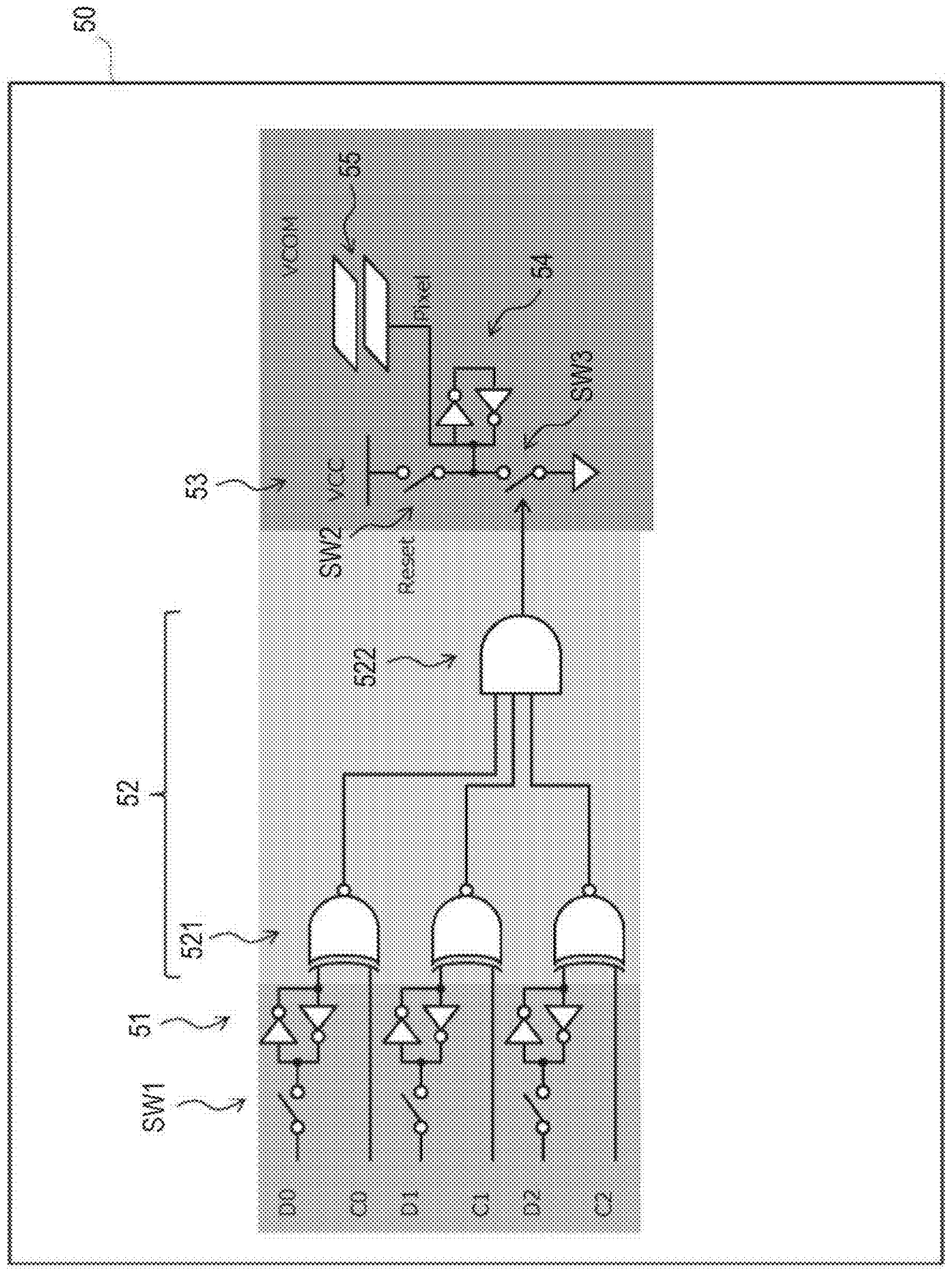
FIG. 30 is a diagram illustrating an example of a configuration of a pixel according to a first modification example of the fourth embodiment.

FIG. 30 is a diagram illustrating an example of a configuration of the pixel 50 according to a first modification example of the fourth embodiment. The first modification example of the third embodiment is different from the fourth embodiment in the number of the time divisions.

Three first holding units 51 and three EXNOR circuits 521 are provided. The data Dx (x=0, 1, 2) is input to the first holding unit 51, and the count signal Cx (x=0, 1, 2) is input to the second input unit of the EXONOR circuit.

Total 8 bits of bits [7:0] are divided into three, for example, total 2 bits of bits [7] and [0], total 3 bits of bits [6] and [1:0], and total 3 bits of bits [5:3]. That is, the number of the first holding units 51 and the number of the EXNOR circuits 521 can be reduced to three as compared with FIG. 2 of the first embodiment. Furthermore, the number of input terminals of the AND circuit 522 also can be reduced. As a result, the circuit area can be further reduced.

Note that the driving method is substantially the same as that for the pixel 50 of the fourth embodiment.

Furthermore, the number of divisions is not limited to three, and may be, for example, four. Total 8 bits of bits [7:0] are divided into four, for example, total 2 bits of bits [7] and [0], total 2 bits of bits [6] and [1], total 2 bits of bits [5] and [2], and total 2 bits of bits [4] and [3]. In this case, the number of the first holding units 51 and the number of the EXNOR circuits 521 can be reduced to two.

As in the first modification example of the fourth embodiment, the number of divisions may be changed. In this case, effects similar to those of the fourth embodiment can be obtained.

Second Modification Example of Fourth Embodiment

Figure 31:
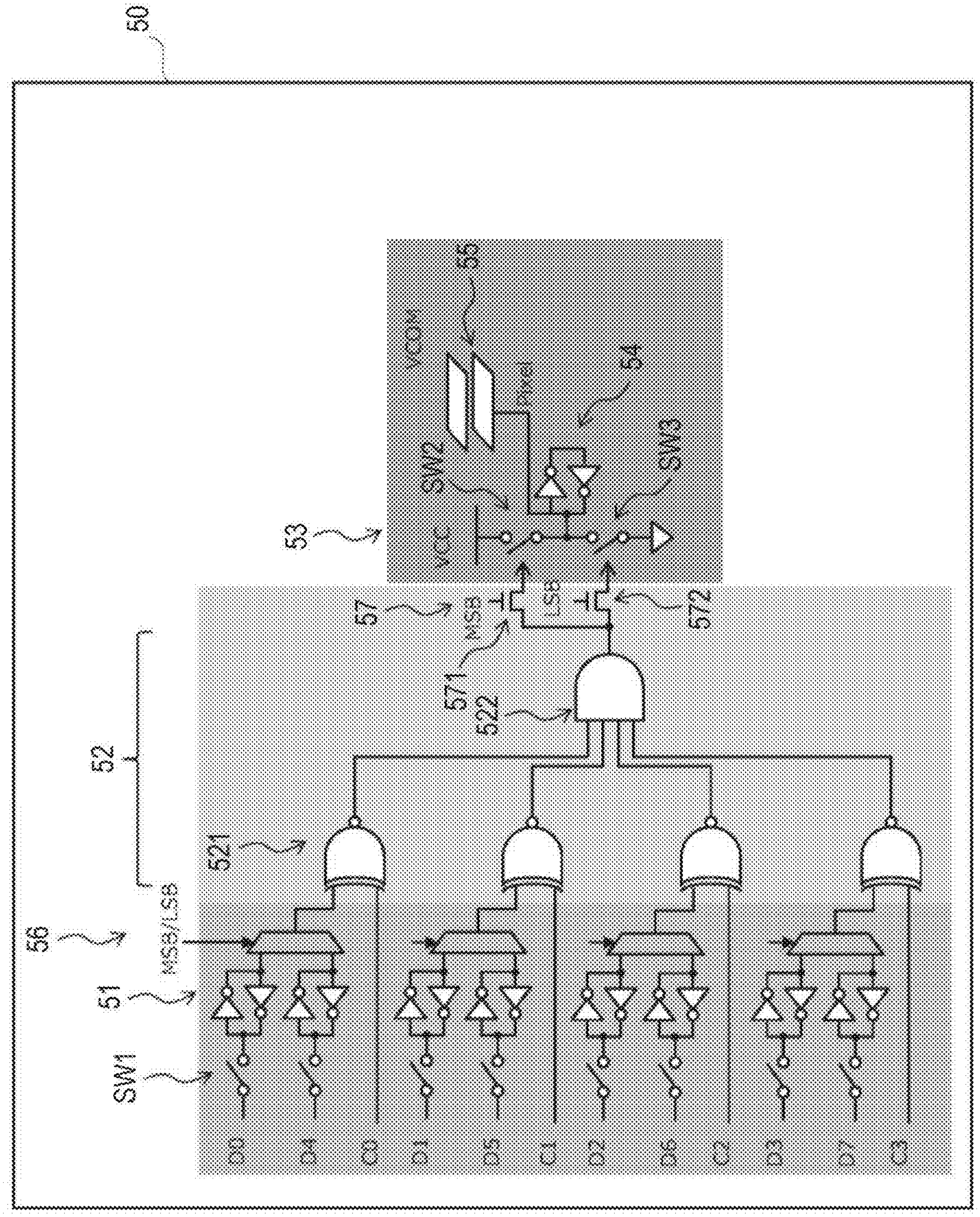
FIG. 31 is a diagram illustrating an example of a configuration of a pixel according to a second modification example of the fourth embodiment.

FIG. 31 is a diagram illustrating an example of a configuration of the pixel 50 according to a second modification example of the fourth embodiment. The second modification example of the fourth embodiment is different from the fourth embodiment in that a number of the first holding units 51 corresponding to 8 bits are provided.

Total 8 bits of bits [7:0] are divided into two, for example, total 4 bits of bits [7:4] that are high-order 4 bits, and total 4 bits of bits [3:0] that are low-order 4 bits.

That is, a plurality of bits of the image signal is time-divided into a first half bit and a second half bit in one subframe.

The pixel 50 further includes a selector 56 and a switching unit 57.

The selector 56 selects the first holding unit 51 that holds the image signal of the first half bit and the first holding unit 51 that holds the image signal of the second half bit. In the selector 56, an input unit is electrically connected to two first holding units 51, and an output unit is electrically connected to the first input unit of the EXNOR circuit 521. The selector 56 electrically connects one of the first holding units 51 to the EXNOR circuit 521.

In a case where a signal for selecting a most significant bit (MSB) side is input to the selector 56, the selector 56 selects the first holding unit 51 to which high-order bit data Dx (x=4, 5, 6, 7) is input. In a case where a signal for selecting a least significant bit (LSB) side is input to the selector 56, the selector 56 selects the first holding unit 51 to which low-order bit data Dx (x=0, 1, 2, 3) is input.

Note that the signal for selecting the MSB side and the signal for selecting the LSB side have a complementary relationship.

The switching unit 57 switches the output of the PWM signal generation circuit 52 according to the count of the first half bit or the count of the second half bit. The switching unit 57 includes a first switching transistor 571 and a second switching transistor 572.

The first switching transistor 571 is disposed on one side branched from the node of the output of the AND circuit 522. In a case where the signal for connecting to the MSB side is input to the first switching transistor 571, the first switching transistor 571 sends the output of the AND circuit 522 to the second switch SW2.

The second switching transistor 572 is disposed on the other side branched from the node of the output of the AND circuit 522. In a case where the signal for connecting to the LSB side is input to the second switching transistor 572, the second switching transistor 572 sends the output of the AND circuit 522 to the third switch SW3.

Eight first holding unit 51 are provided. That is, by providing four selectors 56, the number of the EXNOR circuits 521 can be halved to four as compared with FIG. 2 of the first embodiment. Furthermore, the number of input terminals of the AND circuit 522 also can be halved. As a result, the circuit area can be further reduced.

Figure 32:
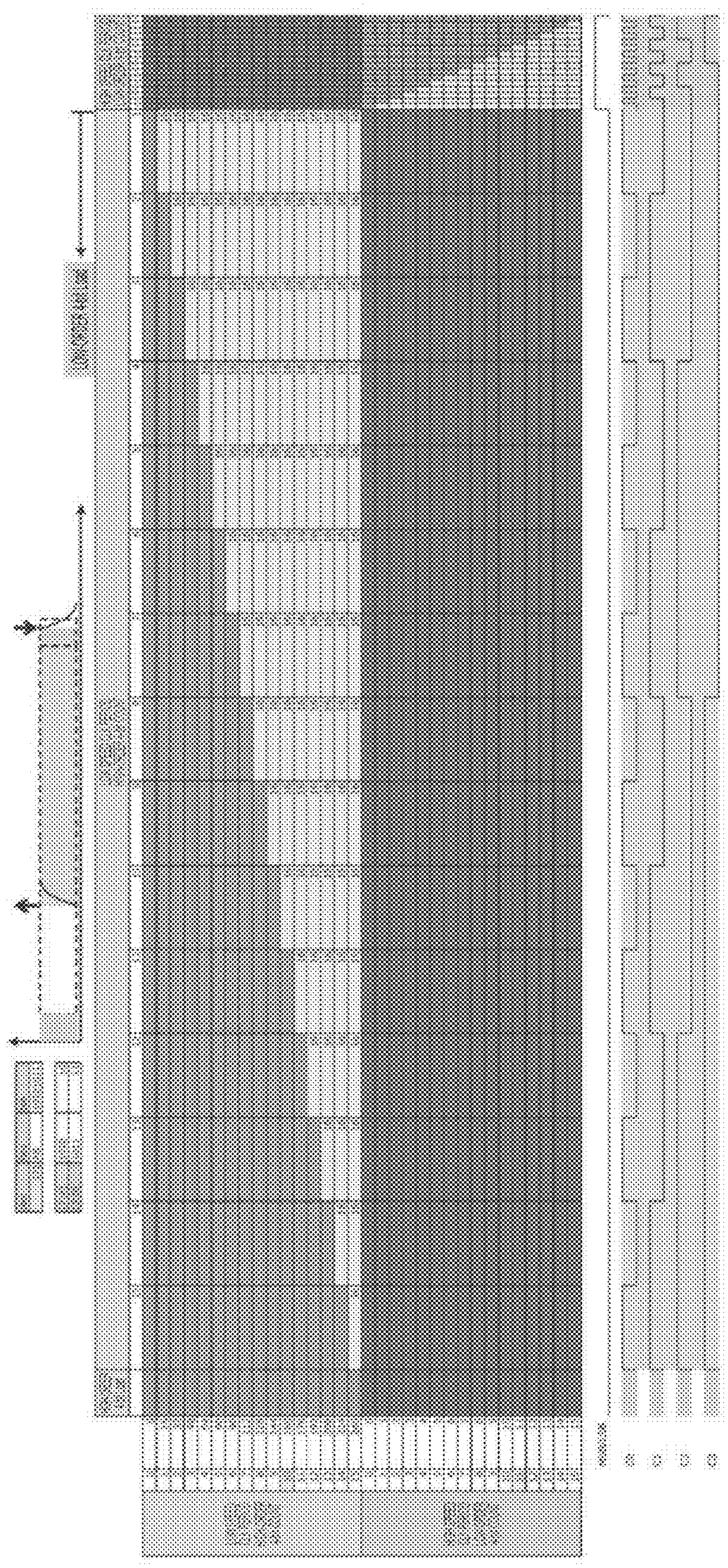
FIG. 32 is a diagram illustrating an example of operation of a pixel according to the second modification example of the third embodiment.

FIG. 32 is a diagram illustrating an example of the operation of the pixel 50 according to the second modification example of the fourth embodiment.

The PWM signal generation circuit 52 generates a PWM signal according to a first timing based on the first half bit and the count signal of a first polarity (count-down) and a second timing based on the second half bit and the count signal of a second polarity (count-up).

In the example illustrated in FIG. 32, a PWM period of "171" is illustrated. 171 is represented as 10101011 in binary. The high-order bits [7:4] are 1010 and correspond to a count value of 10. The low-order bits [3:0] are 1011 and correspond to a count value of 11.

First, high-order 4-bit digital image signal is written to the first holding unit 51 of data from D4 to D7.

For example, writing of the low-order 4-bit digital image signal to the first holding unit 51 of the data from D0 to D3 may be performed simultaneously with writing of the high-order 4-bit digital image signal, and is only required to be performed until the completion of the count-down in the first half to be described later.

Next, the selector 56 selects the first holding unit 51 on the MSB side, and the switching unit 57 connects the output of the AND circuit 522 to the MSB side.

Next, the count signals C4 to C7 (low speed) of reverse polarity countdown are input from the global counter 30. Note that in the case of the count-down, the count values are counted in the order of 15, 14, . . . , 1, and 0.

Next, the AND circuit 522 outputs one at a timing when the data of the first holding unit 51 of the first half and the count value of the first half all match. Thus, one (voltage VCC) is written to the second holding unit 54. In the example illustrated in FIG. 32, the write timing is a timing when the count value becomes 10 with count-down.

In this manner, the first half count-down ends.

Next, the selector 56 selects the first holding unit 51 on the LSB side, and the switching unit 57 connects the output of the AND circuit 522 to the LSB side.

Next, the count signals C0 to C3 (low speed) of count-up are input from the global counter 30. Note that in the case of the count-up, the count values are counted in the order of 0, 1, . . . , 14, and 15.

Next, the AND circuit 522 outputs one at a timing when the data of the first holding unit 51 of the second half and the count value of the second half all match. Thus, zero (ground voltage) is written to the second holding unit 54. In the example illustrated in FIG. 32, the write timing is a timing when the count value becomes 11 with count-up.

Furthermore, in the example illustrated in FIG. 32, a clock for counting the first half high-order bits is delayed to 1/16 of a clock for counting the second half low-order bits. Since the first half clock that occupies most of the entire clock is slow, the operation frequency can be delayed, and the power consumption can be suppressed.

As in the second modification example of the fourth embodiment, the selector 56 that selects the first holding unit 51 and the switching unit 57 for writing one to the second holding unit 54 may be provided. In this case, effects similar to those of the fourth embodiment can be obtained.

Third Modification Example of Fourth Embodiment

Figure 33:
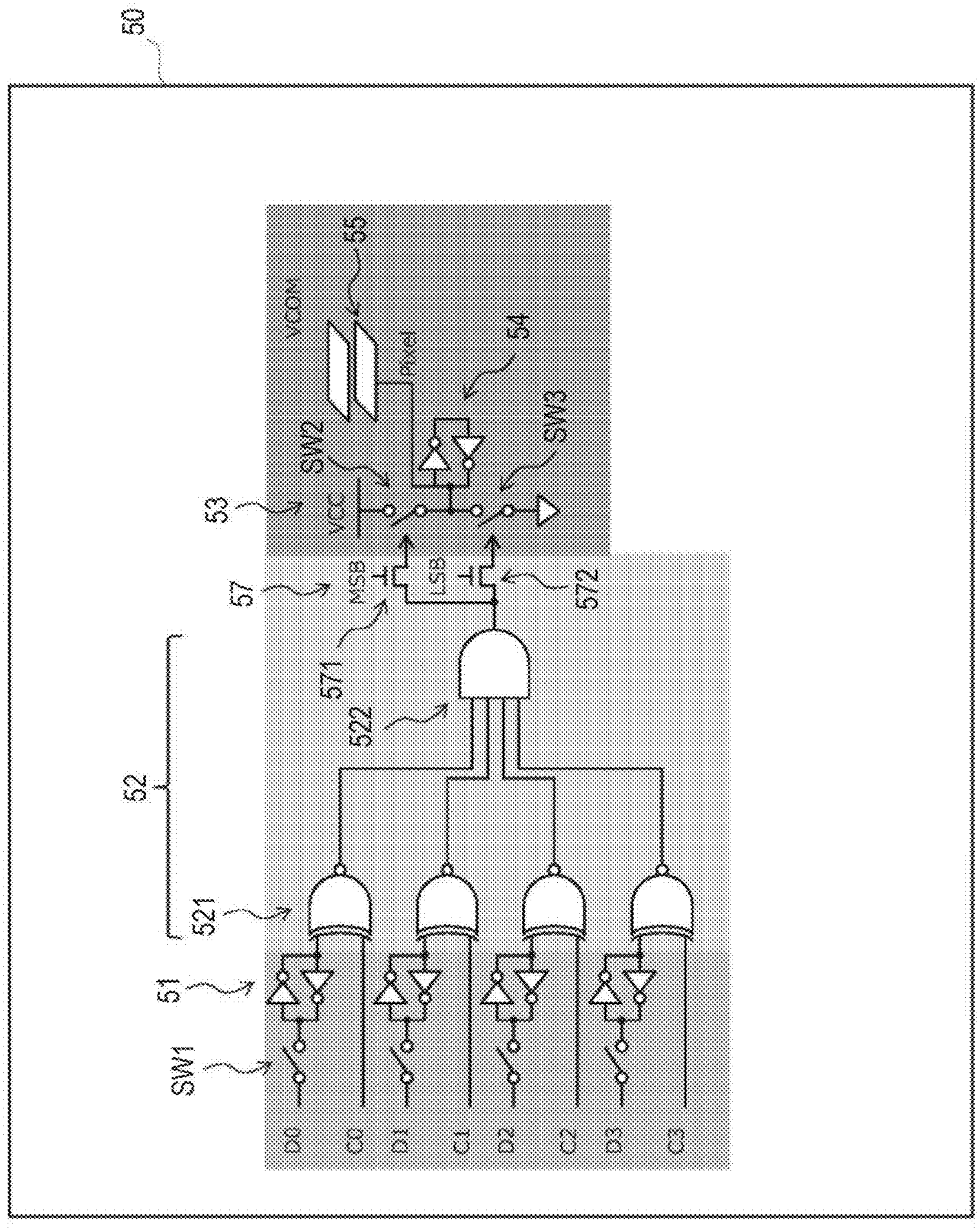
FIG. 33 is a diagram illustrating an example of a configuration of a pixel according to a third modification example of the fourth embodiment.

FIG. 33 is a diagram illustrating an example of a configuration of the pixel 50 according to a third modification example of the fourth embodiment. The third modification example of the fourth embodiment is different from the second modification example of the fourth embodiment in that the selector 56 is not provided.

Since the selector 56 is not provided, the number of the first holding units 51 can be reduced to four as compared with FIG. 2 of the second modification example of the fourth embodiment.

Figure 34:
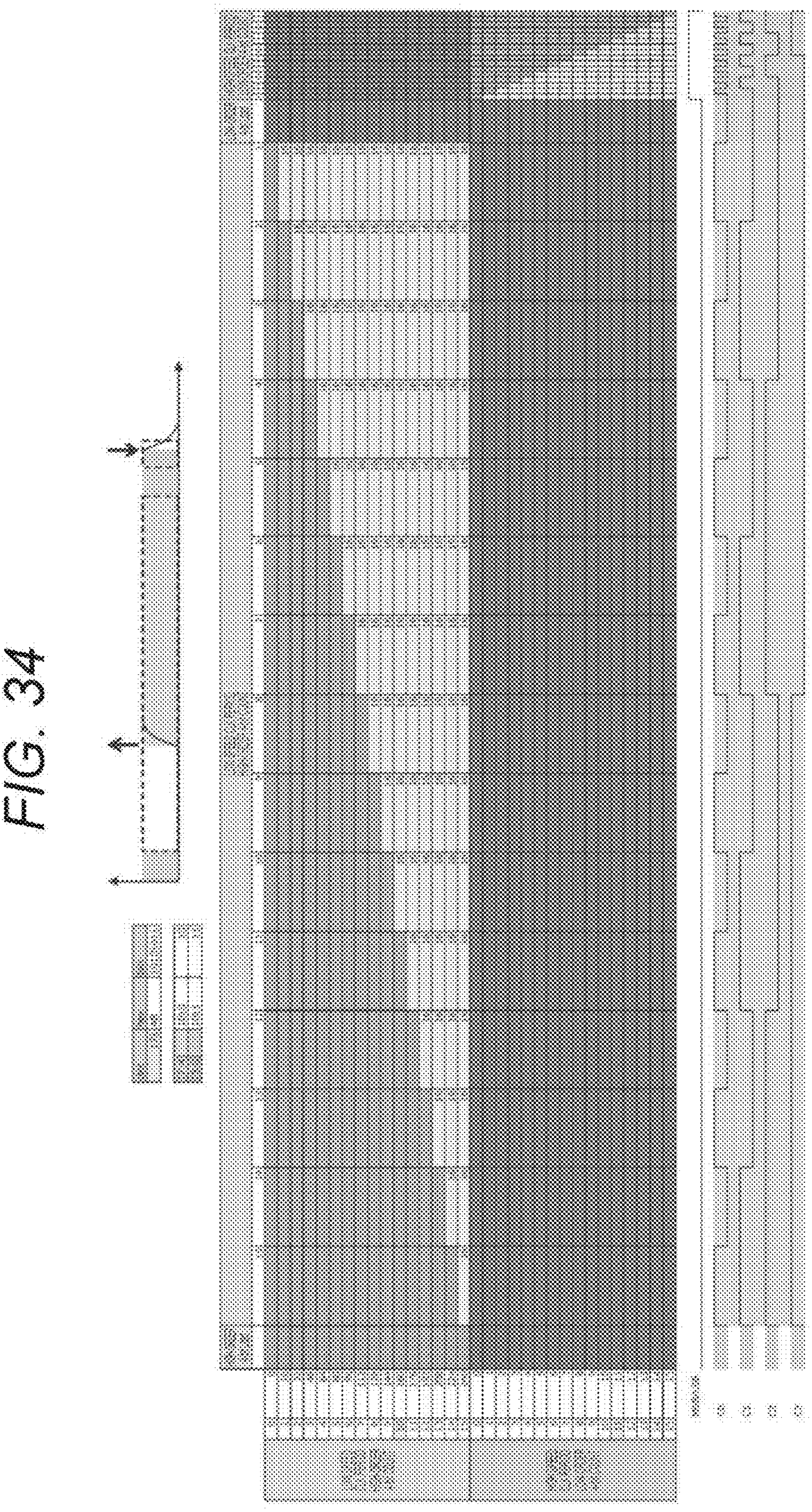
FIG. 34 is a diagram illustrating an example of operation of a pixel according to the third modification example of the fourth embodiment.

FIG. 34 is a diagram illustrating an example of the operation of the pixel 50 according to the third modification example of the fourth embodiment.

In FIG. 34, after the completion of the count-down, the low-order 4-bit digital image signal is written to the first holding unit 51 of data from D0 to D3. That is, the first holding unit 51 holds the image signal of the second half bit in a period between the count of the first half bit and the count of the second half bit. Note that the light source is in an off state during the period of writing to the first holding unit 51.

The driving illustrated in FIG. 34 of the third modification example of the fourth embodiment is substantially the same as the driving illustrated in FIG. 32 of the second modification example of the fourth embodiment except for the timing of writing the low-order 4-bit digital image signal.

In the third modification example of the fourth embodiment, as compared with the second modification example of the fourth embodiment, there is a useless period in the subframe for writing data, but the number of first holding units 51 can be reduced to further miniaturize the pixel 50.

As in the third modification example of the fourth embodiment, the switching unit 57 for writing one to the second holding unit 54 may be provided without providing the selector 56. In this case, effects similar to those of the second modification example of the fourth embodiment can be obtained.

Fourth Modification Example of Fourth Embodiment

Figure 35:
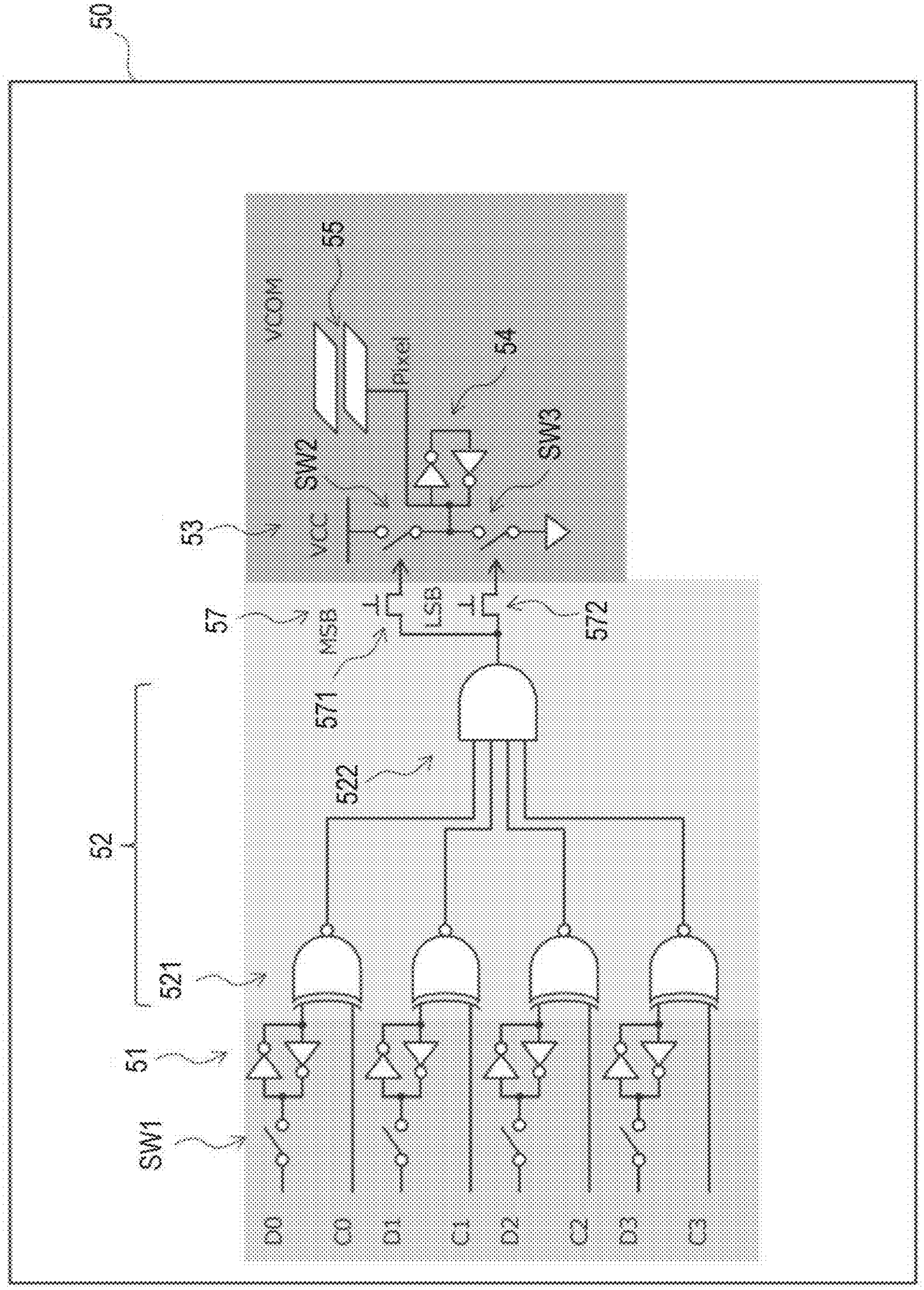
FIG. 35 is a diagram illustrating an example of a configuration of a pixel according to a fourth modification example of the fourth embodiment.

FIG. 35 is a diagram illustrating an example of a configuration of the pixel 50 according to a fourth modification example of the fourth embodiment. The fourth modification example of the fourth embodiment is also a combination of the fourth embodiment and the third modification example of the fourth embodiment.

The pixel configuration illustrated in FIG. 35 is the same as the pixel configuration illustrated in FIG. 33 of the third modification example of the fourth embodiment. That is, the switching unit 57 is provided.

As in the fourth embodiment, total 8 bits of bits [7:0] are divided into two, for example, total 4 bits of bits [7] and [2:0] and total 4 bits of bits [6:3]. That is, the number of the first holding units 51 and the number of the EXNOR circuits 521 can be halved to four as compared with FIG. 2 of the first embodiment. Furthermore, the number of input terminals of the AND circuit 522 also can be halved. As a result, the circuit area can be further reduced.

Figure 36:
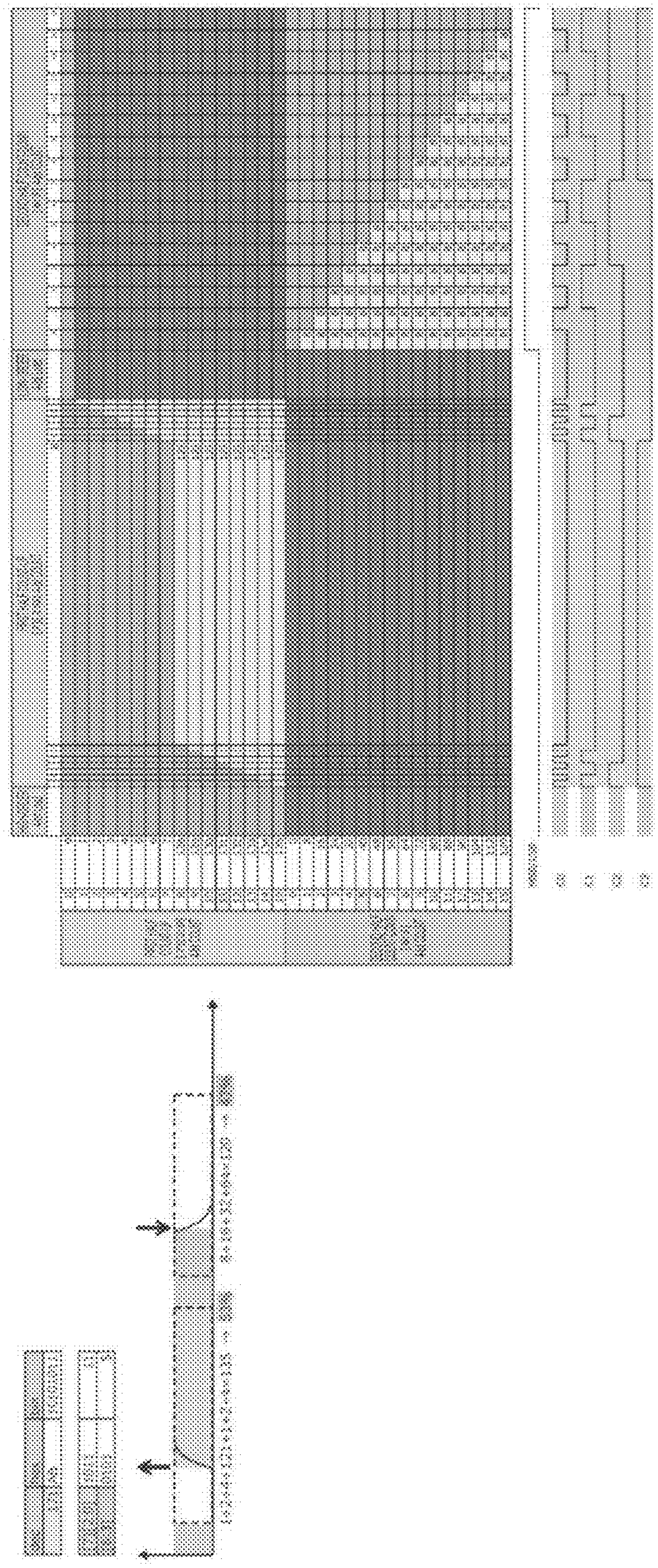
FIG. 36 is a diagram illustrating an example of operation of a pixel according to the fourth modification example of the fourth embodiment.

FIG. 36 is a diagram illustrating an example of the operation of the pixel 50 according to the fourth modification example of the fourth embodiment.

In the fourth modification example of the fourth embodiment, as in the fourth embodiment, total 8 bits of bits [7:0] are divided into two, for example, total 4 bits of bits [7] and [2:0] and total 4 bits of bits [6:3]. The weights of the bits of the digital image signal are substantially equal in the first half and the second half. Therefore, the influence of the delay in driving the liquid crystal can be suppressed.

In the example illustrated in FIG. 36, a PWM period of "171" is illustrated. 171 is represented as 10101011 in binary. The first half bits [7] and [2:0] are 101 and correspond to a count value of 11. The second half bits [6:3] are 0101 and correspond to a count value of five.

The driving illustrated in FIG. 36 of the fourth modification example of the fourth embodiment is substantially the same as the driving illustrated in FIG. 34 of the third modification example of the fourth embodiment.

As in the fourth modification example of the fourth embodiment, the switching unit 57 for writing one to the second holding unit 54 may be provided, and time division may be performed such that the weights of bits are substantially equal. In this case, effects similar to those of the fourth embodiment and the third modification example of the fourth embodiment can be obtained.

Fifth Embodiment

Figure 37:
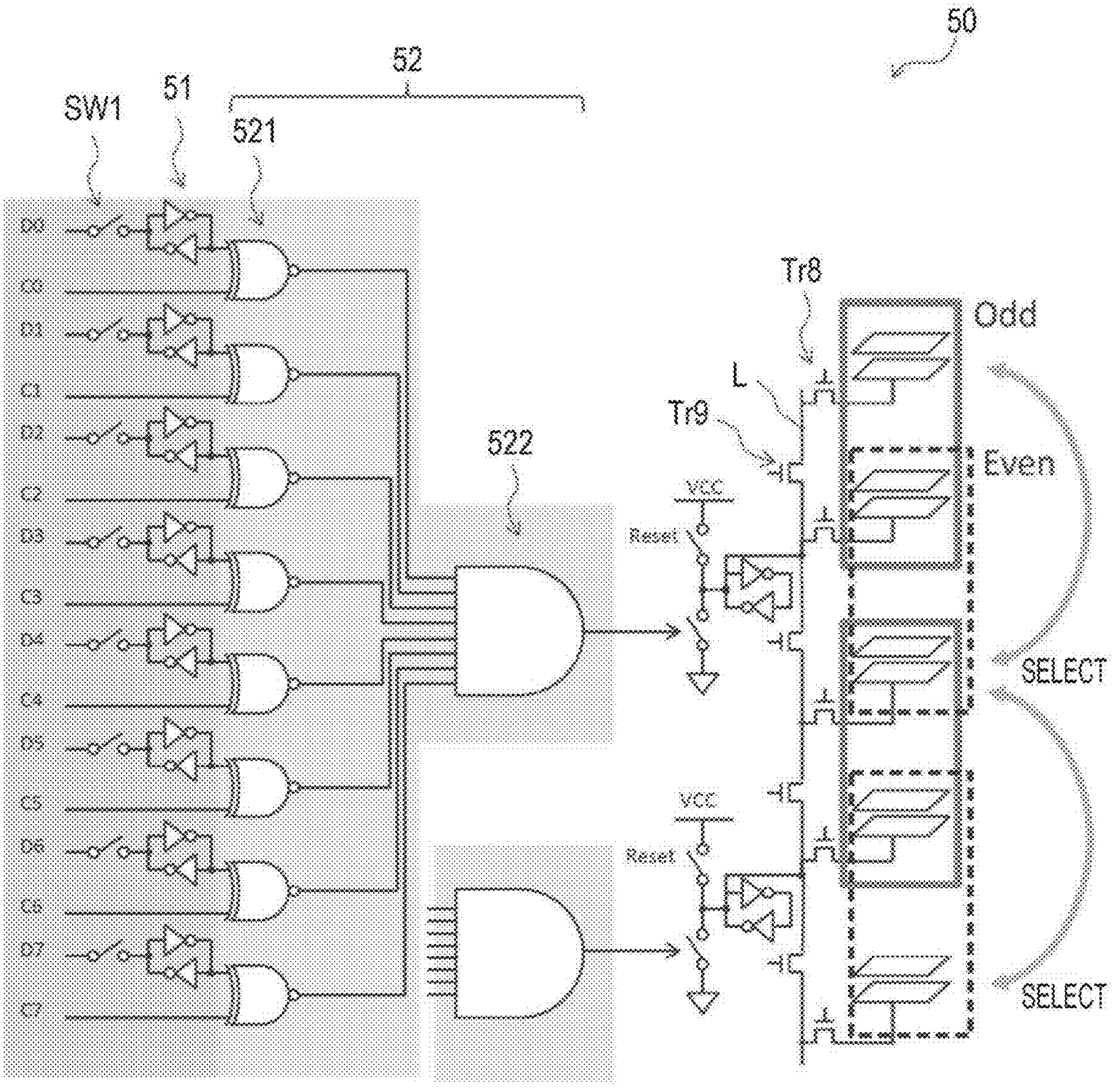
FIG. 37 is a diagram illustrating an example of a configuration of a pixel according to a fifth embodiment.

FIG. 37 is a diagram illustrating an example of a configuration of the pixel 50 according to a fifth embodiment. The fifth embodiment is different from the first embodiment in that pixel shift driving is performed.

The first holding unit 51, the PWM signal generation circuit 52, the signal level conversion unit 53, and the second holding unit 54 are shared by two vertically adjacent pixels. Therefore, the number of first holding units 51, the number of PWM signal generation circuits 52, the number of signal level conversion units 53, and the number of second holding units 54 can be reduced to half.

The pixel 50 further includes an eighth transistor Tr8, a relay wiring L, and a ninth transistor Tr9.

The eighth transistor Tr8 is connected between the second holding unit 54 and the pixel electrode 55. The eighth transistor Tr8 is provided in front of each pixel electrode 55.

The relay wiring L is a wiring disposed so as to connect a plurality of the pixel electrodes 55 via the eighth transistor Tr8.

The ninth transistor Tr9 is disposed between the pixel electrodes 55 (eighth transistors Tr8) on the relay wiring L. The ninth transistor Tr9 operates to separate the pixel electrodes 55.

Figure 38:
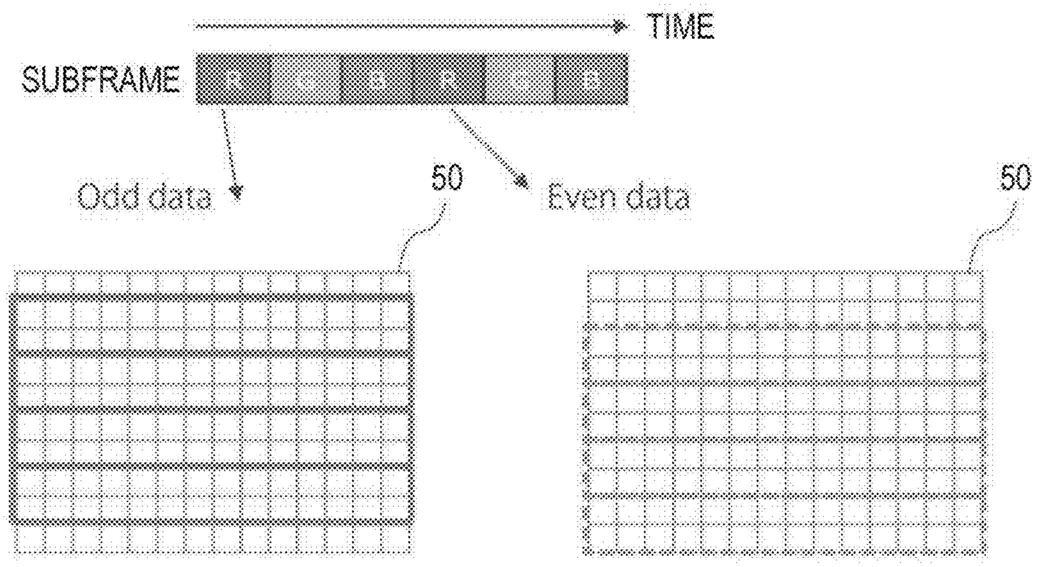
FIG. 38 is a diagram illustrating an example of operation of a pixel according to the fifth embodiment.

FIG. 38 is a diagram illustrating an example of the operation of the pixel 50 according to the fifth embodiment.

The pixel 50 performs display switching driving for each color component. Among three vertical pixels, two vertical pixels are simultaneously written, and simultaneously displayed on two lines. Among three vertical pixels, two upper pixels are referred to as Odd line, and two lower pixels are referred to as Even line. The display switching driving is performed by switching the Odd line and the Even line and performing display in the first subframe and the second subframe with each color. The eighth transistor Tr8 and the ninth transistor Tr9 operate so as to enable display switching driving.

Figure 39:
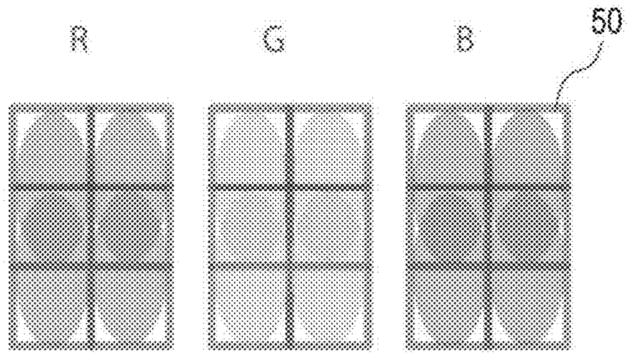
FIG. 39 is a diagram illustrating an example of pixel shift driving in each color component according to the fifth embodiment.

FIG. 39 is a diagram illustrating an example of pixel shift driving in each color component according to the fifth embodiment.

As illustrated in FIG. 39, the pixel shift driving is performed for each subframe such that the Odd line and the Even line overlap by one pixel.

Figure 40:
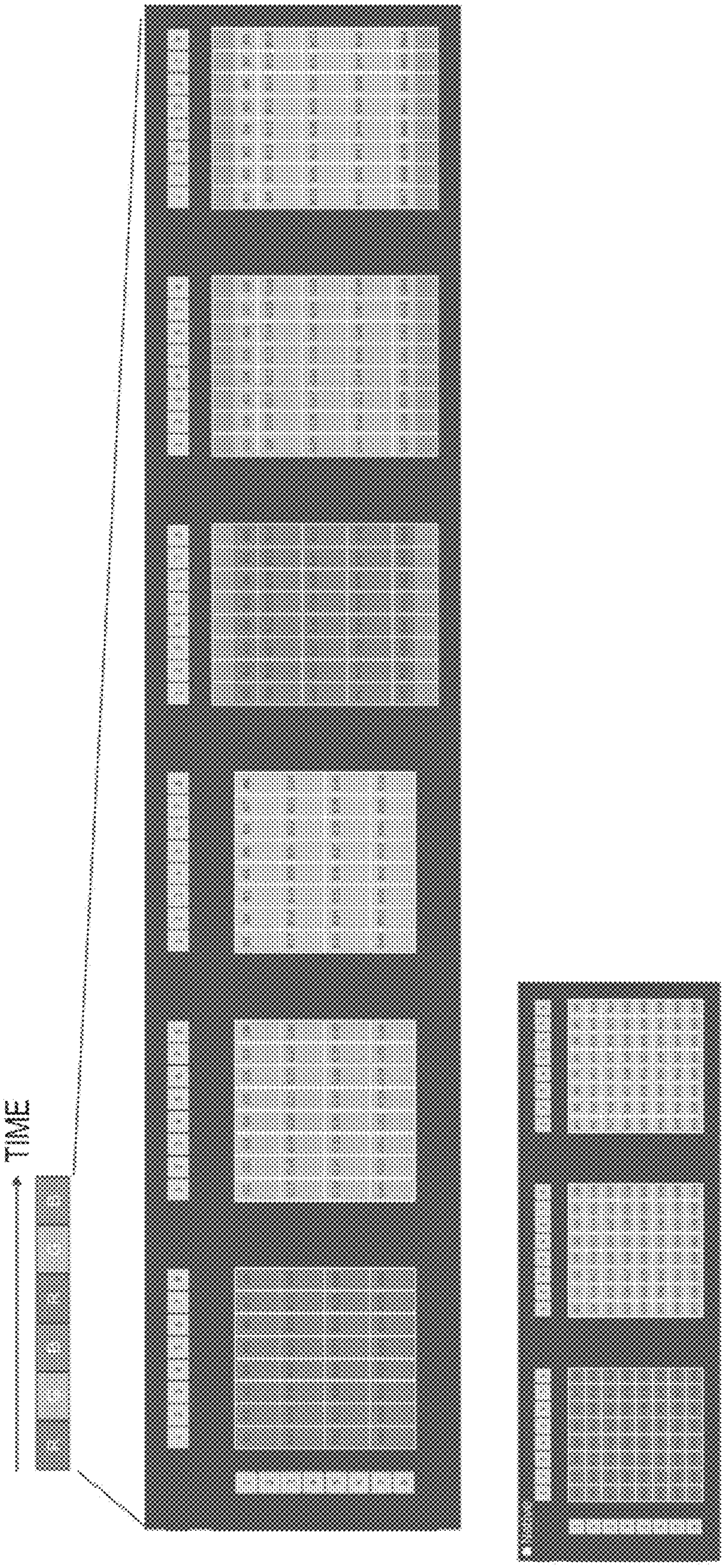
FIG. 40 is a diagram illustrating an example of a subframe and a native subframe according to the fifth embodiment.

FIG. 40 is a diagram illustrating an example of a subframe and a native subframe according to the fifth embodiment. Note that "native" indicates the arrangement of the pixels 50 in a case where the pixel shift driving is not performed.

In the native subframe, 8×8 pixels 50 are shown. For example, in the red component, pixels of R1, R9, R17, R25, R33, R41, R49, and R57 are present in a first column.

By the pixel shift driving, in the first subframe of the red component, the pixels 50 of R1, R17, R33, and R49 are respectively displayed so as to be based on the same image signal in two vertical pixels. In the second subframe of the red component, the pixels 50 of R1, R9, R25, R41, and R57 are respectively displayed so as to be based on the same image signal in two vertical pixels. As described above, the first subframe and the second subframe are synthesized and perceived by the user.

As described above, in the fifth embodiment, some of a plurality of the pixel electrodes 55 sharing the first holding unit 51 and the PWM signal generation circuit 52 are driven on the basis of the same image signal, and the pixel electrodes 55 are driven such that the arrangement of the pixel electrodes 55 driven on the basis of the same image signal is changed for each subframe of the same color component. More specifically, two pixel electrodes 55 adjacent in a first direction (column direction) are driven on the basis of the same image signal, and the pixel electrodes 55 are driven such that two pixel electrodes 55 driven on the basis of the same image signal are shifted by one pixel electrode 55 in the first direction for each subframe of the same color component.

In a case where the pixel shift driving is not performed, the circuit such as the PWM signal generation circuit 52 is shared by two pixels 50, and thus the resolution in the vertical direction is also halved.

On the other hand, in the fifth embodiment, by shifting the pixel 50 to be displayed for each subframe of each color, it is possible to suppress a reduction in resolution, which is caused by a reduction in the number of elements.

As in the fifth embodiment, the pixel shift driving may be performed. Note that in the fifth embodiment, as in the first embodiment, the power consumption can be suppressed, and the frame rate can be improved.

First Modification Example of Fifth Embodiment

Figure 41:
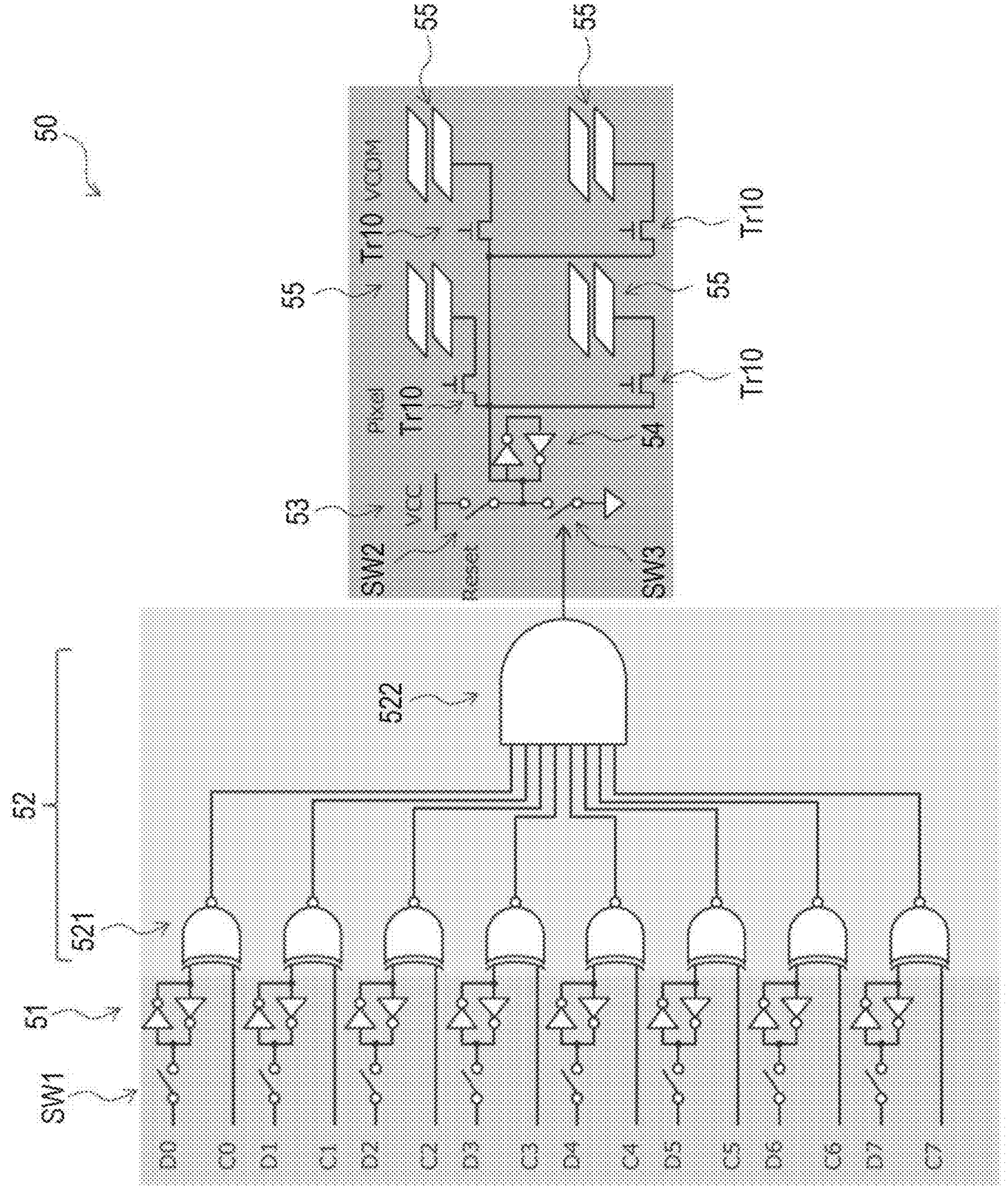
FIG. 41 is a diagram illustrating an example of a configuration of a pixel according to a first modification example of the fifth embodiment.

FIG. 41 is a diagram illustrating an example of a configuration of the pixel 50 according to a first modification example of the fifth embodiment. The first modification example of the fifth embodiment is different from the fifth embodiment in that pixel shift driving is performed for 2×2 pixels.

The first holding unit 51, the PWM signal generation circuit 52, the signal level conversion unit 53, and the second holding unit 54 are shared by 2×2 pixels adjacent to each other. Therefore, the number of first holding units 51, the number of PWM signal generation circuits 52, the number of signal level conversion units 53, and the number of second holding units 54 can be reduced to one fourth.

The pixel 50 includes a tenth transistor Tr10. The tenth transistor Tr10 is connected between the second holding unit 54 and the pixel electrode 55. The tenth transistor Tr10 is provided in front of each pixel electrode 55.

Figure 42:
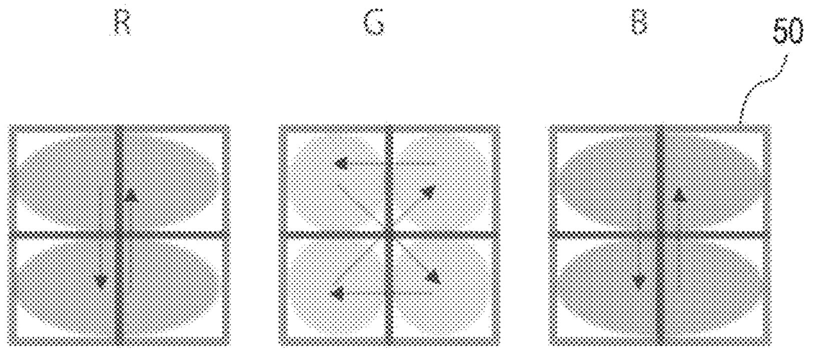
FIG. 42 is a diagram illustrating an example of pixel shift driving in each color component according to the first modification example of the fifth embodiment.

FIG. 42 is a diagram illustrating an example of the pixel shift driving in each color component according to the first modification example of the fifth embodiment.

As illustrated in FIG. 42, in the red component and the blue component, the shift driving is performed for two horizontal pixels together for each subframe. In the green component, the shift driving is performed in one pixel for each subframe. This is because green has high visibility for human eyes.

Figure 43:
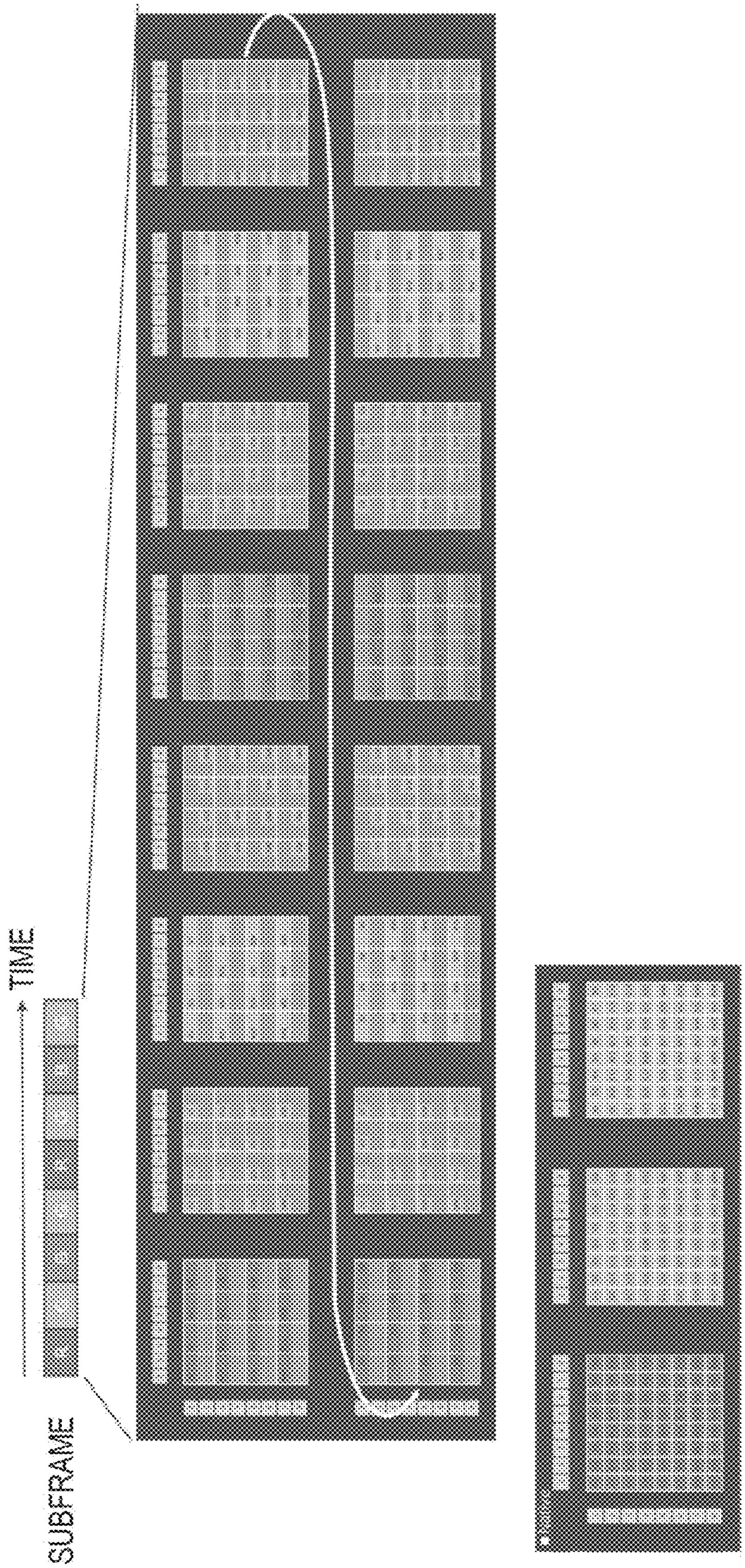
FIG. 43 is a diagram illustrating an example of a subframe and a native subframe according to the first modification example of the fifth embodiment.

FIG. 43 is a diagram illustrating an example of the subframe and the native subframe according to the first modification example of the fifth embodiment. Note that the native subframe illustrated in FIG. 43 is the same as the native subframe illustrated in FIG. 40 of the fifth embodiment.

As illustrated in FIG. 43, in the 2×2 pixels, subframes are displayed in order of two pixels for the red component, one pixel for the green component, two pixels for the blue component, and one pixel for the green component.

In the red component and the blue component, of two horizontal pixels, pixels 50 to be displayed are alternately switched in the horizontal direction. For example, in the red component, there are pixels 50 of R1, R2, R9, and R10 corresponding to 2×2. In the first subframe of the red component, the pixel 50 of R1 is displayed so as to be based on the same image signal in two horizontal pixels. In the third subframe, the pixel 50 of R2 is displayed so as to be based on the same image signal in two horizontal pixels. Similarly, in the second subframe of the red component, the pixel 50 of R10 is displayed so as to be based on the same image signal in two horizontal pixels. In the fourth subframe, the pixel 50 of R9 is displayed so as to be based on the same image signal in two horizontal pixels.

For example, in the green component, there are pixels 50 of G1, G2, G9, and G10 corresponding to 2×2. The pixels 50 are displayed in order of G1, G10, G2, and G9 in the first to fourth subframes of the green component.

As described above, in the first modification example of the fifth embodiment, in the red component and the blue component, two pixel electrodes 55 adjacent in a second direction (row direction) are driven on the basis of the same image signal, and the pixel electrodes 55 are driven such that two pixel electrodes 55 driven on the basis of the same image signal are shifted by one pixel electrode 55 in the first direction (column direction) perpendicular to the second direction for each subframe of the same color component. Furthermore, in the green component, one of four pixel electrodes 55 is driven, and the pixel electrode 55 is driven such that the arrangement of the pixel electrodes 55 to be driven for each subframe changes.

Since the pixel shift driving as illustrated in FIG. 43 is performed, four pixels can share the logic circuit while maintaining the gradation.

As in the first modification example of the fifth embodiment, the pixel shift driving may be performed for 2×2 pixels. In this case, effects similar to those of the fifth embodiment can be obtained.

Sixth Embodiment

Figure 44:
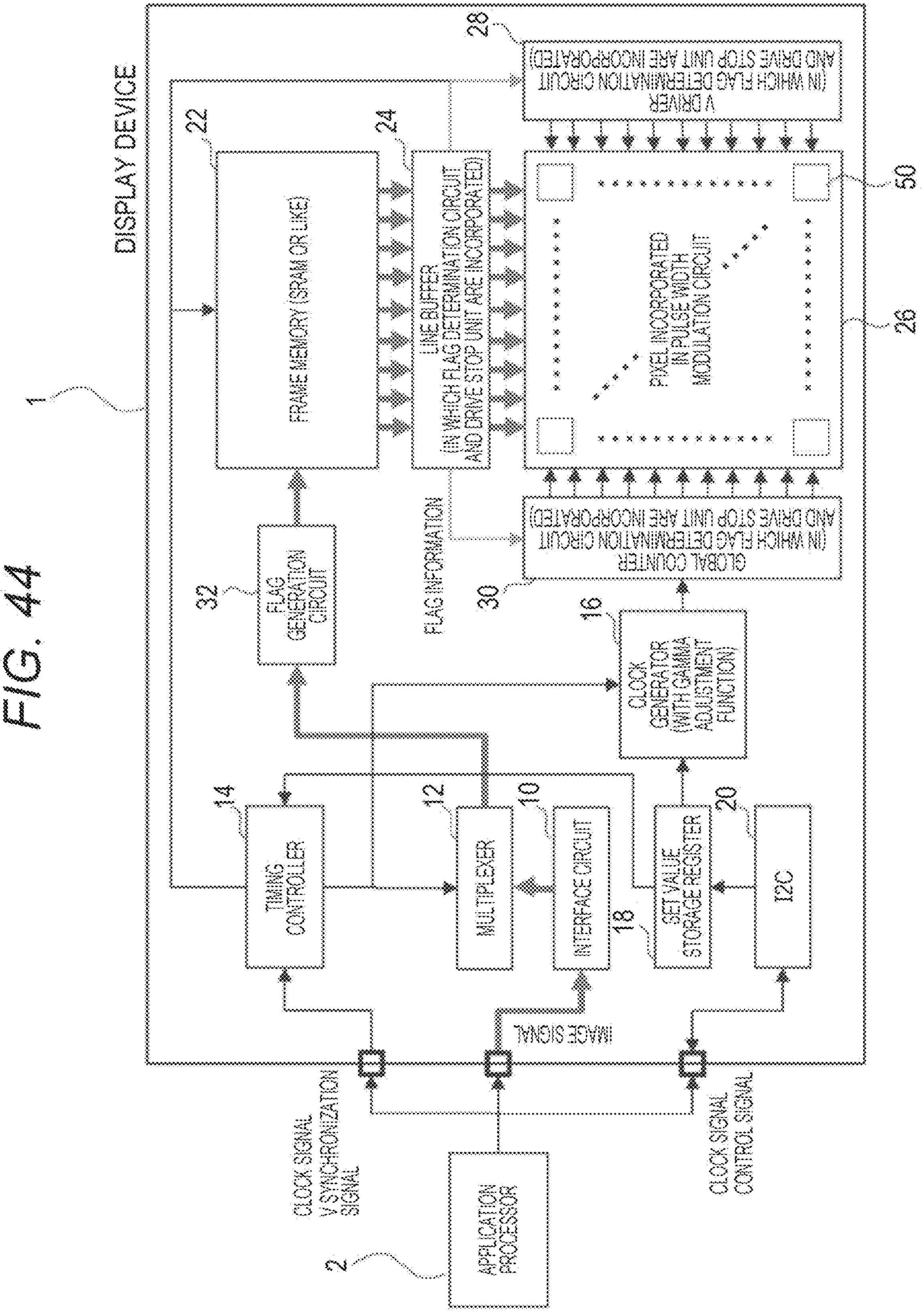
FIG. 44 is a diagram illustrating an example of a configuration of a display device according to a sixth embodiment.

FIG. 44 is a diagram illustrating an example of a configuration of a display device 1 according to a sixth embodiment. The sixth embodiment is different from the first embodiment in that the display screen is partially driven.

In AR, for example, images and the like are superimposed and displayed in a certain region of the real world seen through smart glasses. Therefore, the probability that the image is displayed on the entire screen is low, and it is preferable to reduce the power consumption by stopping the circuit as much as possible in a region (black region B) of a black display portion where the image is not displayed.

The display device 1 further includes a flag generation circuit (flag generation unit) 32, a flag determination circuit, and a drive stop unit.

The flag generation circuit 32 calculates the sum of the signal values (gradation values) of the image signals for each subframe (color component) and for each predetermined region of a plurality of arranged pixels 50, and generates a black flag in a case where the sum of the signal values is equal to or less than a predetermined value. A predetermined region in the sixth embodiment is, for example, a pixel line which is one line of a plurality of pixels 50 arranged in a matrix. The flag generation circuit 32 stores the flag together with the image signal in the frame memory 22. Note that for the pixel 50 for which the flag has been generated, the flag generation circuit 32 may not write the image signal to the frame memory 22. That is, the flag generation circuit 32 may write only the data of the image signal having the gradation value in the frame memory 22. The flag generation circuit 32 is provided, for example, between the multiplexer 12 and the frame memory 22.

The flag determination circuit determines the presence or absence of a flag. The flag determination circuit is disposed in the line buffer 24, the global counter 30, and the V driver 28.

The drive stop unit stops driving of the pixel 50 determined to have the black flag. That is, the drive stop unit stops the driving of the pixels 50 in a predetermined region of the subframe for which the black flag is generated. Thus, at the display surface of the pixel 50, some of the pixels 50 can stop driving and perform partial driving. As a result, the power consumption be suppressed. The drive stop unit is disposed in the line buffer 24, the global counter 30, and the V driver 28.

More specifically, the drive stop unit stops the input of the image signal to the first holding unit 51 of the pixel 50 in a predetermined region of the subframe for which the black flag is generated. That is, the drive stop unit stops the scan for writing the data of the image signal to the first holding unit 51 by the line buffer 24. Therefore, the power consumption can be reduced.

Furthermore, more specifically, the drive stop unit stops the input of the count signal to the PWM signal generation circuit 52 of the pixel 50 in a predetermined region of the subframe for which the black flag is generated. That is, the drive stop unit stops the input of the count signal to the PWM signal generation circuit 52 by the global counter 30. Therefore, the power consumption can be reduced.

Since other configurations of the display device 1 according to the sixth embodiment are similar to the corresponding configurations of the display device 1 according to the first embodiment, the detailed description thereof will be omitted.

Next, the operation of the partial driving will be described.

Figure 45A:
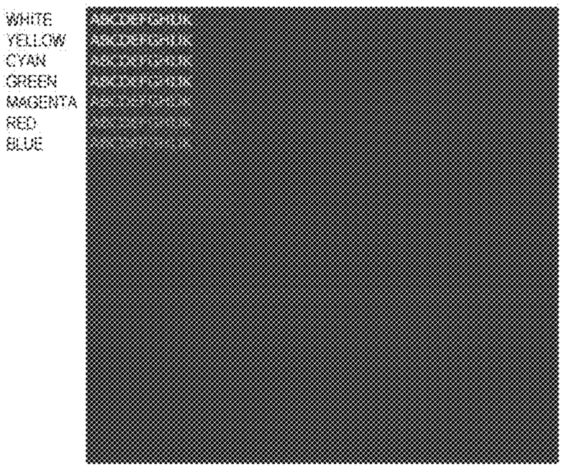
FIG. 45A is a view illustrating an example of a display screen input from an application processor according to the sixth embodiment.
Figure 45B:
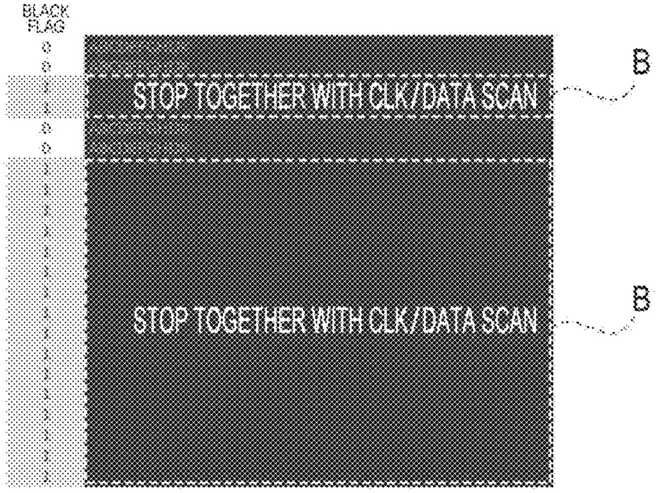
FIG. 45B is a view illustrating an example of a subframe of a red component in FIG. 45A.

FIG. 45A is a view illustrating an example of a display screen input from the application processor 2 according to the sixth embodiment. FIG. 45B is a view illustrating an example of the subframe in FIG. 45A. In FIG. 45A, a character string "ABCDIFGHIJK" is described on a black background. The colors of the actual character strings in FIG. 45A are white (red+green+blue), yellow (red+green), cyan (green+blue), green, magenta (red+blue), red, and blue from the top.

First, before the image signal is written to the frame memory 22, the flag generation circuit 32 calculates the sum of gradation values for each color component (subframe) of RGB and for each line.

FIG. 45B illustrates the subframe of the red component in FIG. 45A. The lines in which the sum of the red gradation values is not zero are the first, second, fifth, and sixth lines from the top. That is, in FIG. 45B, a character string "ABCDIFGHIJK" is described in the first, second, fifth, and sixth rows in red on the black background.

Next, the flag generation circuit 32 identifies a line in which the sum of the gradation values is zero as a black line (black region B). That is, the flag generation circuit 32 generates the black flag. The flag generation circuit 32 stores the black flag in the set value storage register 18 for each color component and for each line.

In FIG. 45B, the black flag of zero is generated in a line for which the black flag is not generated. On the other hand, a black flag of one is generated in a line for which the black flag is generated.

Next, the flag determination circuit determines the presence or absence of the black flag in each line of the subframe of each color. The line buffer 24 does not write the data of the image signal to the first holding unit 51 (data scan in FIG. 45B) for the line with the black flag in the subframe of each color. Furthermore, the global counter 30 does not pass the count signal (CLK in FIG. 45B) to the PWM signal generation circuit 52 for the line with the black flag in the subframe of each color.

The pixel 50 on a line with the black flag is reset, the gradation value is set to zero, and PWM is immediately lowered. Furthermore, the pixel 50 may be reset for each line in conjunction with the black flag.

In FIG. 45B, the pixels 50 on the third and fourth lines from the top and on the seventh and subsequent lines, in which the black flag is one, are not driven. Therefore, the pixels 50 on the first, second, fifth, and sixth lines from the top in which the black flag is zero are partially driven.

Figure 46:
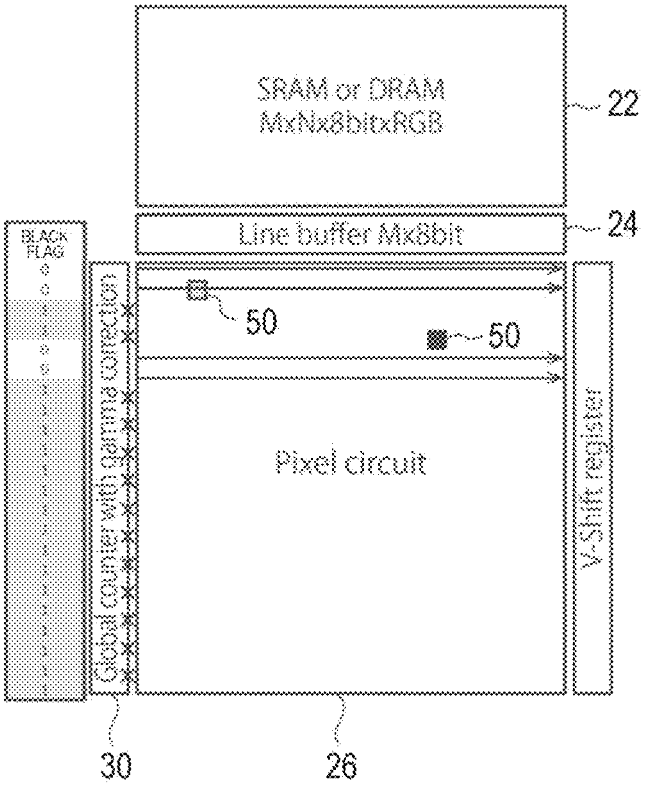
FIG. 46 is a diagram illustrating an example of driving a global counter according to the sixth embodiment.

FIG. 46 is a diagram illustrating an example of driving the global counter 30 according to the sixth embodiment.

For example, the global counter 30 performs gating for each line. That is, the global counter 30 inputs the count signal in units of lines. The global counter 30 inputs the count signal to all the pixels 50 on the line in which the black flag is zero.

As in the sixth embodiment, the partial driving may be performed. Note that in the sixth embodiment, as in the first embodiment, the power consumption can be suppressed, and the frame rate can be improved.

Furthermore, in the display device 1 according to the sixth embodiment, the arrangement of the first holding unit 51 and the PWM signal generation circuit 52 may be not necessarily the same as that in the first embodiment. For example, in the sixth embodiment, the PWM signal generation circuit 52 may be disposed outside the pixel 50. Furthermore, the display device 1 according to the sixth embodiment performs color sequential driving, and generates and determines a flag for each subframe. However, the present disclosure is not limited thereto, and the partial driving may be performed for each color component in one frame. That is, the partial driving may be applied to other display driving methods other than the color sequential driving such as LCOS.

First Modification Example of Sixth Embodiment

Figure 47:
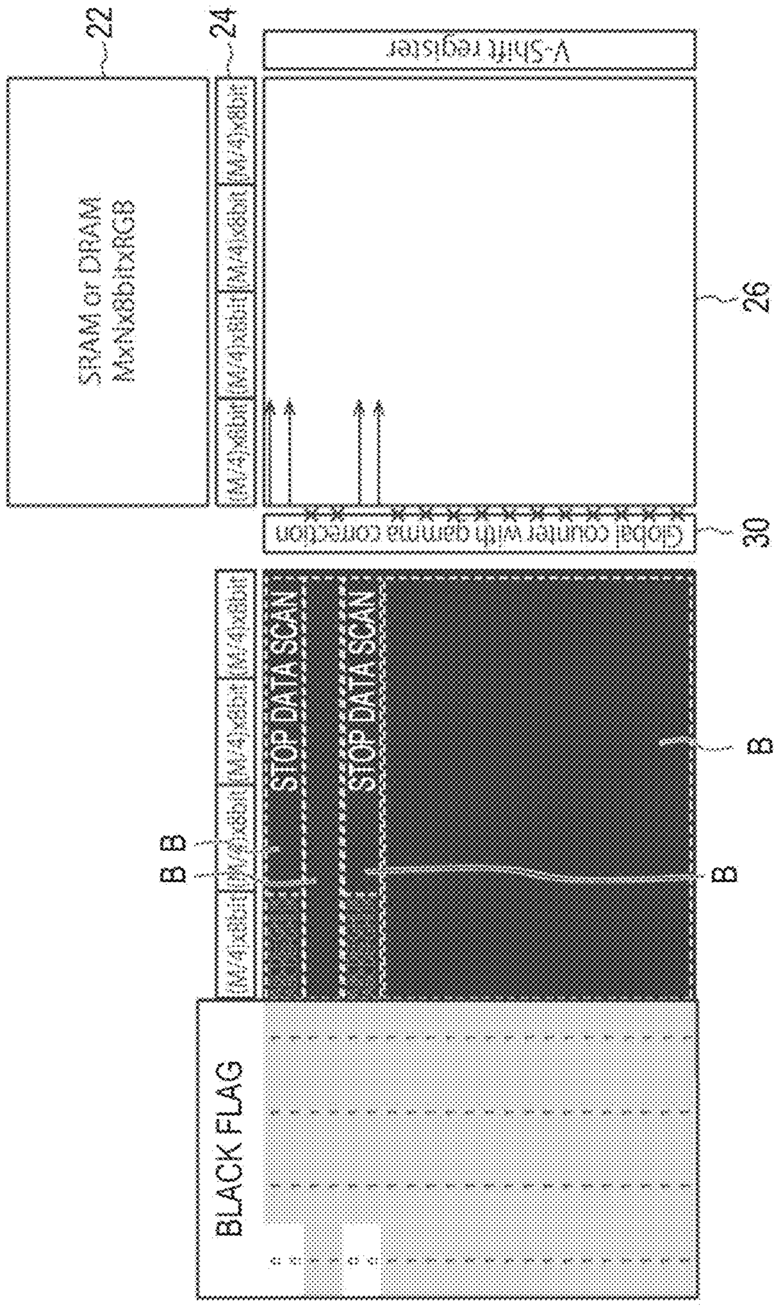
FIG. 47 is a diagram illustrating an example of a subframe according to a first modification example of the sixth embodiment.

FIG. 47 is a diagram illustrating an example of the subframe according to a first modification example of the sixth embodiment. The first modification example of the sixth embodiment is different from the sixth embodiment in that the black region B is managed by dividing the line in the horizontal direction.

A predetermined region in the first modification example of the sixth embodiment is, for example, a line division region divided in a direction along one line (pixel line) from the pixel line. In the example illustrated in FIG. 47, the line is divided into four. When the writing scan of the horizontal pixel 50 is divided into (M/4)×4 phases or the like instead of an M phase, the writing to the first holding unit 51 can be managed by the horizontal division. Note that the number of line division regions is not limited to four, and may be eight or the like. Therefore, as will be described later with reference to FIGS. 48A to 48C, the partial driving can be performed so as to manage the black region B in a rectangular region.

Next, the operation of the partial driving will be described.

First, before the image signal is written to the frame memory 22, the flag generation circuit 32 calculates the sum of gradation values for each color component (subframe) of RGB and for each line division region.

Next, the flag generation circuit 32 identifies a line division region in which the sum of the gradation values is zero as the black region B. That is, the flag generation circuit 32 generates the black flag. The flag generation circuit 32 stores the black flag in the set value storage register for each color component and for each line division region.

Next, the flag determination circuit determines the presence or absence of the black flag in each line division region of the subframe of each color. The line buffer 24 does not write the data of the image signal to the first holding unit 51 for the line division region with the black flag in the subframe of each color.

In FIG. 47, the writing (data scan in FIG. 47) of the data of the image signal to the first holding unit 51 is not performed on the pixels 50 in the line division regions in the second to fourth columns from the left and in the first, second, fifth, and sixth rows from the top in which with the black flag is one. On the other hand, the writing of the data of the image signal to the first holding unit 51 is performed on the pixels 50 in the line division regions in the first column from the left and in the first, second, fifth, and sixth rows from the top in which the black flag is zero (refer to arrows in FIG. 47).

Furthermore, the global counter 30 does not pass the count signal to the PWM signal generation circuit 52 for the line with the black flag in all the horizontal four division regions in the subframe of each color. In a case where at least one black flag is zero in the line division region, the global counter 30 passes the count signal to one line including the line division region in which the black flag is zero. Therefore, the count signal is input not only to the line division region in which the black flag is zero but also to the pixels 50 in the line division regions in the second to fourth columns from the left and in the first, second, fifth, and sixth rows from the top in which the black flag is one.

That is, the PWM signal generation circuit 52 receives the count signal for each pixel line, which is one line of a plurality of the pixels 50 arranged in a matrix. Furthermore, the drive stop unit stops the input of the count signal to the PWM signal generation circuit 52 of the pixel 50 on the pixel line of the subframe for which the black flag is generated for all the pixels in the pixel line.

The pixel 50 in the line division region with the black flag is reset, the gradation value is set to zero, and PWM is immediately lowered. Furthermore, the pixel 50 may be reset for each line division region in conjunction with the black flag.

Figure 48A:
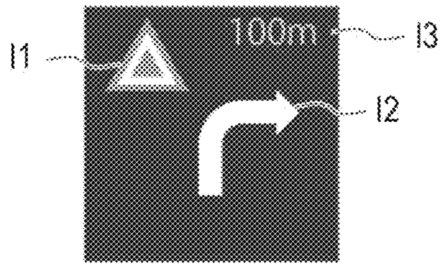
FIG. 48A is a view illustrating an example of a display screen input from an application processor according to the sixth embodiment.

FIG. 48A is a view illustrating an example of a display screen input from the application processor 2 according to the sixth embodiment.

FIG. 48A illustrates images I1 to I3 on the black background. The image I1 has a shape in which red, white, and red triangles overlap from the outside to the center. The image I2 is a white arrow. The image I3 is a green character string "100 m".

Figure 48B:
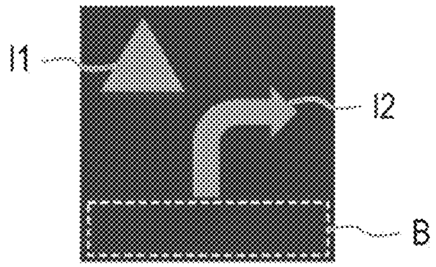
FIG. 48B is a view illustrating an example of a subframe of a red component in FIG. 48A.
Figure 48C:
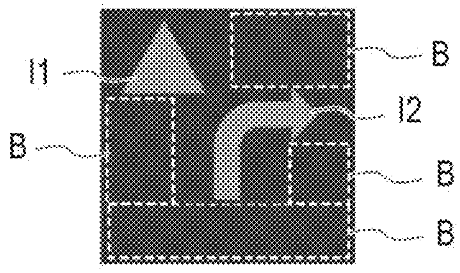
FIG. 48C is a view illustrating an example of a subframe of a red component in FIG. 48A.

FIGS. 48B and 48C are views illustrating an example of the subframe of the red component in FIG. 48A. FIG. 48B is a view illustrating an example of managing black display with a line. FIG. 48C illustrates an example of managing the black display in a rectangular region.

FIGS. 48B and 48C illustrate images I1 and I2 on the black background. FIGS. 48B and 48C illustrate images having red gradation values. The images I1 in FIGS. 48B and 48C are red triangles. The image I2 is a red arrow. Note that the image I3 having a red gradation value of zero is not shown.

As illustrated in FIG. 48B, in a case where the black display is managed with a line as in the sixth embodiment, the lower region of the display screen is identified as a black line (black region B) in which the black flag is one.

As illustrated in FIG. 48C, in the first modification example of the sixth embodiment, not only the lower region of the display screen but also the left and right rectangular regions of the images I1 and I2 having the gradation values are identified as the black region B in which the black flag is one. Thus, the driving of the pixels 50 can be stopped in a wider region. As a result, the power consumption be suppressed.

As in the first modification example of the sixth embodiment, the line may be divided in the horizontal direction to perform the partial driving. In this case, effects similar to those of the sixth embodiment can be obtained.

<Application Examples of Display Device 1 and Electronic Device According to Present Disclosure>

First Application Example

Figure 49A:
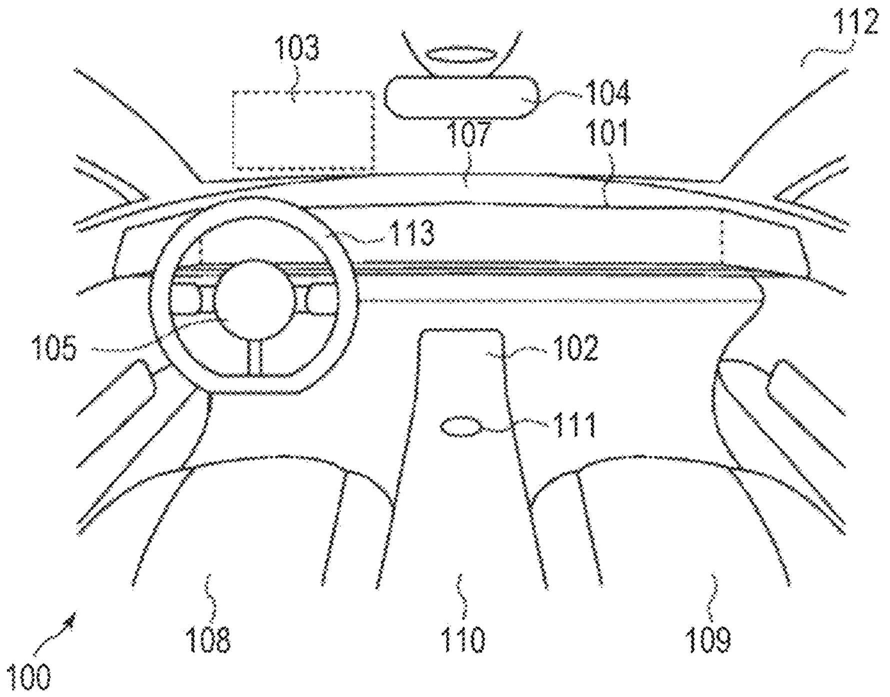
FIG. 49A is a view illustrating an internal state of a vehicle as viewed from a rear side to a front side of the vehicle.
Figure 49B:
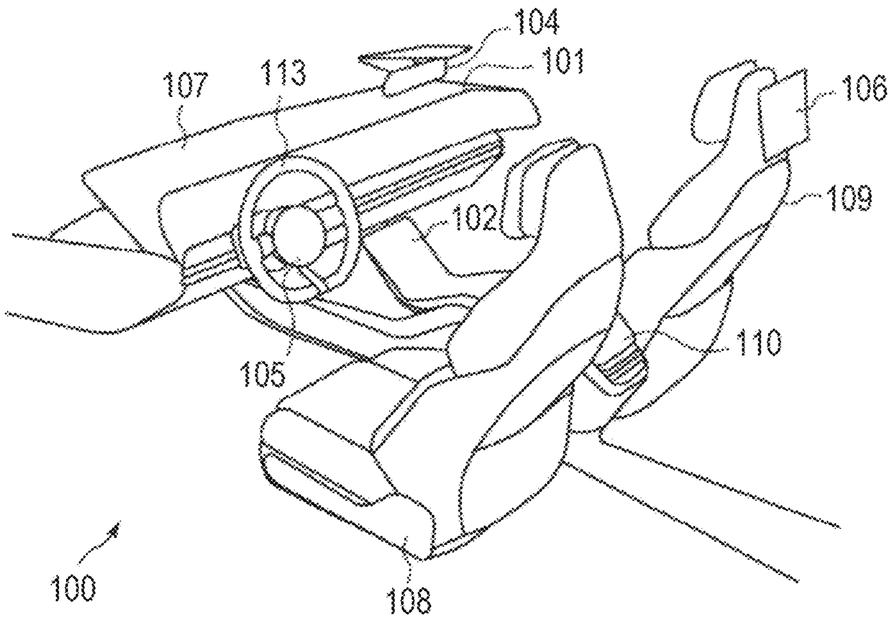
FIG. 49B is a view illustrating an internal state of a vehicle as viewed from an oblique rear side to an oblique front side of the vehicle.

The display device 1 according to the present disclosure can be mounted on various electronic devices. FIGS. 49A and 49B are views illustrating an internal configuration of a vehicle 100 as a first application example of the electronic device including the display device 1 according to the present disclosure. FIG. 49A is a view illustrating an internal state of the vehicle 100 as viewed from a rear side to a front side of the vehicle 100, and FIG. 49B is a view illustrating an internal state of the vehicle 100 as viewed from an oblique rear side to an oblique front side of the vehicle 100.

The vehicle 100 of FIGS. 49A and 49B includes a center display 101, a console display 102, a head-up display 103, a digital rear mirror 104, a steering wheel display 105, and a rear entertainment display 106.

The center display 101 is disposed on a dashboard 107 at a location facing a driver seat 108 and a passenger seat 109. FIG. 49 illustrates an example of the center display 101 having a horizontally long shape extending from the driver seat 108 side to the passenger seat 109 side, but any screen size and arrangement location of the center display 101 may be adopted. The center display 101 can display information sensed by the various sensors. As a specific example, the center display 101 can display a captured image captured by an image sensor, an image of a distance to an obstacle in front of or on a side of the vehicle, the distance being measured by a ToF sensor, a passenger's body temperature detected by an infrared sensor, and the like. The center display 101 can be used to display, for example, at least one of safety-related information, operation-related information, a life log, health-related information, authentication/identification-related information, or entertainment-related information.

The safety-related information is information of doze sensing, looking-away sensing, sensing of mischief of a child riding together, presence or absence of wearing of a seat belt, sensing of leaving of an occupant, and the like, and is information sensed by the sensor arranged to overlap with a back surface side of the center display 101, for example. The operation-related information senses a gesture related to an operation by the occupant by using the sensor. The sensed gestures may include an operation of various types of equipment in the vehicle 100. For example, operations of air conditioning equipment, a navigation device, an AV device, a lighting device, and the like are detected. The life log includes life logs of all the occupants. For example, the life log includes an action record of each occupant in the vehicle.

By acquiring and storing the life log, it is possible to check a state of the occupant at a time of an accident. The health-related information senses the body temperature of the occupant by using the temperature sensor, and estimates a health condition of the occupant on the basis of the sensed body temperature. Alternatively, the face of the occupant may be imaged by using an image sensor, and the health condition of the occupant may be estimated from the imaged facial expression. Moreover, a conversation may be made with the occupant in automatic voice, and the health condition of the occupant may be estimated on the basis of an answer content of the occupant. The authentication/identification-related information includes a keyless entry function of performing face authentication by using the sensor and a function of automatically adjusting a seat height and position in face identification. The entertainment-related information includes a function of detecting operation information of the AV device by the occupant by using the sensor, and a function of recognizing the face of the occupant by the sensor and providing a content suitable for the occupant by the AV device.

The console display 102 can be used, for example, to display the life log information. The console display 102 is disposed near a shift lever 111 of a center console 110 between the driver seat 108 and the passenger seat 109. The console display 102 can also display information sensed by the various sensors. Furthermore, the console display 102 may display an image of the vehicle surroundings captured by the image sensor, or may display an image of a distance to an obstacle in the vehicle surroundings.

The head-up display 103 is virtually displayed behind a windshield 112 in front of the driver seat 108. The head-up display 103 can be used to display, for example, at least one of the safety-related information, the operation-related information, the life log, the health-related information, the authentication/identification-related information, or the entertainment-related information. Since the head-up display 103 is virtually disposed in front of the driver seat 108 in many cases, the head-up display 103 is suitable for displaying information directly related to an operation of the vehicle 100, such as a speed of the vehicle 100 and a remaining amount of fuel (battery).

The digital rear mirror 104 can also display a state of the occupant in the rear seat in addition to the rear side of the vehicle 100, and thus can be used to display the life log information, for example, by disposing the sensor to overlap with a back surface side of the digital rear mirror 104.

The steering wheel display 105 is disposed near the center of a steering wheel 113 of the vehicle 100. The steering wheel display 105 can be used to display, for example, at least one of the safety-related information, the operation-related information, the life log, the health-related information, the authentication/identification-related information, or the entertainment-related information. In particular, since the steering wheel display 105 is close to the driver's hand, the steering wheel display 105 is suitable for displaying the life log information such as the body temperature of the driver, or for displaying information regarding an operation of the AV device, air conditioning equipment, or the like.

The rear entertainment display 106 is attached to the back side of the driver seat 108 and the passenger seat 109, and is for the occupant in the rear seat to view. The rear entertainment display 106 can be used to display, for example, at least one of the safety-related information, the operation-related information, the life log, the health-related information, the authentication/identification-related information, or the entertainment-related information. In particular, since the rear entertainment display 106 is in front of the occupant in the rear seat, information related to the occupant in the rear seat is displayed. For example, information regarding an operation of the AV device or the air conditioning equipment may be displayed, or a result of measuring the body temperature or the like of the occupant in the rear seat by the temperature sensor may be displayed.

The display device 1 according to the present disclosure can be applied to the center display 101, the console display 102, the head-up display 103, the digital rear mirror 104, the steering wheel display 105, and the rear entertainment display 106.

Second Application Example

The display device 1 according to the present disclosure is applicable not only to various displays used in the vehicle but also to displays mounted on various electronic devices.

Figure 50A:
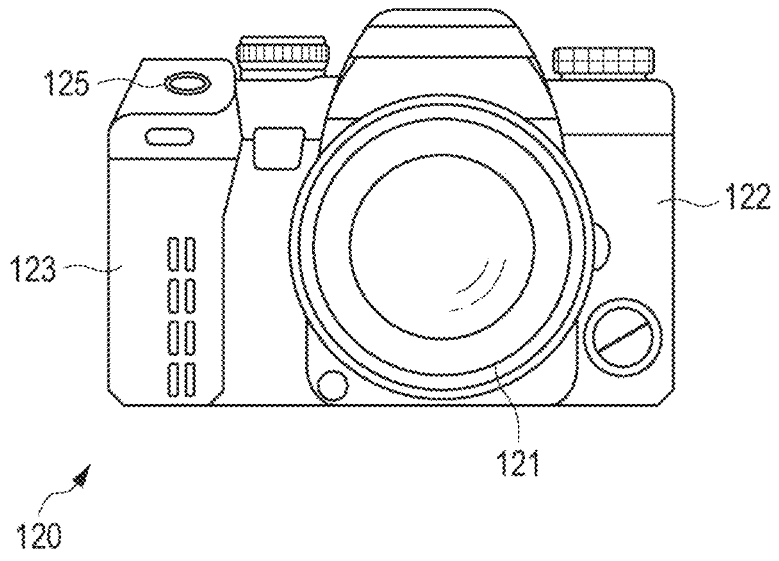
FIG. 50A is a front view of a digital camera that is a second application example of an electronic device.

FIG. 50A is a front view of a digital camera 120 as a second application example of the electronic device, and the figure is a rear view of the digital camera 120. The digital camera 120 of FIGS. 50A and 50B illustrates an example of a single-lens reflex camera in which a lens 121 is replaceable, but the display device 1 is also applicable to a camera in which the lens 121 is not replaceable.

Figure 50B:
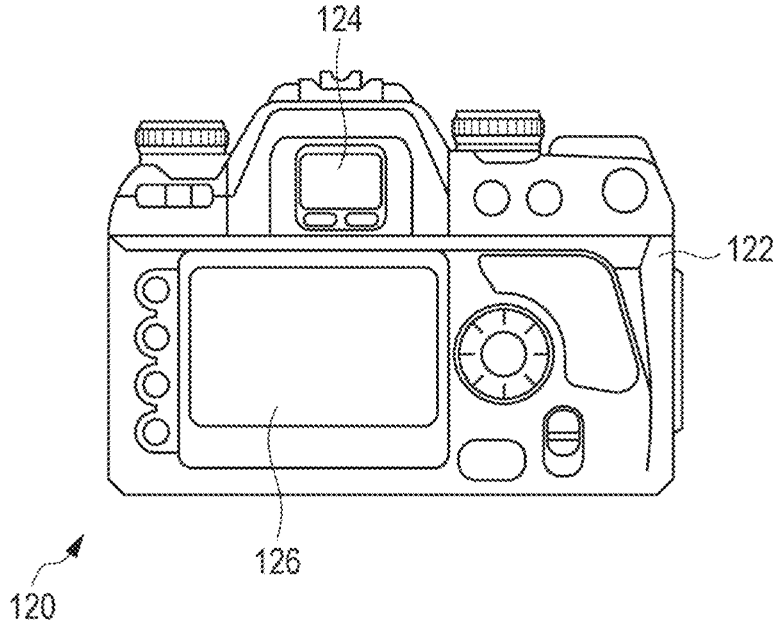
FIG. 50B is a rear view of a digital camera.

In the camera of FIGS. 50A and 50B, when a person who captures an image looks into an electronic viewfinder 124 to determine a composition while holding a grip 123 of a camera body 122, and presses a shutter 125 while adjusting focus, captured image data is stored in a memory in the camera. As illustrated in FIG. 50B, on a back side of the camera, a monitor screen 126 that displays the captured image data and the like and a live image and the like, and the electronic viewfinder 124 are provided. Furthermore, there is a case where a sub screen that displays setting information such as a shutter speed and an exposure value is provided on the upper surface of the camera.

By applying the display device 1 according to the present disclosure to the monitor screen 126, the electronic viewfinder 124, the sub screen, and the like used for the camera, it is possible to reduce the cost and improve the display quality.

Third Application Example

The display device 1 according to the present disclosure is also applicable to a head-mounted display (hereinafter, referred to as an HMD). The HMD can be used for virtual reality (VR), augmented reality (AR), mixed reality (MR), substitutional reality (SR), or the like.

Figure 51A:
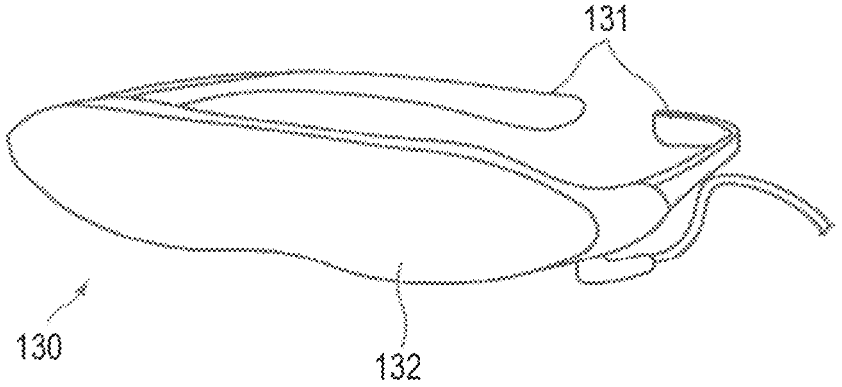
FIG. 51A is an external view of an HMD that is a third application example of an electronic device.

FIG. 51A is an external view of an HMD 130 as a third application example of the electronic device. The HMD 130 of FIG. 51A includes a mounting member 131 for attachment to cover human eyes. The mounting member 131 is, for example, hooked and fixed to human ears. A display device 132 is provided inside the HMD 130, and a wearer of the HMD 130 can visually recognize a stereoscopic image and the like with the display device 132. The HMD 130 includes, for example, a wireless communication function and an acceleration sensor, and can switch a stereoscopic image and the like displayed on the display device 132 in accordance with a posture, a gesture, and the like of the wearer. The display device 1 illustrated in FIG. 1 can be applied to the display device 132 in FIG. 51AA.

Furthermore, a camera may be provided in the HMD 130 to capture an image around the wearer, and an image obtained by combining the image captured by the camera and an image generated by a computer may be displayed on the display device 132. For example, by disposing the camera to overlap with the back surface side of the display device 132 visually recognized by the wearer of the HMD 130, capturing an image of the surroundings of the eyes of the wearer with the camera, and displaying the captured image on another display provided on the outer surface of the HMD 130, a person around the wearer can obtain expression of the face and a movement of the eyes of the wearer in real time.

Figure 51B:
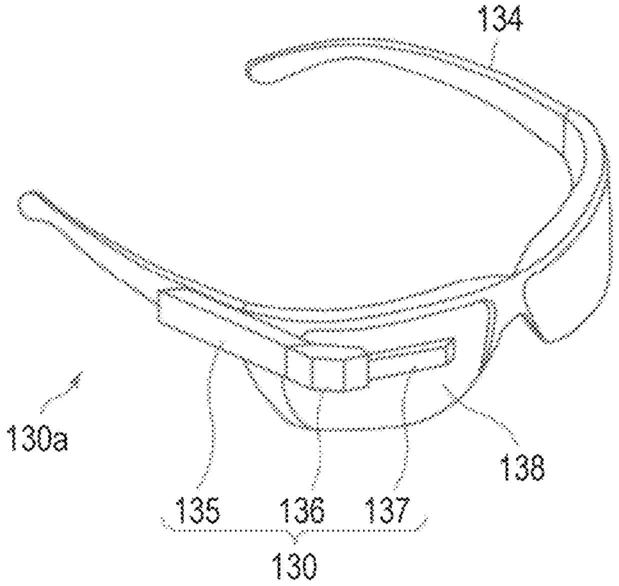
FIG. 51B is an external view of smart glasses.

Note that various types of the HMD 130 are conceivable. For example, as illustrated in FIG. 51B, the display device 1 according to the present disclosure can also be applied to smart glasses 130*a* that display various types of information on glasses 134. The smart glasses 130*a* of FIG. 51B includes a main body portion 135, an arm portion 136, and a lens barrel portion 137. The main body portion 135 is connected to the arm portion 136. The main body portion 135 is detachable from the glasses 134. The main body portion 135 incorporates a display unit and a control board for controlling the operation of the smart glasses 130*a*. The main body portion 135 and the lens barrel are connected to each other via the arm portion 136. The lens barrel portion 137 emits image light emitted from the main body portion 135 through the arm portion 136, to the lens 138 side of the glasses 134. This image light enters the human eyes through the lens 138. The wearer of the smart glasses 130*a* of FIG. 51B can visually recognize not only a surrounding situation but also various pieces of information emitted from the lens barrel portion 137 similarly to normal glasses.

Fourth Application Example

The display device 1 according to the present disclosure is also applicable to a television device (hereinafter, a TV).

Figure 52:
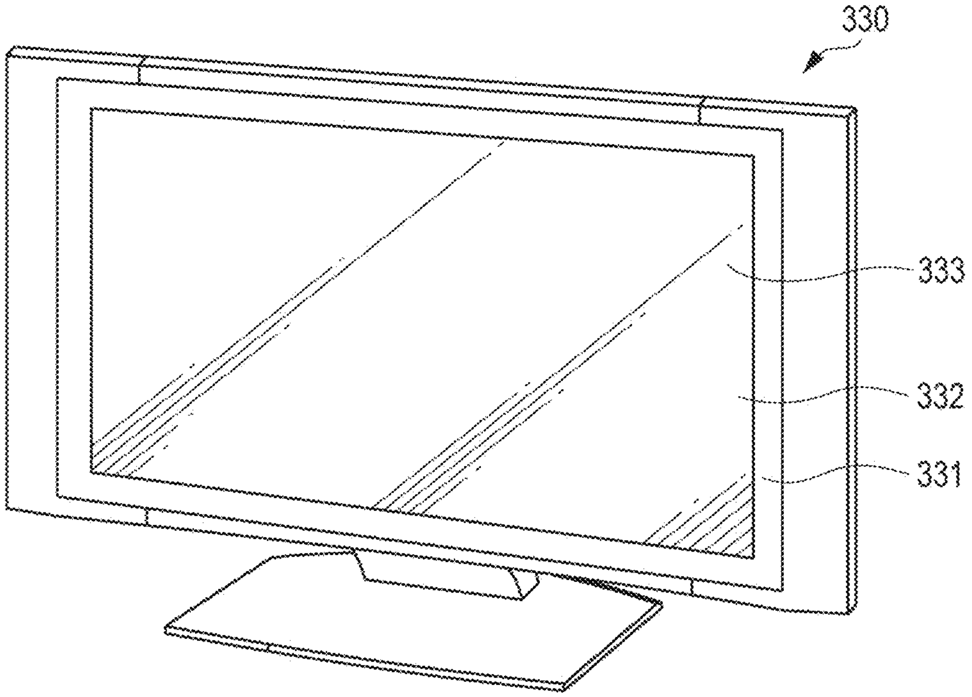
FIG. 52 is an external view of a TV that is a fourth application example of an electronic device.

FIG. 52 is an external view of a TV 330 as a fourth application example of the electronic device. The TV 330 includes, for example, an image display screen unit 331 including a front panel 332 and a filter glass 333. The display device 1 according to the present disclosure is applicable to the image display screen unit 331.

As described above, according to the display device 1 of the present disclosure, the TV 330 with low cost and excellent display quality can be realized.

Fifth Application Example

Figure 53:
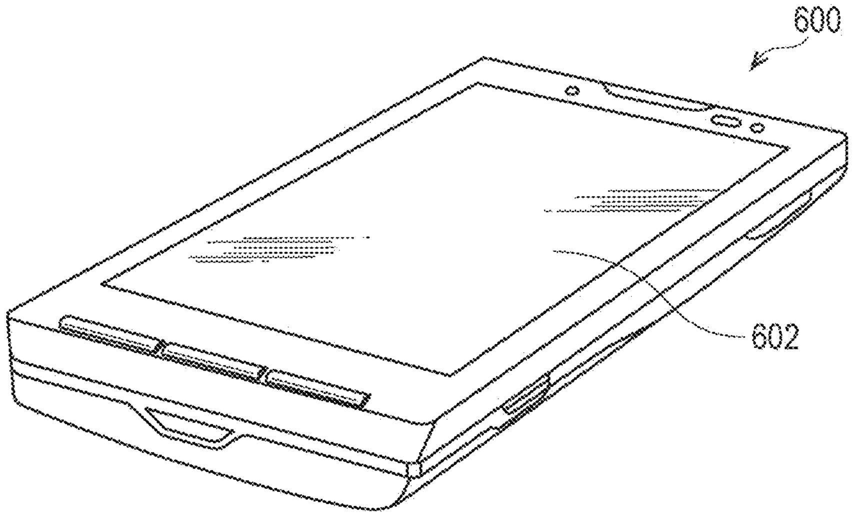
FIG. 53 is an external view of a smartphone that is a fifth application example of an electronic device.

The display device 1 according to the present disclosure is also applicable to a smartphone and a mobile phone. FIG. 53 is an external view of a smartphone 600 as a fifth application example of the electronic device. The smartphone 600 includes a display unit 602 that displays various types of information and an operation unit including a button or the like that receives a scan input by the user. The display device 1 according to the present disclosure is applicable to the display unit 602.

Note that the present technology can have the following configurations.

(1)

A display device including:

a first holding unit provided in a pixel and configured to hold an image signal; and a PWM signal generation unit provided in the pixel and configured to generate a pulse width modulation (PWM) signal corresponding to the image signal on the basis of the image signal held in the first holding unit and a count signal.

(2)

The display device according to (1), further including at least one count signal supply unit configured to supply the count signal to the PWM signal generation unit, in which the PWM signal generation unit includes a logical operation unit configured to generate a PWM signal by performing logical operation on the image signal held in the first holding unit and the count signal, the logical operation unit includes an exclusive-NOR circuit, a first input unit of the exclusive-NOR circuit is electrically connected to the first holding unit, and a second input unit of the exclusive-NOR circuit is electrically connected to the count signal supply unit.

(3)

The display device according to (2), in which the logical operation unit includes:

a plurality of the exclusive-NOR circuits, and an AND circuit to which an output of each of a plurality of the exclusive-NOR circuits is input.

(4)

The display device according to (2) or (3), in which the count signal supply unit is electrically connected to the second input unit via a buffer unit.

(5)

The display device according to any one of (2) to (4), in which the count signal supply unit is a gray code counter.

(6)

The display device according to any one of (2) to (5), in which the count signal supply unit generates the count signal having a predetermined waveform on the basis of a reference clock, and supplies the generated count signal to the PWM signal generation unit.

(7)

The display device according to any one of (1) to (6), further including:

a pixel electrode that is provided in the pixel; and a signal level conversion unit provided in the pixel and configured to convert a signal level of the PWM signal input to the pixel electrode.

(8)

The display device according to (7), further including:

a first chip; and a second chip stacked with the first chip, in which the first holding unit, the PWM signal generation unit, the signal level conversion unit, and the pixel electrode are separated and disposed in the first chip and the second chip.

(9)

The display device according to (7) or (8), in which the signal level conversion unit includes four transistors connected in series between a first reference voltage node with a voltage level different from a high level or low level of the PWM signal and a second reference voltage node with either the high level or the low level, the four transistors include a first transistor of a first conductivity type having one end electrically connected to the first reference voltage node and a gate to which a first signal is input, a second transistor of a second conductivity type having one end electrically connected to the second reference voltage node and a gate to which the PWM signal is input, a third transistor of the first conductivity type that is connected between the first transistor and the second transistor and has a gate electrically connected to a third reference voltage node with a voltage level different from that of the second reference voltage node with the high level or low level, and a fourth transistor of the second conductivity type that is connected between the first transistor and the second transistor and has a gate electrically connected to the third reference voltage node, and the pixel electrode is electrically connected to a node between the third transistor and the fourth transistor which are connected in series.

(10)

The display device according to (7) or (8), further including a second holding unit provided in the pixel and configured to hold the PWM signal, in which the signal level conversion unit includes a fifth transistor connected between the second holding unit and the pixel electrode, and a voltage booster configured to increase a voltage of the pixel electrode with capacitive coupling.

(11)

The display device according to any one of (1) to (10), in which the PWM signal generation unit is shared by a plurality of the pixels.

(12)

The display device according to any one of (1) to (11), in which the image signal includes a plurality of bits, a plurality of the first holding units is provided in accordance with a plurality of the bits, and a plurality of the first holding units is grouped such that a plurality of high-order bits becomes one bit.

(13)

The display device according to any one of (1) to (12), in which the first holding unit holds the image signal during a blanking period between a plurality of PWM periods corresponding to the PWM signal.

(14)

The display device according to any one of (1) to (13), in which the first holding unit holds the image signal having a subframe divided for each of a plurality of color components such that unit frames of the image signal are input in a predetermined order.

(15)

The display device according to (14), in which the image signal includes a plurality of bits, a plurality of the bits of the image signal is time-divided a plurality of times in one subframe, and the PWM signal generation unit generates the PWM signal time-divided a plurality of times within one subframe in accordance with the image signal of which a plurality of the bits is time-divided.

(16)

The display device according to (15), in which a plurality of the bits of the image signal is time-divided a plurality of times in accordance with a weight of the bits.

(17)

The display device according to (16), in which a plurality of the bits of the image signal is time-divided such that weights of the bits are substantially equal.

(18)

The display device according to any one of (15) to (17), in which a plurality of the bits of the image signal is time-divided into a first half bit and a second half bit in one subframe, the display device further includes a switching unit configured to switch an output of the PWM signal generation unit in accordance with a count of the first half bit or a count of the second half bit, and the PWM signal generation unit generates the PWM signal in accordance with a first timing based on the first half bit and the count signal having a first polarity and a second timing based on the second half bit and the count signal having a second polarity.

(19)

The display device according to (18), further including a selector configured to select the first holding unit configured to hold the image signal of the first half bit and the first holding unit configured to hold the image signal of the second half bit.

(20)

The display device according to (18), in which the first holding unit holds the image signal of the second half bit in a period between the count of the first half bit and the count of the second half bit.

(21)

The display device according to any one of (15) to (20), further including a pixel electrode provided in the pixel, in which the first holding unit and the PWM signal generation unit are shared by a plurality of the pixel electrodes, and some of a plurality of the pixel electrodes sharing the first holding unit and the PWM signal generation unit are driven on the basis of the same image signal, and the pixel electrodes are driven such that arrangement of the pixel electrodes driven on the basis of the same image signal is changed for each subframe of the same color component.

(22)

The display device according to (21), in which two pixel electrodes adjacent in a first direction are driven on the basis of the same image signal, and the pixel electrodes are driven such that two pixel electrodes driven on the basis of the same image signal are shifted by one pixel electrode in the first direction for each subframe of the same color component.

(23)

The display device according to (21), in which the first holding unit and the PWM signal generation unit are shared by four pixel electrodes arranged in 2×2, in a red component and a blue component, two pixel electrodes adjacent in a second direction are driven on the basis of the same image signal, and the pixel electrodes are driven such that two pixel electrodes driven on the basis of the same image signal are shifted by one pixel electrode in a first direction perpendicular to the second direction for each subframe of the same color component, and in a green component, one of four pixel electrodes is driven, and the pixel electrode is driven such that the arrangement of the pixel electrodes to be driven changes for each subframe.

(24)

The display device according to any one of (1) to (23), further including:

a flag generation unit configured to calculate a sum of signal values of the image signals for each color component and for each predetermined region of a plurality of the arranged pixels, and generate a flag in a case where the sum of the signal values is equal to or less than a predetermined value; and a drive stop unit configured to stop driving of the pixels in the predetermined region of the color component for which the flag is generated.

(25)

The display device according to (24), in which the predetermined region is a pixel line which is one line of a plurality of the pixels arranged in a matrix.

(26)

The display device according to (24), in which the predetermined region is a line division region divided in a direction along one line from a pixel line, the line division region being one line of a plurality of the pixels arranged in a matrix.

(27)

The display device according to any one of (24) to (26), in which the drive stop unit stops an input of the image signal to the first holding unit of the pixel in the predetermined region of the color component for which the flag is generated.

(28)

The display device according to any one of (24) to (27), in which the count signal is input to the PWM signal generation unit for each pixel line that is one line of a plurality of the pixels arranged in a matrix, and the drive stop unit stops the input of the count signal to the PWM signal generation unit of the pixel of the color component on the pixel line in which the flag is generated for all the pixels on the pixel line.

Aspects of the present disclosure are not limited to the above-described individual embodiments, but include various modifications that can be conceived by those skilled in the art, and the effects of the present disclosure are not limited to the above-described contents. That is, various additions, modifications, and partial deletions are possible without departing from the conceptual idea and spirit of the present disclosure derived from the matters defined in the claims and equivalents thereof.

REFERENCE SIGNS LIST

1 Display device
16 Clock generator
30 Global counter
50 Pixel
51 First holding unit
52 PWM signal generation circuit
521 EXNOR circuit
522 AND circuit
53 Signal level conversion unit
531 Voltage booster
54 Second holding unit
55 Pixel electrode
56 Selector
57 Switching unit
571 First switching transistor
572 Second switching transistor
Ba Black region
CH1 First chip
CH2 Second chip
SW2 Second switch
SW3 Third switch
Tr1 First transistor
Tr2 Second transistor
Tr3 Third transistor
Tr4 Fourth transistor
Tr5 Fifth transistor

What is claimed is:

1. A display device, comprising:

a first holding unit provided in a pixel and configured to hold an image signal;

a PWM signal generation unit provided in the pixel and configured to generate a pulse width modulation (PWM) signal corresponding to the image signal on a basis of the image signal held in the first holding unit and a count signal;

a pixel electrode that is provided in the pixel, wherein the PWM signal is input to the pixel electrode;

a signal level conversion unit provided in the pixel and configured to convert a signal level of the PWM signal input to the pixel electrode;

a first chip; and a second chip stacked with the first chip, wherein the first holding unit, the PWM signal generation unit, the signal level conversion unit, and the pixel electrode are separated and disposed in the first chip and the second chip.

2. The display device according to claim 1, further comprising at least one count signal supply unit configured to supply the count signal to the PWM signal generation unit, wherein the PWM signal generation unit includes a logical operation unit configured to generate a PWM signal by performing logical operation on the image signal held in the first holding unit and the count signal, the logical operation unit includes an exclusive-NOR circuit, a first input unit of the exclusive-NOR circuit is electrically connected to the first holding unit, and a second input unit of the exclusive-NOR circuit is electrically connected to the count signal supply unit.

3. The display device according to claim 2, wherein the logical operation unit includes:

a plurality of the exclusive-NOR circuits, and an AND circuit to which an output of each of a plurality of the exclusive-NOR circuits is input.

4. The display device according to claim 2, wherein the count signal supply unit is electrically connected to the second input unit via a buffer unit.

5. The display device according to claim 2, wherein the count signal supply unit is a gray code counter.

6. The display device according to claim 2, wherein the count signal supply unit generates the count signal having a predetermined waveform on a basis of a reference clock, and supplies the generated count signal to the PWM signal generation unit.

7. The display device according to claim 1, wherein the PWM signal generation unit is shared by a plurality of the pixels.

8. The display device according to claim 1, wherein the first holding unit holds the image signal having a subframe divided for each of a plurality of color components such that unit frames of the image signal are input in a predetermined order.

9. A display device, comprising:

a first holding unit provided in a pixel and configured to hold an image signal;

a PWM signal generation unit provided in the pixel and configured to generate a pulse width modulation (PWM) signal corresponding to the image signal on a basis of the image signal held in the first holding unit and a count signal;

a pixel electrode that is provided in the pixel, wherein the PWM signal is input to the pixel electrode; and a signal level conversion unit provided in the pixel and configured to convert a signal level of the PWM signal input to the pixel electrode;

wherein the signal level conversion unit includes four transistors connected in series between a first reference voltage node with a voltage level different from a high level or low level of the PWM signal and a second reference voltage node with either the high level or the low level, wherein the four transistors include:

a first transistor of a first conductivity type having one end electrically connected to the first reference voltage node and a gate to which a first signal is input, a second transistor of a second conductivity type having one end electrically connected to the second reference voltage node and a gate to which the PWM signal is input, a third transistor of the first conductivity type that is connected between the first transistor and the second transistor and has a gate electrically connected to a third reference voltage node with a voltage level different from that of the second reference voltage node with the high level or low level, and a fourth transistor of the second conductivity type that is connected between the first transistor and the second transistor and has a gate electrically connected to the third reference voltage node, and wherein the pixel electrode is electrically connected to a node between the third transistor and the fourth transistor which are connected in series.

10. A display device, comprising:

a first holding unit provided in a pixel and configured to hold an image signal;

a PWM signal generation unit provided in the pixel and configured to generate a pulse width modulation (PWM) signal corresponding to the image signal on a basis of the image signal held in the first holding unit and a count signal;

a pixel electrode that is provided in the pixel, wherein the PWM signal is input to the pixel electrode;

a signal level conversion unit provided in the pixel and configured to convert a signal level of the PWM signal input to the pixel electrode; and a second holding unit provided in the pixel and configured to hold the PWM signal, wherein the signal level conversion unit includes:

a fifth transistor connected between the second holding unit and the pixel electrode, and a voltage booster configured to increase a voltage of the pixel electrode with capacitive coupling.

11. A display device, comprising:

a first holding unit provided in a pixel and configured to hold an image signal; and a PWM signal generation unit provided in the pixel and configured to generate a pulse width modulation (PWM) signal corresponding to the image signal on a basis of the image signal held in the first holding unit and a count signal, wherein the image signal includes a plurality of bits, wherein a plurality of the first holding units is provided in accordance with a plurality of the bits, and wherein a plurality of the first holding units is grouped such that a plurality of high-order bits becomes one bit.

12. The display device according to claim 11, further comprising:

a pixel electrode that is provided in the pixel, wherein the PWM signal is input to the pixel electrode; and a signal level conversion unit provided in the pixel and configured to convert a signal level of the PWM signal input to the pixel electrode.

13. A display device, comprising:

a first holding unit provided in a pixel and configured to hold an image signal; and a PWM signal generation unit provided in the pixel and configured to generate a pulse width modulation (PWM) signal corresponding to the image signal on a basis of the image signal held in the first holding unit and a count signal, wherein the first holding unit holds the image signal during a blanking period between a plurality of PWM periods corresponding to the PWM signal.

14. A display device, comprising:

a first holding unit provided in a pixel and configured to hold an image signal; and a PWM signal generation unit provided in the pixel and configured to generate a pulse width modulation (PWM) signal corresponding to the image signal on a basis of the image signal held in the first holding unit and a count signal, wherein the first holding unit holds the image signal having a subframe divided for each of a plurality of color components such that unit frames of the image signal are input in a predetermined order, wherein the image signal includes a plurality of bits, wherein a plurality of the bits of the image signal are time-divided a plurality of times in one subframe, wherein the PWM signal generation unit generates the PWM signal time-divided a plurality of times within one subframe in accordance with the image signal of which a plurality of the bits is time-divided, wherein a plurality of the bits of the image signal is time-divided a plurality of times in accordance with a weight of the bits, and wherein a plurality of the bits of the image signal is time-divided such that weights of the bits are substantially equal.

15. A display device, comprising:

a first holding unit provided in a pixel and configured to hold an image signal; and a PWM signal generation unit provided in the pixel and configured to generate a pulse width modulation (PWM) signal corresponding to the image signal on a basis of the image signal held in the first holding unit and a count signal, wherein the first holding unit holds the image signal having a subframe divided for each of a plurality of color components such that unit frames of the image signal are input in a predetermined order, wherein the image signal includes a plurality of bits, wherein a plurality of the bits of the image signal are time-divided a plurality of times in one subframe, wherein the PWM signal generation unit generates the PWM signal time-divided a plurality of times within one subframe in accordance with the image signal of which a plurality of the bits is time-divided, wherein a plurality of the bits of the image signal are time-divided into a first half bit and a second half bit in one subframe, wherein the display device further includes a switching unit configured to switch an output of the PWM signal generation unit in accordance with a count of the first half bit or a count of the second half bit, and wherein the PWM signal generation unit generates the PWM signal in accordance with a first timing based on the first half bit and the count signal having a first polarity and a second timing based on the second half bit and the count signal having a second polarity.

16. The display device according to claim 15, further comprising a selector configured to select the first holding unit configured to hold the image signal of the first half bit and the first holding unit configured to hold the image signal of the second half bit.

17. The display device according to claim 15, wherein the first holding unit holds the image signal of the second half bit in a period between the count of the first half bit and the count of the second half bit.

18. A display device, comprising:

a first holding unit provided in a pixel and configured to hold an image signal;

a PWM signal generation unit provided in the pixel and configured to generate a pulse width modulation (PWM) signal corresponding to the image signal on a basis of the image signal held in the first holding unit and a count signal, wherein the first holding unit holds the image signal having a subframe divided for each of a plurality of color components such that unit frames of the image signal are input in a predetermined order, wherein the image signal includes a plurality of bits, wherein a plurality of the bits of the image signal are time-divided a plurality of times in one subframe, and wherein the PWM signal generation unit generates the PWM signal time-divided a plurality of times within one subframe in accordance with the image signal of which a plurality of the bits are time-divided; and a pixel electrode provided in the pixel, wherein the first holding unit and the PWM signal generation unit are shared by a plurality of the pixel electrodes, and wherein some of a plurality of the pixel electrodes sharing the first holding unit and the PWM signal generation unit are driven on a basis of a same image signal, and the pixel electrodes are driven such that arrangement of the pixel electrodes driven on a basis of a same image signal is changed for each subframe of a same color component.

19. The display device according to claim 18, wherein a plurality of the bits of the image signal is time-divided a plurality of times in accordance with a weight of the bits.

20. The display device according to claim 18, wherein two pixel electrodes adjacent in a first direction are driven on a basis of a same image signal, and the pixel electrodes are driven such that two pixel electrodes driven on a basis of a same image signal are shifted by one pixel electrode in the first direction for each subframe of a same color component.

21. The display device according to claim 18, wherein the first holding unit and the PWM signal generation unit are shared by four pixel electrodes arranged in 2×2, wherein, in a red component and a blue component, two pixel electrodes adjacent in a second direction are driven on a basis of a same image signal, and the pixel electrodes are driven such that two pixel electrodes driven on a basis of a same image signal are shifted by one pixel electrode in a first direction perpendicular to the second direction for each subframe of a same color component, and wherein, in a green component, one of four pixel electrodes is driven, and the pixel electrode is driven such that the arrangement of the pixel electrodes to be driven changes for each subframe.

22. A display device, comprising:

a first holding unit provided in a pixel and configured to hold an image signal;

a PWM signal generation unit provided in the pixel and configured to generate a pulse width modulation (PWM) signal corresponding to the image signal on a basis of the image signal held in the first holding unit and a count signal;

a flag generation unit configured to calculate a sum of signal values of the image signals for each color component and for each predetermined region of a plurality of the pixels, and generate a flag in a case where the sum of the signal values is equal to or less than a predetermined value; and a drive stop unit configured to stop driving of the pixels in the predetermined region of the color component for which the flag is generated.

23. The display device according to claim 22, wherein the predetermined region is a pixel line which is one line of a plurality of the pixels arranged in a matrix.

24. The display device according to claim 22, wherein the predetermined region is a line division region divided in a direction along one line from a pixel line, the line division region being one line of a plurality of the pixels arranged in a matrix.

25. The display device according to claim 22, wherein the drive stop unit stops an input of the image signal to the first holding unit of the pixel in the predetermined region of the color component for which the flag is generated.

26. The display device according to claim 22, wherein the count signal is input to the PWM signal generation unit for each pixel line that is one line of a plurality of the pixels arranged in a matrix, and wherein the drive stop unit stops the input of the count signal to the PWM signal generation unit of the pixel of the color component on the pixel line in which the flag is generated for all the pixels on the pixel line.

* * * * *